United States Patent
Volkerink et al.

(10) Patent No.: US 12,409,936 B2
(45) Date of Patent: Sep. 9, 2025

(54) DETECTION SYSTEM, APPARATUS, USER INTERFACE FOR AIRCRAFT GALLEY ASSETS AND METHOD THEREOF

(71) Applicant: Trackonomy Systems, Inc., San Jose, CA (US)

(72) Inventors: Hendrik J. Volkerink, Palo Alto, CA (US); Ajay Khoche, West San Jose, CA (US); Aaron Storrs, Santa Cruz, CA (US); Prabhat Verma, Fremont, CA (US)

( * ) Notice: Subject to any disclaimer, the term of this patent is extended or adjusted under 35 U.S.C. 154(b) by 196 days.

(21) Appl. No.: 18/224,863

(22) Filed: Jul. 21, 2023

(65) Prior Publication Data

US 2024/0025546 A1    Jan. 25, 2024

Related U.S. Application Data

(60) Provisional application No. 63/391,689, filed on Jul. 22, 2022.

(51) Int. Cl.
  *G01S 1/04* (2006.01)
  *B64D 11/04* (2006.01)
  *H04B 17/318* (2015.01)

(52) U.S. Cl.
  CPC .............. *B64D 11/04* (2013.01); *G01S 1/042* (2013.01); *G01S 1/045* (2013.01); *H04B 17/318* (2015.01)

(58) Field of Classification Search
  CPC ........... G06K 7/10128; G06K 7/10366; G06K 7/016; G01S 1/042; G01S 1/045
  See application file for complete search history.

(56) References Cited

U.S. PATENT DOCUMENTS

| 4,785,463 A | 11/1988 | Janc et al. |
| 6,437,702 B1 | 8/2002 | Ragland et al. |
| 6,522,874 B1 | 2/2003 | Chu et al. |
| 6,972,682 B2 | 12/2005 | Lareau et al. |

(Continued)

FOREIGN PATENT DOCUMENTS

| AU | 2018204317 A1 | 1/2019 |
| CA | 3008512 A1 | 12/2018 |

(Continued)

OTHER PUBLICATIONS

PCT Application No. PCT/US2020/055408, International Search Report and Written Opinion, dated Feb. 25, 2021, 11 pages.

(Continued)

*Primary Examiner* — Nabil H Syed

(57) ABSTRACT

A detection system tracks assets in a galley of an aircraft. A tracked tape node attached to an asset transmits, at a first interval, a beacon including a unique identifier (ID) of the tracked tape node. One of a plurality of tracking tape nodes, each positioned in a different one of a plurality of asset slots of the aircraft galley, activates a receiver for a first period to receive the beacons and stores the unique ID and a receive signal strength indication (RSSI) of the received beacon in a list ordered on the RSSI. The tracking tape node transmits, at a second interval, a tracking beacon including a tracking ID of the tracking tape node and the list. A mobile device receives the tracking beacons and generates a data structure of assets in the galley. The mobile device compares the data structure to a manifest and graphically indicates discrepancies.

20 Claims, 31 Drawing Sheets

(56) References Cited

U.S. PATENT DOCUMENTS

| | | | |
|---|---|---|---|
| 7,273,172 | B2 | 9/2007 | Olsen, III et al. |
| 7,696,862 | B2 | 4/2010 | Herschell et al. |
| 7,866,555 | B2 | 1/2011 | Schmid et al. |
| 7,922,085 | B2 | 4/2011 | Thomas et al. |
| 8,095,070 | B2 | 1/2012 | Twitchell, Jr. |
| 8,184,005 | B2 * | 5/2012 | Kamel ............... G06Q 10/08 340/572.1 |
| 8,413,997 | B1 | 4/2013 | Coombs |
| 9,721,226 | B2 | 8/2017 | Minogue et al. |
| 9,886,799 | B2 | 2/2018 | Kwak |
| 10,244,364 | B1 | 3/2019 | Beard |
| 10,679,172 | B2 | 6/2020 | Burch, V et al. |
| 10,748,109 | B2 | 8/2020 | Benjamin et al. |
| 11,115,732 | B2 | 9/2021 | Lucrecio et al. |
| 11,487,985 | B2 | 11/2022 | Volkerink |
| 2003/0205869 | A1 | 11/2003 | Schutt |
| 2003/0227382 | A1 | 12/2003 | Breed |
| 2004/0224630 | A1 | 11/2004 | MacFarland |
| 2005/0028504 | A1 | 2/2005 | Gramm |
| 2005/0146423 | A1 | 7/2005 | Hattori |
| 2006/0087419 | A1 | 4/2006 | Peng |
| 2006/0197652 | A1 | 9/2006 | Hild et al. |
| 2007/0229240 | A1 | 10/2007 | Yasuda |
| 2008/0100448 | A1 * | 5/2008 | Sharma ............ G08B 13/2417 340/572.6 |
| 2008/0100450 | A1 | 5/2008 | Ayyagari et al. |
| 2008/0147277 | A1 | 6/2008 | Lu |
| 2008/0228352 | A1 | 9/2008 | Brookes |
| 2008/0252025 | A1 | 10/2008 | Plath |
| 2009/0016308 | A1 | 1/2009 | Twitchell, Jr. |
| 2009/0018721 | A1 | 1/2009 | Mian |
| 2009/0265038 | A1 | 10/2009 | Ramsey |
| 2012/0232942 | A1 | 9/2012 | Gaug et al. |
| 2014/0163857 | A1 | 6/2014 | Melum et al. |
| 2014/0344118 | A1 | 11/2014 | Parpia et al. |
| 2015/0154538 | A1 * | 6/2015 | Skaaksrud ............ H04W 64/00 705/333 |
| 2015/0206096 | A1 | 7/2015 | Fernandez |
| 2015/0239354 | A1 | 8/2015 | Gorai |
| 2015/0248838 | A1 | 9/2015 | Stone et al. |
| 2016/0066137 | A1 | 3/2016 | Kulkarni et al. |
| 2017/0140656 | A1 | 5/2017 | Mott et al. |
| 2017/0243367 | A1 | 8/2017 | Lee |
| 2018/0039266 | A1 | 2/2018 | Dotzler et al. |
| 2018/0096289 | A1 | 4/2018 | Terwilliger et al. |
| 2018/0097884 | A1 | 4/2018 | Terwilliger et al. |
| 2018/0301875 | A1 | 10/2018 | Burroughs |
| 2018/0365636 | A1 | 12/2018 | Lucrecio et al. |
| 2019/0039431 | A1 | 2/2019 | Vaughan |
| 2019/0101650 | A1 | 4/2019 | McKeown et al. |
| 2019/0210518 | A1 | 7/2019 | Michalakis |
| 2019/0222055 | A1 | 7/2019 | Khoche |
| 2019/0236732 | A1 | 8/2019 | Speasl et al. |
| 2019/0315319 | A1 | 10/2019 | Williams |
| 2019/0340483 | A1 | 11/2019 | Khoche |
| 2020/0051015 | A1 | 2/2020 | Davis |
| 2020/0137360 | A1 | 4/2020 | Somers et al. |
| 2020/0300960 | A1 | 9/2020 | Murphy et al. |
| 2020/0375106 | A1 | 12/2020 | Seiders |
| 2021/0031734 | A1 | 2/2021 | Wolf |
| 2021/0094377 | A1 | 4/2021 | Coerman |
| 2021/0110122 | A1 * | 4/2021 | Volkerink ............ G06Q 10/08 |
| 2021/0284449 | A1 | 9/2021 | Rogers |
| 2021/0319683 | A1 | 10/2021 | Daw Perez et al. |
| 2021/0390290 | A1 | 12/2021 | Hunt et al. |
| 2022/0032704 | A1 | 2/2022 | Desourdy |
| 2022/0161786 | A1 | 5/2022 | Javaid |

FOREIGN PATENT DOCUMENTS

| | | |
|---|---|---|
| CN | 108665044 A | 10/2018 |
| WO | WO 2018/053309 A1 | 3/2018 |

OTHER PUBLICATIONS

Examination Report No. 1 for Australian Patent Application No. 2020368350 dated Sep. 30, 2022, 6 pages.

Examination Report No. 2 for Australian Patent Application No. 2020368350 dated Apr. 24, 2023, 5 pages.

Examination Report No. 3 for Australian Patent Application No. 2020368350 dated Sep. 21, 2023, 6 pages.

Examination Report No. 4 for Australian Patent Application No. 2020368350 dated Sep. 28, 2023, 5 pages.

Examination Report No. 1 for Australian Patent Application No. 2020216093 dated Sep. 29, 2022, 4 pages.

International Preliminary Report on Patentability for International Patent Application No. PCT/US2020/014521 dated Jul. 27, 2021, 6 pages.

Office Action for Canadian Patent Application No. 3,128,524 dated Oct. 12, 2022, 6 pages.

Partial Supplementary European Search Report for European Patent Application No. 20747574.0 dated Sep. 16, 2022, 3 pages.

Invitation to Pay Additional Fees and, Where Applicable, Protest Fee for International Patent Application No. PCT/US2023/028361 dated Sep. 25, 2023, 3 pages.

International Preliminary Report on Patentability for International Application No. PCT/US2023/028361 dated Feb. 6, 2025, 8 pages.

International Patent Application No. PCT/US2023/028361 International Search Report and Written Opinion dated Dec. 12, 2023, 12 pages.

* cited by examiner

1326

| EXPECTED ASSETS AND LOCATION ||||
|---|---|---|---|
| ASSET | ASSET ID | GALLEY LOCATION | LOCATION ID |
| 1310(1) | 001001 | 1304(1) | 000001 |
| 1310(2) | 001002 | 1304(2) | 000002 |
| 1310(3) | 001003 | 1304(3) | 000003 |
| 1312(1) | 001004 | 1306(4) | 000008 |
| 1312(2) | 001005 | 1306(5) | 000009 |

| DETECTED ASSETS ||
|---|---|
| LOCATION ID | ASSET ID |
| 000001 | 001001 |
| 000002 | 001002 |
| 000003 |  |
| 000004 | 001003 |
| 000005 |  |
| 000006 |  |
| 000007 |  |
| 000008 |  |
| 000009 | 001005 |

*FIG. 18B*

End-to-end food services visibility

| Food Preparation Operations | Food Cart Kitchen Operations | Food Cart Truck Management | Plane Management |
|---|---|---|---|
| • Knife visibility<br>• Dwell times<br>• Knife theft alerts | • Staging, loading, consolidating, inspecting, pickup staging step visibility<br>• Alert incorrect consolidations (SFO with AME) or happy path issues<br>• Dwell times on every step | • GPS coordinates<br>• Load and unload detection<br>• Problem alerts | • Food cart locationing in galley & during services<br>• Alert on misloads<br>• Find items |
| • Dwell time assessments in geofence | • Identify wrong cart in cluster 100 through smart construction cone (first visit) | • Dwell time assessments in truck geofence (97.5)<br>• Load / unload visibility 100% | • Tape below cart 100% gi location accuracy (from second visit) |

FIG. 26

DETECTION SYSTEM, APPARATUS, USER INTERFACE FOR AIRCRAFT GALLEY ASSETS AND METHOD THEREOF

RELATED APPLICATIONS

This application claims priority to U.S. Patent Application Ser. No. 63/391,689, titled "Detection System, Apparatus, User Interface for Airplane Galley Assets and Method Thereof," filed Jul. 22, 2022, and which is incorporated herein by reference.

BACKGROUND

In commercial airline flights and other flights, food items and other assets may be stored in carts and boxes which are stationed in a galley of an aircraft. Accurately determining the contents of the galley and ensuring that the correct assets are loaded onto a plane is crucial for managing inventory and providing the correct resources for each flight. It is desirable to track the inventory and movement of assets on a plane, including assets that move in and out of the galley.

SUMMARY

An asset tracking system for monitoring assets on an aircraft is disclosed. The asset tracking system includes a sender wireless node on a mobile asset, a reader wireless node on a station for the mobile asset, and a requesting wireless node used to request data from other wireless nodes of the asset tracking system to locate the mobile asset during a flight. The asset tracking system efficiently manages battery life of the wireless nodes while maintaining sensitivity to the location of the mobile assets in relation to corresponding stations, for example, in the galley of the aircraft.

In some aspects, the techniques described herein relate to a method for detecting a plurality of assets in an aircraft galley, including: transmitting, at a first interval, a beacon from a tracked tape node attached to an asset, the beacon including a unique identifier (ID) of the tracked tape node; sensing, within one of a plurality of tracking tape nodes, each positioned in a different one of a plurality of asset slots of the aircraft galley, a change in a magnetic field caused by a permanent magnet of the tracked tape node; activating, by the one tracking tape node in response to the sensing, a receiver for a first period to receive the beacon; and receiving, by the one tracking tape node, the beacon from the tracked tape node.

In some aspects, the techniques described herein relate to a method for detecting a plurality of assets in an aircraft galley, including: transmitting, at a first interval, a synchronization beacon from a master tape node positioned within the galley; receiving, by at least one of a plurality of tracking tape nodes, each positioned in a different one of a plurality of asset slots of the aircraft galley, the synchronization beacon and activating a receiver of the one tracking tape node for a first period immediately after the synchronization beacon; receiving, by a tracked tape node attached to one of the plurality of assets, the synchronization beacon and transmitting, during the first period, a beacon including a unique identifier (ID) of the tracked tape node; receiving, by the one tracking tape node, the beacon and storing the unique ID and a receive signal strength indication (RSSI) of the received beacon in a list ordered on the RSSI; and transmitting, from the tracking tape node at a second interval and for a second period, a tracking beacon including a tracking ID of the tracking tape node and the list.

In some aspects, the techniques described herein relate to a method for detecting a plurality of assets in an aircraft galley, including: from each of a plurality of tracked tape nodes attached to a different one of the plurality of assets, transmitting, at a first interval, a beacon including a unique identifier (ID) of the tracked tape node; activating a receiver of a mobile device located within the galley to receive the beacons; storing the unique ID and a receive signal strength indication (RSSI) of the received beacon in a data structure ordered on the RSSI; comparing, within the mobile device, the data structure to a manifest of the plurality of assets for the aircraft galley to detect one or more of: (a) assets stowed in a correct asset slot, (b) assets stored in a wrong asset slot, (c) assets missing from the galley, and (d) unexpected assets in the galley; and generating, on a graphical user interface of the mobile device, a representation of the galley indicating at least one of the (a) assets stowed in the correct asset slot, (b) assets stored in the wrong asset slot, (c) assets missing from the galley, and (d) unexpected assets in the galley.

In some aspects, the techniques described herein relate to a detection system for validating a plurality of assets loaded into an aircraft galley, including: a plurality of tracked tape nodes each attached to a different one of the plurality assets and including a wireless transmitter that transmits, at intervals, a tracked beacon including a unique identifier; a plurality of tracking tape nodes each positioned at a different asset slot of the aircraft galley, each tracking tape node including: a receiver for receiving the beacon; and a transmitter for transmitting, at intervals, a tracking beacon including a tracking node identifier and the unique identifier; and a mobile device having a transceiver, a display, a processor, and memory storing an application with machine readable instructions that when executed by the processor cause the processor to: receive the tracking beacon via the transceiver; store the unique identifier and the tracking node identifier in a data structure of the memory; generate a comparison of the tracking node identifier and the unique identifier to a manifest of expected assets for the aircraft galley; and display the comparison in a graphical user interface on the display.

In some aspects, the techniques described herein relate to a tape node with energy harvesting, including: an energy harvester for harvesting energy from an environment of the tape node; an energy store electrically coupled to receive electrical energy from the energy harvester; a sub-circuit having: a processor; and memory storing control code, a unique ID of the tape node, and an action list; and an energy level trigger electrically couples to the energy store and the sub-circuit, the energy level trigger activating the sub-circuit when an energy level within the energy store reaches or exceed a trigger level; wherein the sub-circuit executes the control code to perform an action of the action list when activated.

In some aspects, the techniques described herein relate to a detection system for validating a plurality of assets loaded into an area, including: a plurality of tracked tape nodes each attached to a different one of the plurality assets and including a wireless transmitter that transmits, at intervals, a tracked beacon including a unique identifier; a plurality of tracking tape nodes each positioned at a different asset slot of the area, each tracking tape node including: a receiver for receiving the beacon; and a transmitter for transmitting, at intervals, a tracking beacon including a tracking node identifier and the unique identifier; and a mobile device having a transceiver, a display, a processor, and memory storing an application with machine readable instructions that when executed by the processor cause the processor to: receive the tracking beacon via the transceiver; store the unique identifier and the tracking node identifier in a data structure of the memory; generate a comparison of the tracking node identifier and the unique identifier to a manifest of expected assets for the space; and display the comparison in a graphical user interface on the display.

In some aspects, the techniques described herein relate to a detection system for validating a plurality of assets loaded into an aircraft galley, including: a plurality of tracked tape nodes each attached to a different one of the plurality assets and including a wireless transmitter that transmits, at intervals, a tracked beacon including a unique identifier; a plurality of tracking tape nodes each positioned at a different asset slot of the aircraft galley, each tracking tape node including: a receiver for receiving the beacon; and a transmitter for transmitting, at intervals, a tracking beacon including a tracking node identifier and the unique identifier; a master node having a transceiver, a processor, and memory storing machine readable instructions that when executed by the processor cause the processor to: receive the tracking beacon via the transceiver; and store the unique identifier and the tracking node identifier in a data structure of the memory; and a mobile device having a transceiver, a display, a processor, and memory storing an application with machine readable instructions that when executed by the processor cause the processor to: retrieve the contents of the data structure from the master node; generate a comparison of the tracking node identifier and the unique identifier to a manifest of expected assets for the aircraft galley; and display the comparison in a graphical user interface on the display.

BRIEF DESCRIPTION OF THE FIGURES

FIG. 18A shows the manifest of FIG. 13 in further example detail, in embodiments.

FIG. 18B shows the data structure of FIG. 13 in further example detail, in embodiments.

FIG. 26 is a block diagram showing end-to-end food service visibility for a food service in an aircraft, in embodiments.

DETAILED DESCRIPTION OF THE EMBODIMENTS

Figure 1:
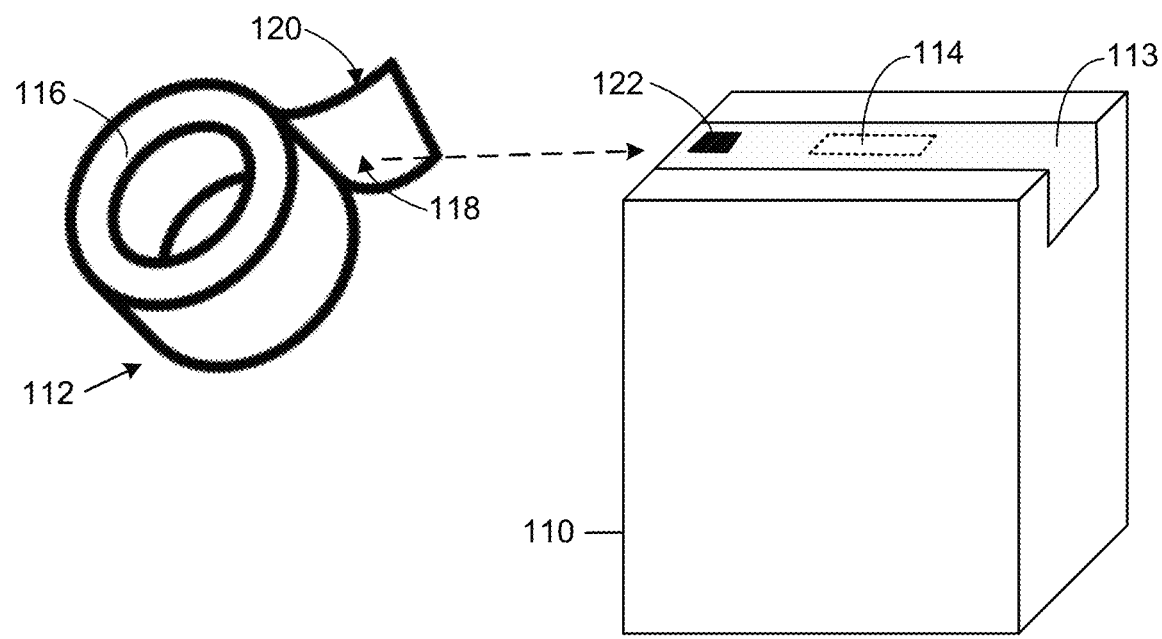
FIG. 1 is a schematic illustrating one example adhesive tape-agent platform used to seal a package for shipment, in embodiments.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 6A-C and/or 10A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

Further, each of the "agents", "nodes", "tape nodes", and "tape agents" may include flexible or non-flexible form factors unless otherwise specified. Thus, each of the "agents", "nodes", "tape nodes", and "tape agents" include flexible and non-flexible (rigid) form factors, or a combination thereof including flexible components and non-flexible components.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof. The term "processor" or "computer" or the like includes one or more of: a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC), a memory controller, bus controller, and other components that manage data flow between said processor associated memory, and other components communicably coupled to the system bus. Thus the terms "module," "manager," "component", and "unit" may include computer readable instructions that, when executed by a processor, implement the functionality discussed herein with respect to said "module," "manager," "component", and "unit".

Adhesive Tape Agent Platform

FIG. 1 is a schematic illustrating one example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
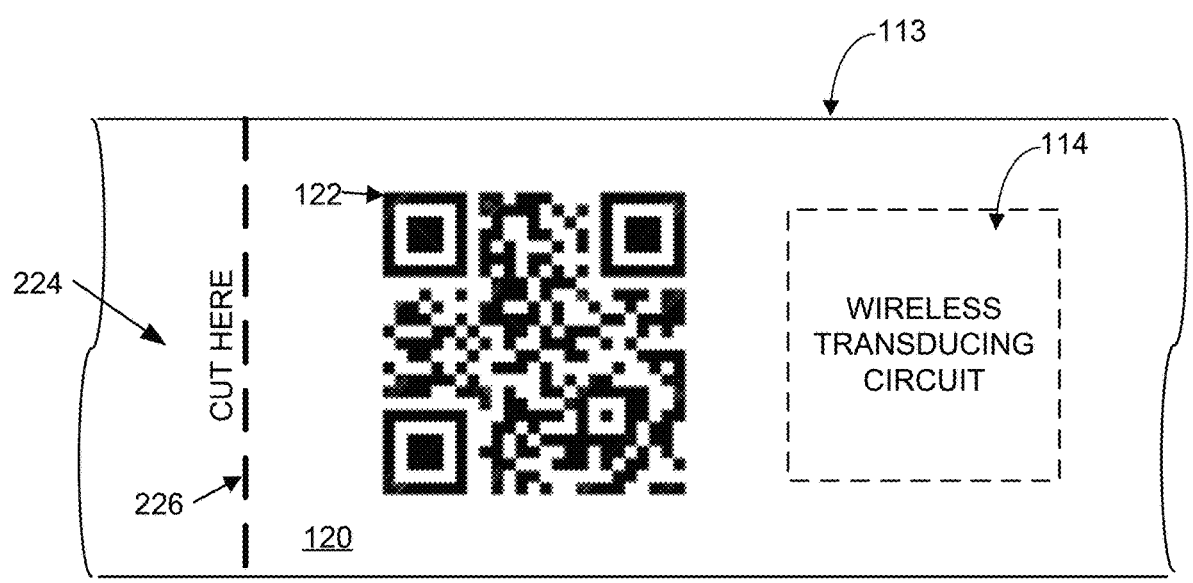
FIG. 2 is a schematic illustrating a non-adhesive surface of a segment of the adhesive tape agent platform of FIG. 1, in embodiments.

FIG. 2 is a schematic illustrating a non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 2, the segment 113 of the adhesive tape agent platform 112 includes an identifier 122 (e.g., a two-dimensional bar code, such as a QR Code), written instructions 224 (e.g., "Cut Here"), and an associated cut line 226 that indicates where the user should cut the adhesive tape agent platform 112. The written instructions 224 and the cut line 226 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape-agent platform to the package 110.

In some examples, the wireless transducing circuits 114 embedded in one or more segments 113 of the adhesive tape-agent platform 112 are activated when the adhesive tape-agent platform 112 is cut along the cut line 226. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 226).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
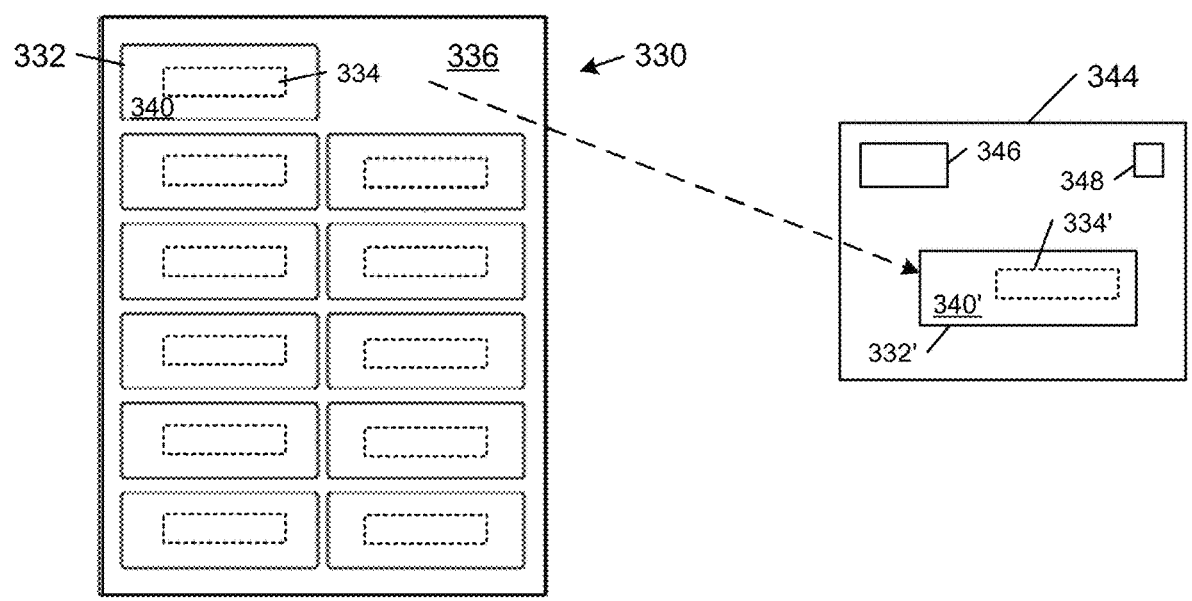
FIG. 3 shows one example adhesive tape platform that includes a set of adhesive tape platform segments on a backing sheet, in embodiments.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 of FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
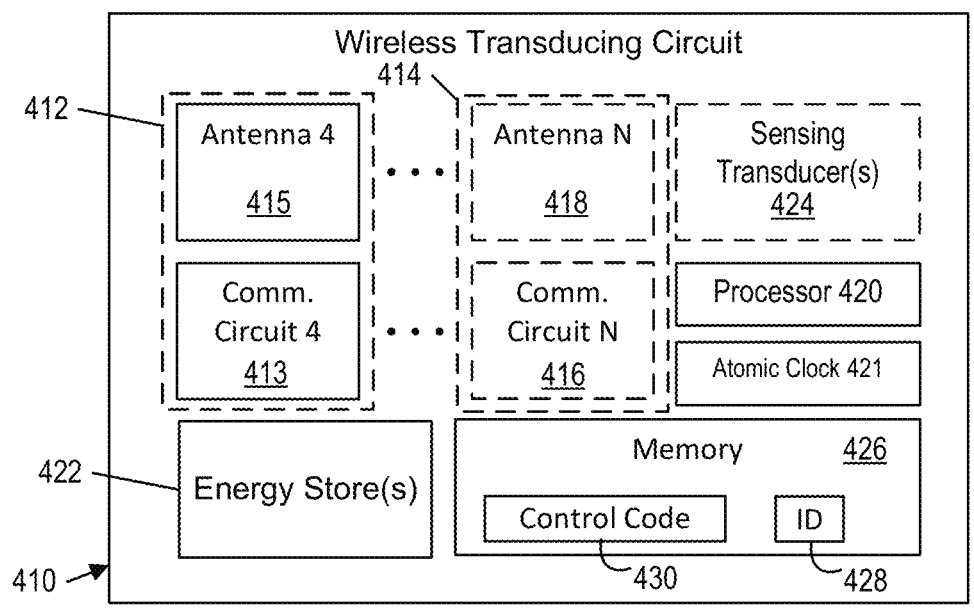
FIG. 4 is a block diagram illustrating components of an example wireless transducing circuit that includes one or more wireless communication modules, in embodiments.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
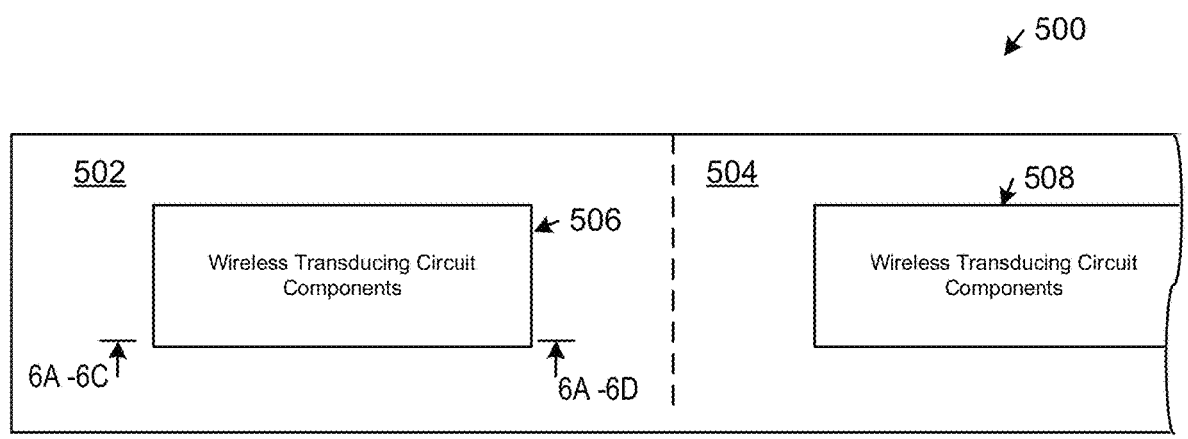
FIG. 5 is a top view of a portion of an example flexible adhesive tape platform illustrating a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 6A:
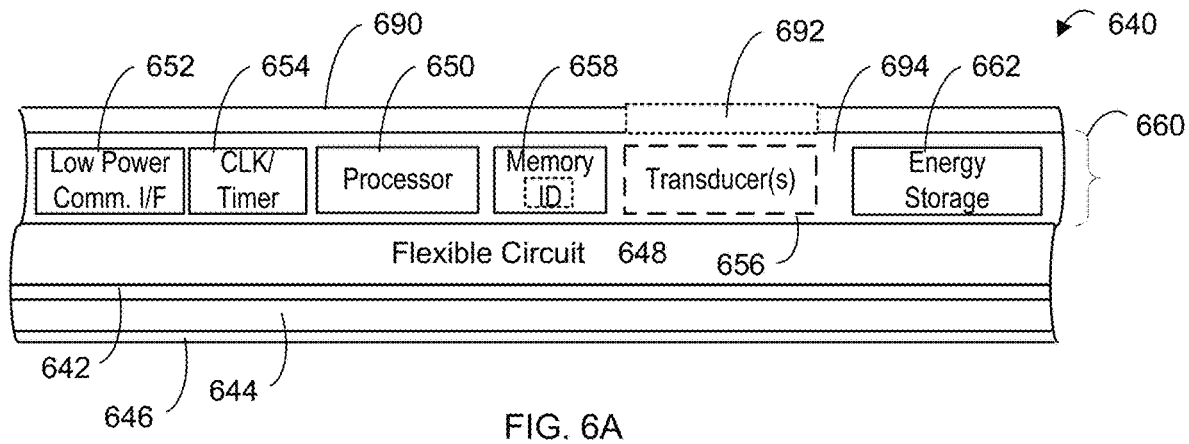
FIGS. 6A-C are schematic diagrams illustrating cross-sectional side views of portions of example segments of three types of flexible adhesive tape agent platforms, in embodiments.
Figure 6B:
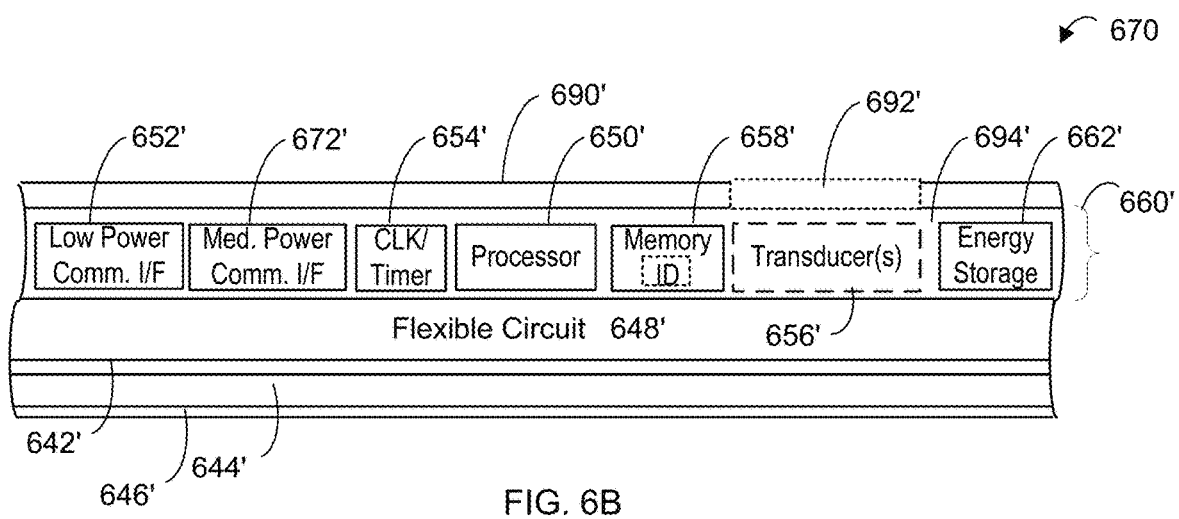
Figure 6C:
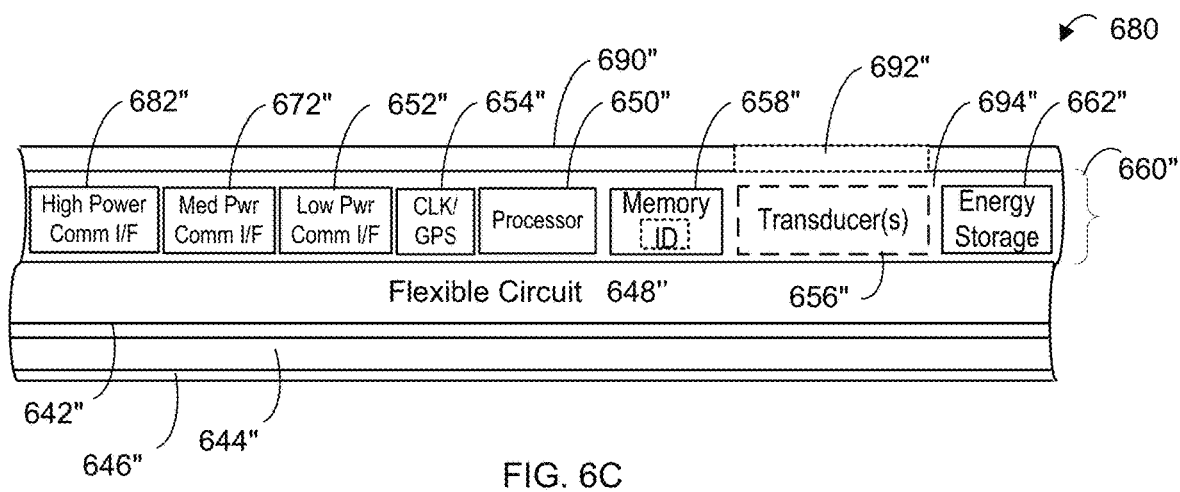
Figure 7A:
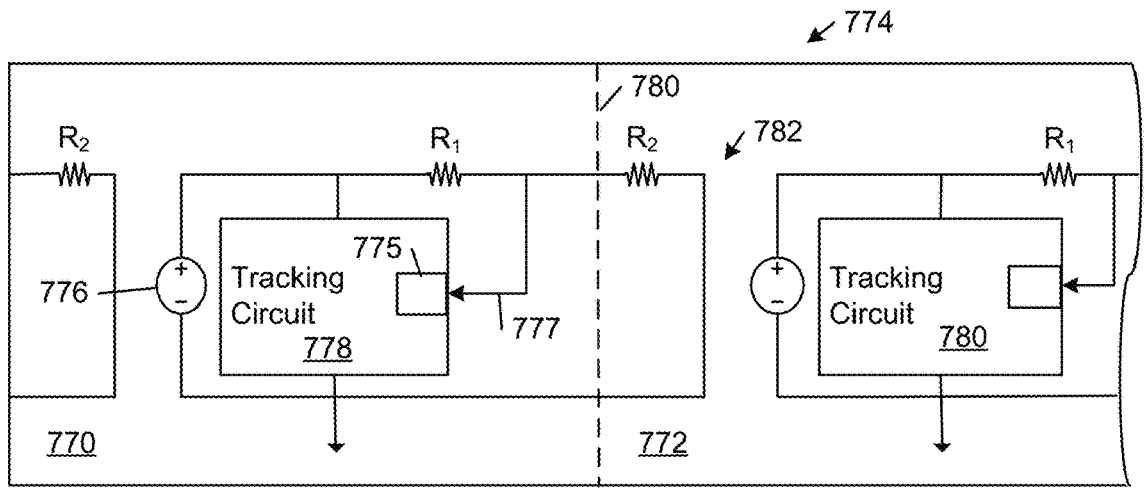
FIG. 7A is a schematic diagram illustrating an adhesive tracking product with a first example wake circuit that delivers power from an energy source to the tracking circuit in response to an event, in embodiments.
Figure 7B:
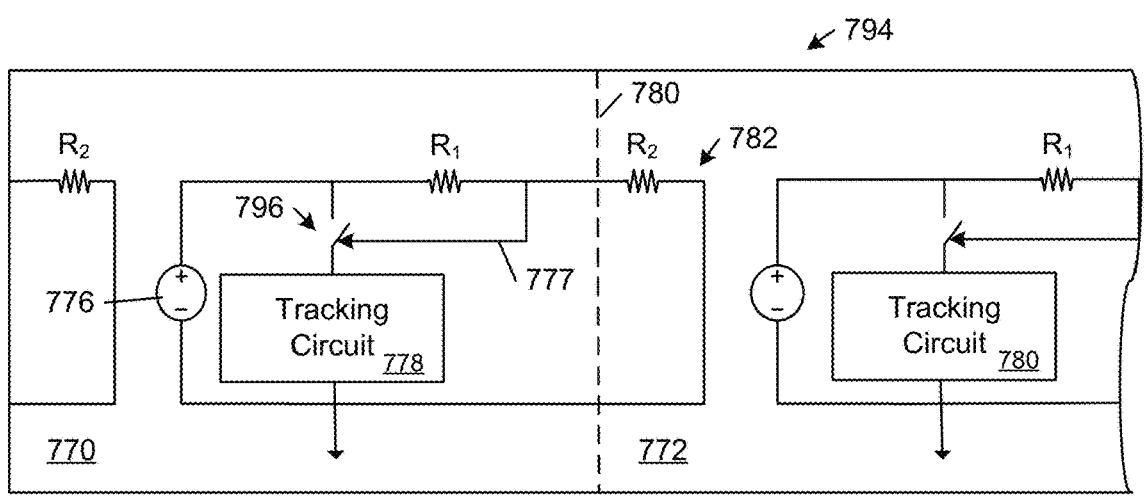
FIG. 7B is a schematic diagram illustrating an adhesive tracking product with a second example wake circuit that delivers power from an energy source to the tracking circuit in response to an event.

An example method of fabricating the adhesive tape platform 500 according to a roll-to-roll fabrication process is described in connection with FIGS. 6A-6C and as shown in FIGS. 7A and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A is a schematic illustrating a cross-sectional side view of a portion of an example segment 640 of a flexible adhesive tape agent platform (e.g., platform 500 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a pre-fabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 500 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682' and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 7C:
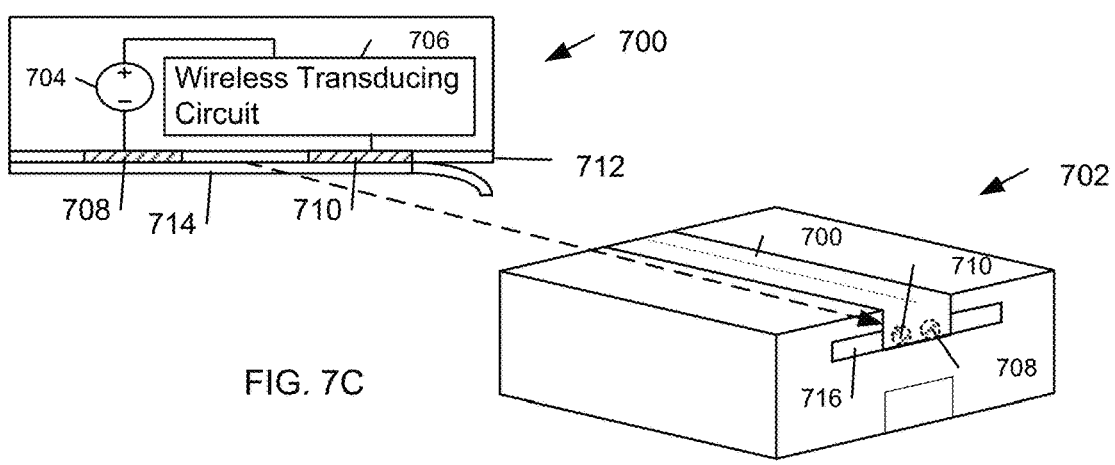
FIG. 7C is a diagrammatic cross-sectional front view of an example adhesive tape platform and a perspective view of an example asset, in embodiments.

FIG. 7C shows a diagrammatic cross-sectional front view of an example adhesive tape platform 700 and a perspective view of an example asset 702. Instead of activating the adhesive tape platform in response to separating a segment of the adhesive tape platform from a roll or a sheet of the adhesive tape platform, this example is configured to supply power from the energy source 704 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned in and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Figure 8:
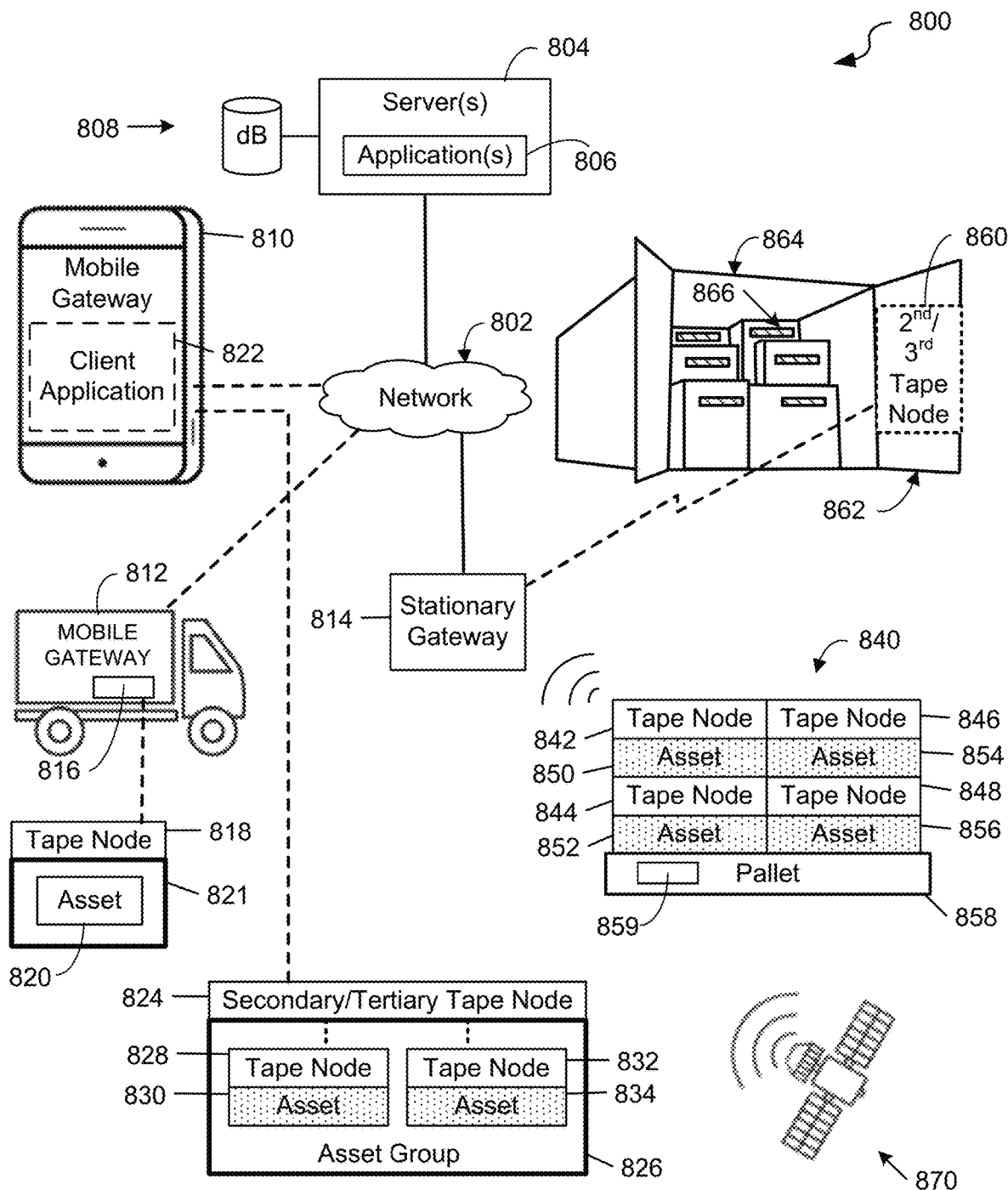
FIG. 8 is a schematic illustrating an example network communications environment that includes a network supporting communications between servers, mobile gateways, a stationary gateway, and various types of tape nodes associated with various assets, in embodiments.

FIG. 8 shows an example network communications environment 800 that includes a network 802 that supports communications between one or more servers 804 executing one or more applications of a network service 808, mobile gateways 810 (a smart device mobile gateway), 812 (a vehicle mobile gateway), a stationary gateway 814, and various types of tape nodes that are associated with various assets (e.g., parcels, equipment, tools, persons, and other things). Hereinafter "tape nodes" may be used interchangeably with the "agents", as described above, with reference to FIGS. 1-7; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 802 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 802 includes communications infrastructure equipment, such as a geolocation satellite system 870 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and Zig-Bee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 820) or other stationary (e.g., stationary gateway 814) or mobile object (e.g., a, such as a delivery truck, such as mobile gateway 812) or stationary object (e.g., a structural element of a building). This process activates the tape node (e.g., the tape node 818) and causes the tape node 818 to communicate with the one or more servers 804 of the network service 808. In this process, the tape node 418 may communicate through one or more other tape nodes (e.g., the tape nodes 842, 844, 846, 848) in the communication hierarchy. In this process, the one or more servers 804 executes the network service application 806 to programmatically configure tape nodes 818, 824, 828, 832, 842, 844, 846, 848, that are deployed in the network communications environment 800. In some examples, there are multiple classes or types of tape nodes, where each tape node class has a different respective set of functionalities and/or capacities, as described herein with respect to the "agents" in FIGS. 1-7. For example, the master agents have a lower-power wireless communication interface (e.g., the low-power wireless-communication interface 652, with reference to FIG. 6), in comparison to the secondary and tertiary agents.

In some examples, the one or more servers 804 communicate over the network 802 with one or more gateways 810, 812, 814 that are configured to send, transmit, forward, or relay messages to the network 802 in response to transmissions from the tape nodes 818, 824, 828, 832, 842, 844, 846, 848 that are associated with respective assets and within communication range. Example gateways include mobile gateways 810, 812 and a stationary gateway 814. In some examples, the mobile gateways 810, 812, and the stationary gateway 814 are able to communicate with the network 802 and with designated sets or groups of tape nodes.

In some examples, the mobile gateway 812 is a vehicle (e.g., a delivery truck or other mobile hub) that includes a wireless communications unit 816 that is configured by the network service 808 to communicate with a designated network of tape nodes, including tape node 818 (e.g., a master tape node) in the form of a label that is adhered to a parcel 821 (e.g., an envelope) that contains an asset 820, and is further configured to communicate with the network service 808 over the network 802. In some examples, the tape node 818 includes a lower-power wireless-communications interface of the type used in, e.g., segment 640 (shown in FIG. 6A), and the wireless communications unit 816 may be implemented by a secondary or tertiary tape node (e.g., one of segment 670 or segment 680, respectively shown in FIGS. 6B and 6C) that includes a lower-power communications interfaces for communicating with tape nodes within range of the mobile gateway 812 and a higher-power communications-interface for communicating with the network 802. In this way, the tape node 818 and wireless communications unit 816 create a hierarchical wireless network of tape nodes for transmitting, forwarding, bridging, relaying, or otherwise communicating wireless messages to, between, or on behalf of the tape node 818 in a power-efficient and cost-effective way.

In some examples, a mobile gateway 810 is a mobile phone that is operated by a human operator and executes a client application 822 that is configured by a network service to communicate with a designated set of tape nodes, including a secondary or tertiary tape node 824 that is adhered to a parcel 826 (e.g., a box), and is further configured to communicate with a server 804 over the network 802. In the illustrated example, the parcel 826 contains a first parcel labeled or sealed by a master tape node 828 and containing a first asset 830, and a second parcel labeled or sealed by a master tape node 832 and containing a second asset 834. The secondary or tertiary tape node 824 communicates with each of the master tape nodes 828, 832 and also communicates with the mobile gateway 810. In some examples, each of the master tape nodes 828, 832 includes a lower-power wireless-communications interface of the type used in, e.g., segment 640 (shown in FIG. 6A), and the secondary/tertiary tape node 824 is implemented by a tape node (e.g., segment 670 or segment 680, shown in FIGS. 6B and 6C) that includes a low-power communications interface for communicating with the master tape nodes 828, 832 contained within the parcel 826, and a higher-power communications interface for communicating with the mobile gateway 810. The secondary or tertiary tape node 824 is operable to relay wireless communications between the master tape nodes 828, 832 contained within the parcel 826 and the mobile gateway 810, and the mobile gateway 810 is operable to relay wireless communications between the secondary or tertiary tape node 824 and the server 804 over the network 802. In this way, the master tape nodes 828 and 832 and the secondary or tertiary tape node 824 create a wireless network of nodes for transmitting, forwarding, relaying, or otherwise communicating wireless messages to, between, or on behalf of the master tape nodes 828, 832, the secondary or tertiary tape node 824, and the network service (not shown) in a power-efficient and cost-effective way.

In some embodiments, the client application 822 is installed on a mobile device (e.g., smartphone) that may also operate as mobile gateway 810. The client application 822 may cause the mobile device to function as a mobile gateway 810. For example, the client application 822 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 822) relays that data to the server 804 via cellular (2G, 3G, 4G, 5G) or Wi-Fi. Further, the client application 822 may cause the mobile device to establish a connection with, and receive pings (e.g., alerts to nearby assets that an environmental profile threshold has been exceeded), from the tape nodes or from the server 804. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 822 may share location data with the tape node, allowing the tape node to pinpoint its location.

In some examples, the stationary gateway 814 is implemented by a server 804 executing a network service application 806 that is configured by the network service 808 to communicate with a designated set 840 of master tape nodes 842, 844, 846, 848 that are adhered to respective parcels containing respective assets 850, 852, 854, 856 on a pallet 858. In other examples, the stationary gateway 814 is implemented by a secondary or tertiary tape node 860 (e.g., segments 670 or 680, respectively shown in FIGS. 6B and 6C) that is adhered to, for example, a wall, column or other infrastructure component of the physical premise's environment 800, and includes a low-power communications interface for communicating with nodes within range of the stationary gateway 814 and a higher-power communications interface for communicating with the network 802.

In one embodiment, each of the master tape nodes 842-848 is a master tape node and is configured by the network service 808 to communicate individually with the stationary gateway 814, which relays communications from the master tape nodes 842-848 to the network service 808 through the stationary gateway 814 and over the network 802. In another embodiment, one of the master tape nodes 842-848 at a time is configured to transmit, forward, relay, or otherwise communicate wireless messages to, between, or on behalf of the other master nodes on the pallet 858. In this embodiment, the master tape node may be determined by the master tape nodes 842-848 or designated by the network service 808. In some examples, the master tape nodes 842-848 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 859 is adhered to the pallet 858 and is configured to perform the role of a master node for the other master tape nodes 842-848. In these ways, the master tape nodes 842-848, 859 are configurable to create different wireless networks of nodes for transmitting, forwarding, relaying, bridging, or otherwise communicating wireless messages with the network service 408 through the stationary gateway 814 and over the network 802 in a power-efficient and cost-effective way.

In the illustrated example, the stationary gateway 814 also is configured by the network service 808 to communicate with a designated network of tape nodes, including the secondary or tertiary tape node 860 that is adhered to the inside of a door 862 of a shipping container 864, and is further configured to communicate with the network service 808 over the network 802. In the illustrated example, the shipping container 864 contains a number of parcels labeled or sealed by respective master tape nodes 866 and containing respective assets. The secondary or tertiary tape node 860 communicates with each of the master tape nodes 866 within the shipping container 864 and communicates with the stationary gateway 814. In some examples, each of the master tape nodes 866 includes a low-power wireless communications-interface (e.g., the low-power wireless-communication interface 652, 652', 652", with reference to FIGS. 6A-6C), and the secondary or tertiary tape node 860 includes a low-power wireless-communications interface (low-power wireless-communication interfaces 652', 652", with reference to FIGS. 6B-6C) for communicating with the master tape nodes 866 contained within the shipping container 864, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 814. In some examples, either a secondary or tertiary tape node, or both, may be used, depending on whether a high-power wireless-communication interface is necessary for sufficient communication.

In some examples, when the doors of the shipping container 864 are closed, the secondary or tertiary tape node 860 is operable to communicate wirelessly with the master tape nodes 866 contained within the shipping container 864. In some embodiments, both a secondary and a tertiary node are attached to the shipping container 864. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 860 is configured to collect sensor data from master tape nodes 866 and, in some embodiments, process the collected data to generate, for example, statistics from the collected data. When the doors of the shipping container 864 are open, the secondary or tertiary tape node 860 is programmed to detect the door opening (e.g., using a photodetector or an accelerometer component of the secondary or tertiary tape node 860) and, in addition to reporting the door opening event to the network service 808, the secondary or tertiary tape node 860 is further programmed to transmit the collected data and/or the processed data in one or more wireless messages to the stationary gateway 814. The stationary gateway 814, in turn, is operable to transmit the wireless messages received from the secondary or tertiary tape node 860 to the network service 808 over the network 802. Alternatively, in some examples, the stationary gateway 814 also is operable to perform operations on the data received from the secondary or tertiary tape node 860 with the same type of data produced by the secondary or tertiary tape node 860 based on sensor data collected from the master tape nodes 842-848. In this way, the secondary or tertiary tape node 860 and master tape node 866 create a wireless network of nodes for transmitting, forwarding, relaying, or otherwise communicating wireless messages to, between, or on behalf of the master tape node 866, the secondary or tertiary tape nodes 860, and the network service 808 in a power-efficient and cost-effective way.

In an example of the embodiment shown in FIG. 8, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-7). The short-range master tape nodes typically are adhered directly to parcels containing assets. In the illustrated example, the master tape nodes 818, 828, 832, 842-848, 866 are short-range tape nodes. The short-range tape nodes typically communicate with a low-power wireless-communication protocol (e.g., Bluetooth LE, Zigbee, or Z-wave). The segments 670 are typically adhered to objects (e.g., a parcel 826 and a shipping container 864) that are associated with multiple parcels that are separated from the medium-range tape nodes by a barrier or a long distance. In the illustrated example, the secondary and/or tertiary tape nodes 824 and 860 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 800.

In the illustrated example, the mobile gateway 812 and the stationary gateway 814 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 812 (e.g., a truck). In these examples, the wireless communications unit 816 may be moved to different locations in the network communications environment 800 to assist in connecting other tape nodes to the wireless communications unit 816. In some examples, the stationary gateway 814 is a tape node that may be attached to a stationary structure (e.g., a wall) in the network communications environment 800 with a known geographic location (e.g., GPS coordinates). In these examples, other tape nodes in the environment may determine their geographic location by querying the stationary gateway 814.

In some examples, in order to conserve power, the tape nodes typically communicate according to a schedule promulgated by the network service 808. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 804, either directly or indirectly through a gateway tape node (e.g., the long-range tape node, such as wireless communication unit 816, adhered to the mobile gateway 812, or a long-range tape node, such as stationary gateway 814, that is adhered to an infrastructure component of the network communications environment 800). In other examples, the master tape node processes the information contained in the received data packets and transmits the processed information to the server 804.

Figure 9A:
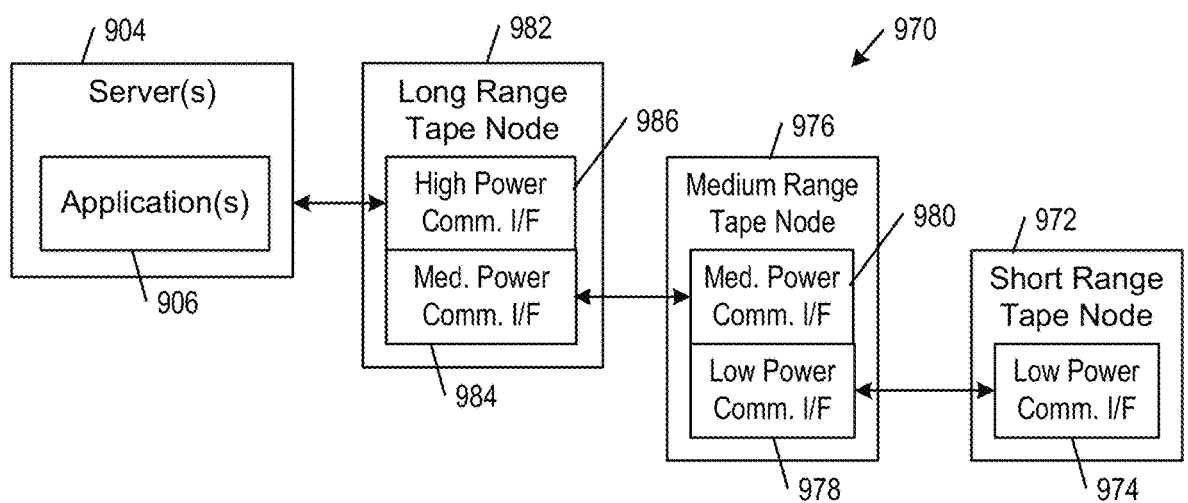
FIG. 9A is a schematic illustrating one example hierarchical wireless communications network of tape nodes, in embodiments.

FIG. 9A is a schematic illustrating one example hierarchical wireless communications network of tape nodes 970. In this example, the short-range tape node 972 and the medium range tape node 976 communicate with one another over their respective low power wireless communication interfaces 974, 978. The medium range tape node 976 and the long-range tape node 982 communicate with one another over their respective medium power wireless communication interfaces 980, 984. The long-range tape node 982 and the one or more network service servers 904 (e.g., server(s) 804, FIG. 8) running application(s) 906 (e.g., application(s) 806) communicate with one another over the high-power communication interface 986. In some examples, the low power communication interfaces 974, 978 establish wireless communications with one another in accordance with the Bluetooth LE protocol, the medium power communication interfaces 980, 984 establish wireless communications with one another in accordance with the LoRa communications protocol, and the high-power communication interface 986 establishes wireless communications with the one or more network service servers 904 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 904 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 904. The schedule usually dictates all aspects of the communication, including the times when particular tape nodes should communicate, the mode of communication, and the contents of the communication. In one example, the one or more network service servers 904 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 904, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the environment 800). In other examples, the master tape node processes the information contained in the received data packets and transmits the processed information to the one or more network service servers 904/804.

Figure 9B:
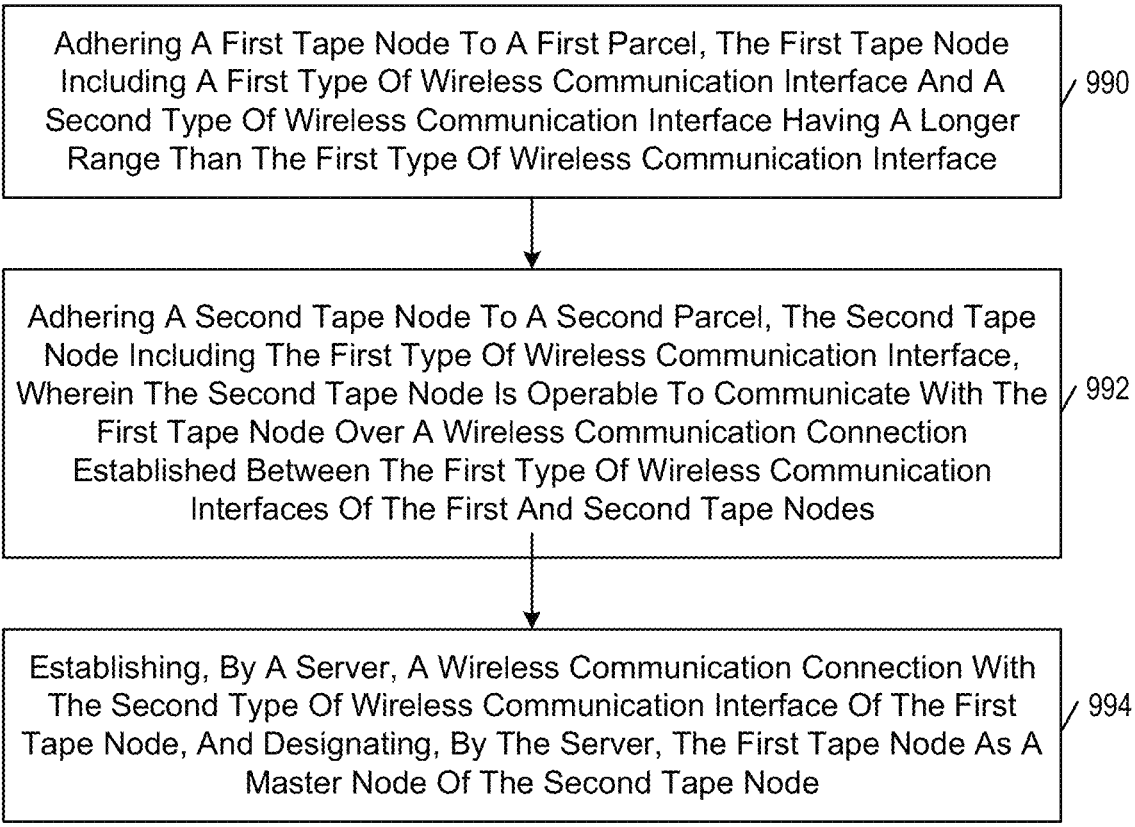
FIG. 9B is a flowchart illustrating one example method of creating a hierarchical communications network, in embodiments.

FIG. 9B is a flowchart illustrating one example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 9B, block 990). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 9B, block 992). An application executing on a computer system (e.g., the one or more network service servers 904 of a network service 908) establishes a wireless communication connection with the second type of wireless communication interface of the first tape node, and the application transmits programmatic code executable by the first tape node to function as a master tape node with respect to the second tape node (FIG. 9B, block 994).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 10A:
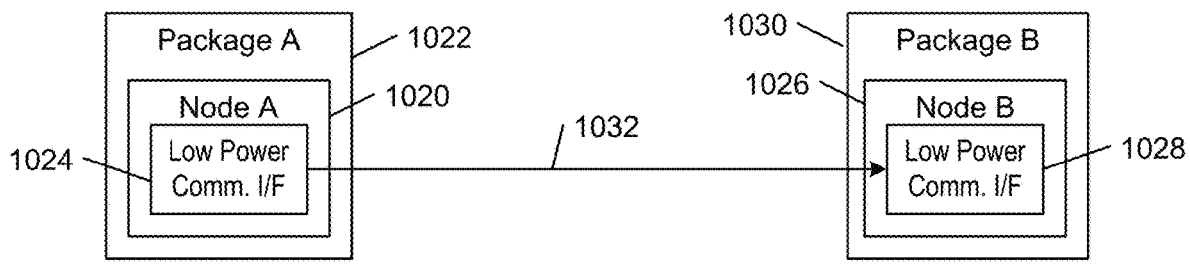
FIG. 10A shows a node (Node A) associated with a package (Package A), in embodiments.

Referring to FIG. 10A, a node 1020 (Node A) is associated with a package 1022 (Package A). In some embodiments, the node 1020 may be implemented as a tape node that is used to seal the package 1022 or it may be implemented as a label node that is used to label the package 1022; alternatively, the node 1020 may be implemented as a non-tape node that is inserted within the package 1022 or embedded in or otherwise attached to the interior or exterior of the package 1022. In the illustrated embodiment, the node 1020 includes a low power communications interface 1024 (e.g., a Bluetooth Low Energy communications interface). Another node 1026 (Node B), which is associated with another package 1030 (Package B), is similarly equipped with a compatible low power communications interface 1028 (e.g., a Bluetooth Low Energy communications interface).

In an example scenario, in accordance with the programmatic code stored in its memory, node 1026 (Node B) requires a connection to node 1020 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1020 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1032 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
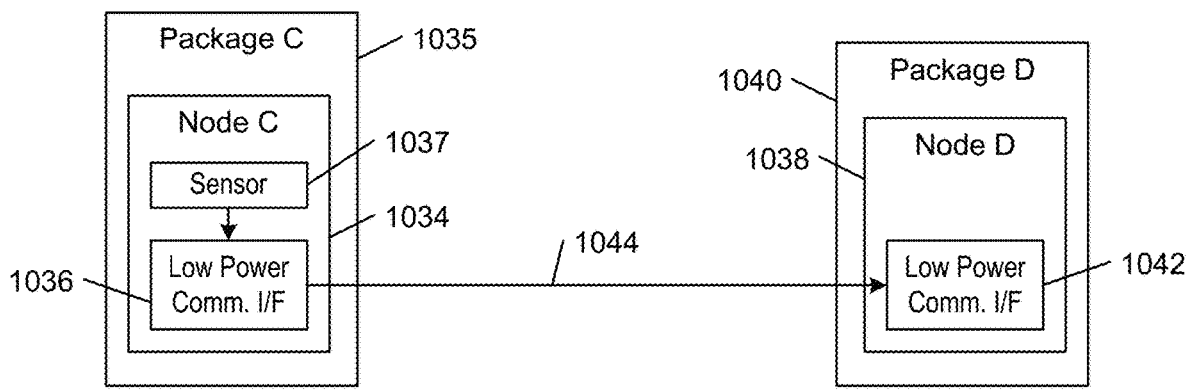
FIG. 10B shows a node (Node C) associated with a package (Package C), in embodiments.

Referring to FIG. 10B, a node 1034 (Node C) is associated with a package 1035 (Package C). In the illustrated embodiment, the Node C includes a low power communications interface 1036 (e.g., a Bluetooth Low Energy communications interface), and a sensor 1037 (e.g., a temperature sensor). Another node 1038 (Node D), which is associated with another package 1040 (Package D), is similarly equipped with a compatible low power communications interface 1042 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1044 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
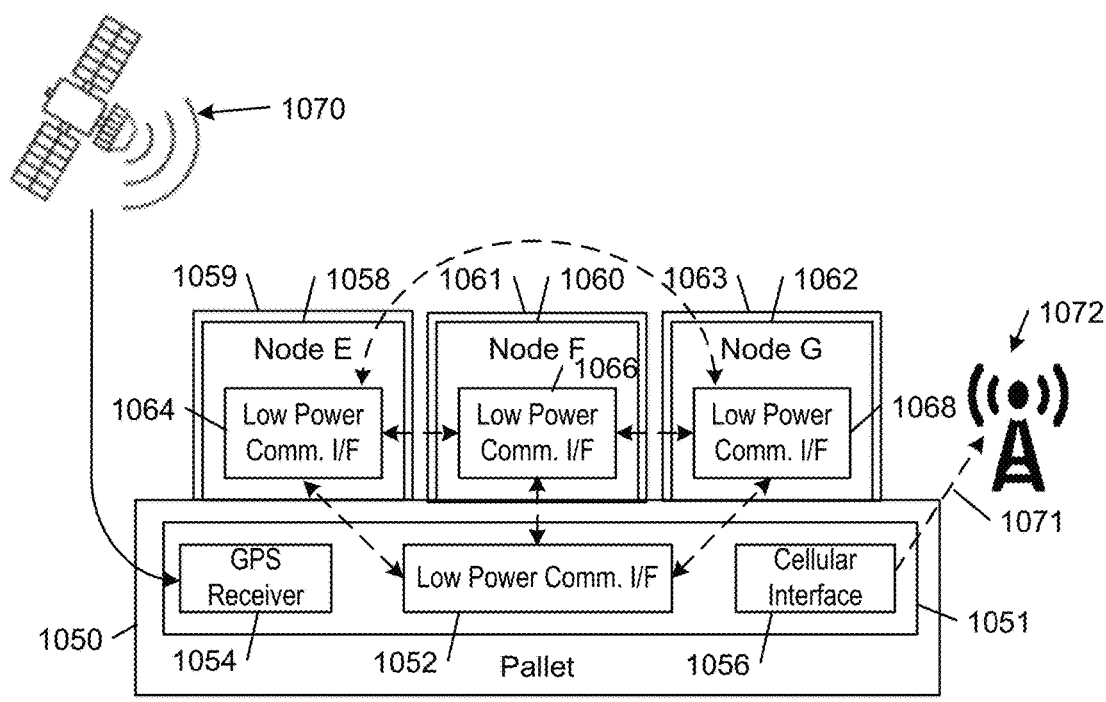
FIG. 10C shows a pallet associated with a master node that includes a low-power communications interface, a GPS receiver, and a cellular communications interface, in embodiments.

Referring to FIG. 10C, a pallet 1050 is associated with a master node 1051 that includes a low-power communications interface 1052, a GPS receiver 1054, and a cellular communications interface 1056. In some embodiments, the master node 1051 may be implemented as a tape node or a label node that is adhered to the pallet 1050. In other embodiments, the master node 1051 may be implemented as a non-tape node that is inserted within the body of the pallet 1050 or embedded in or otherwise attached to the interior or exterior of the pallet 1050.

The pallet 1050 provides a structure for grouping and containing packages 1059, 1061, 1063 each of which is associated with a respective peripheral node 1058, 1060, 1062 (Node E, Node F, and Node G). Each of the peripheral nodes 1058, 1060, 1062 includes a respective low power communications interface 1064, 1066, 1068 (e.g., Bluetooth Low Energy communications interface). In the illustrated embodiment, each of the nodes E, F, G, and the master node 1051 are connected to each of the other nodes over a respective low power communications path (shown by dashed lines).

In some embodiments, the packages 1059, 1061, 1063 are grouped together because they are related. For example, the packages 1059, 1061, 1063 may share the same shipping itinerary or a portion thereof. In an example scenario, the master pallet node 1051 scans for advertising packets that are broadcasted from the peripheral nodes 1058, 1060, 1062. In some examples, the peripheral nodes broadcast advertising packets during respective scheduled broadcast intervals. The master node 1051 can determine the presence of the packages 1059, 1061, 1063 in the vicinity of the pallet 1050 based on receipt of one or more advertising packets from each of the nodes E, F, and G. In some embodiments, in response to receipt of advertising packets broadcasted by the peripheral nodes 1058, 1060, 1062, the master node 1051 transmits respective requests to the server to associate the master node 1051 and the respective peripheral nodes 1058, 1060, 1062. In some examples, the master tape node requests authorization from the server to associate the master tape node and the peripheral tape nodes. If the corresponding packages 1059, 1061, 1063 are intended to be grouped together (e.g., they share the same itinerary or certain segments of the same itinerary), the server authorizes the master node 1051 to associate the peripheral nodes 1058, 1060, 1062 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1051 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1058, 1060, 1062 include environmental sensors for obtaining information regarding environmental conditions in the vicinity of the associated packages 1059, 1061, 1063. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1051 can determine its own location based on geolocation data transmitted by a satellite-based radio navigation system 1070 (e.g., GPS, GLONASS, and NAVSTAR) and received by the GPS receiver 1054 component of the master node 1051. In an alternative embodiment, the location of the master pallet node 1051 can be determined using cellular based navigation techniques that use mobile communication technologies (e.g., GSM, GPRS, CDMA, etc.) to implement one or more cell-based localization techniques. After the master node 1051 has ascertained its location, the distance of each of the packages 1059, 1061, 1063 from the master node 1051 can be estimated based on the average signal strength of the advertising packets that the master node 1051 receives from the respective peripheral node. The master node 1051 can then transmit its own location and the locations of the package nodes E, F, and G to a server over a cellular interface connection with a cellular network 1072. Other methods of determining the distance of each of the packages 1059, 1061, 1063 from the master node 1051, such as Received Signal-Strength Index (RSSI) based indoor localization techniques, also may be used.

In some embodiments, after determining its own location and the locations of the peripheral nodes, the master node 1051 reports the location data and the collected and optionally processed (e.g., either by the peripheral nodes peripheral nodes 1058, 1060, 1062 or the master node 1051) sensor data to a server over a cellular communication path 1071 on a cellular network 1072.

In some examples, nodes are able to autonomously detect logistics execution errors if packages that are supposed to travel together no longer travel together and raise an alert. For example, a node (e.g., the master node 1051 or one of the peripheral nodes 1058, 1060, 1062) alerts the server when the node determines that a particular package 1059 is being or has already been improperly separated from the group of packages. The node may determine that there has been an improper separation of the particular package 1059 in a variety of ways. For example, the associated peripheral node 1058 that is bound to the particular package 1059 may include an accelerometer that generates a signal in response to movement of the package from the pallet. In accordance with its intelligent agent program code, the associated peripheral node 1058 determines that the master node 1051 has not disassociated the particular package 1059 from the group and therefore broadcasts advertising packets to the master node, which causes the master node 1051 to monitor the average signal strength of the advertising packets and, if the master node 1051 determines that the signal strength is decreasing over time, the master node 1051 will issue an alert either locally (e.g., through a speaker component of the master node 1051) or to the server.

Figure 11:
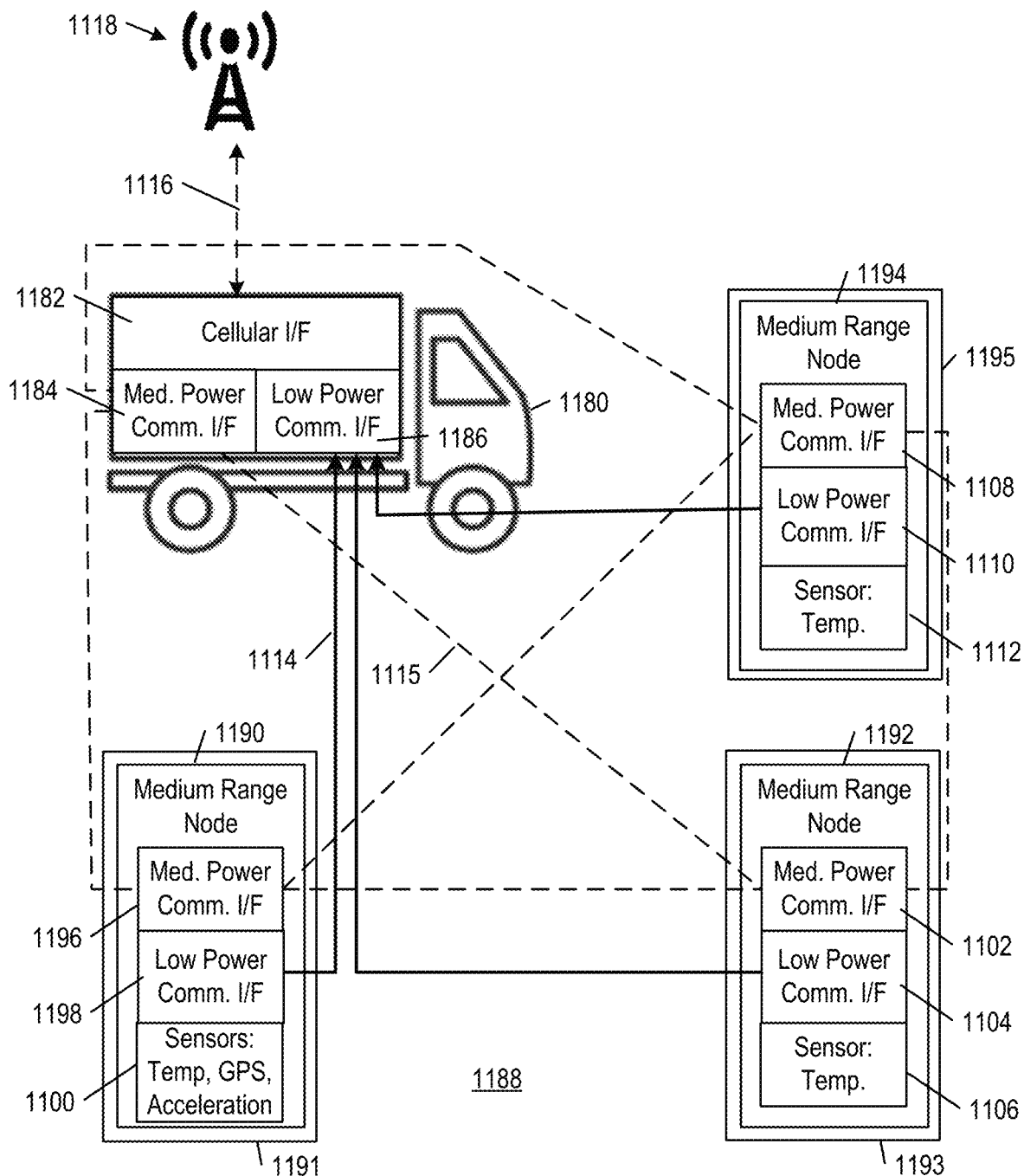
FIG. 11 is a schematic illustrating a truck configured as a mobile node, or mobile hub, with a cellular communications interface, a medium-power communications interface, and a low power communications interface, in embodiments.

FIG. 11 is a schematic illustrating a truck 1180 configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1194 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1115), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 12:
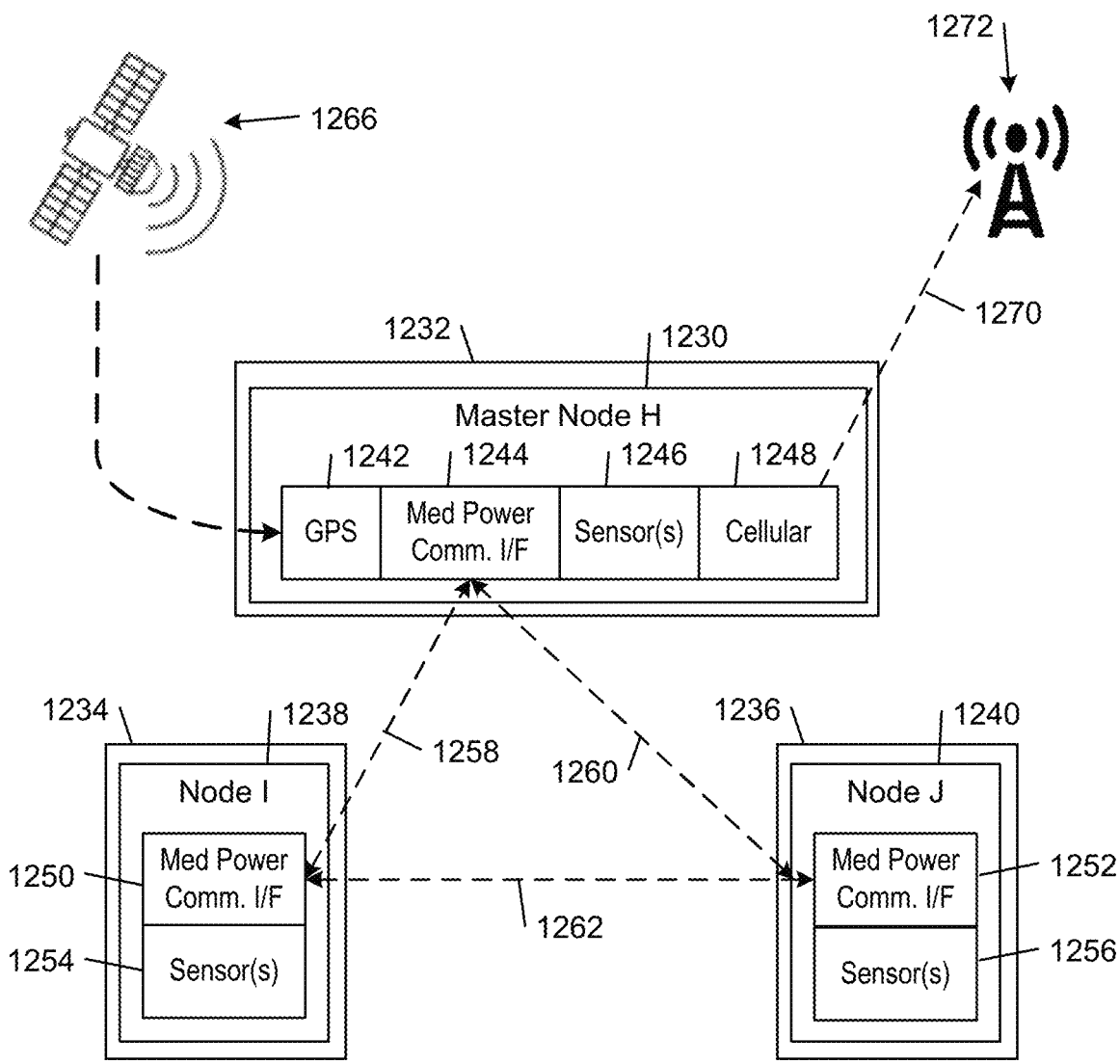
FIG. 12 is a schematic illustrating a master node associated with a logistic item that is grouped together with other logistic items associated with peripheral nodes, in embodiments.

FIG. 12 is a schematic illustrating a master node 1230 is associated with a logistic item 1232 (e.g., a package) and grouped together with other logistic items 1234, 1236 (e.g., packages) that are associated with respective peripheral nodes 1238, 1240. The master node 1230 includes a GPS receiver 1242, a medium power communications interface 1244, one or more sensors 1246, and a cellular communications interface 1248. Each of the peripheral nodes 1238, 1240 includes a respective medium power communications interface 1250, 1252 and one or more respective sensors 1254, 1256. In the illustrated embodiment, the peripheral and master nodes are connected to one another other over respective pairwise communications paths (shown by dashed lines). In some embodiments, the nodes 1230, 1238, 1240 communicate through respective LoRa communications interfaces over LoRa formatted communications paths 1258, 1260, 1262.

In the illustrated embodiment, the master and peripheral nodes 1230, 1238, 1240 include environmental sensors for obtaining information regarding environmental conditions in the vicinity of the associated logistic items 1232, 1234, 1236. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1230 periodically broadcasts advertising packets in the surrounding area. When the peripheral nodes 1238, 1240 are within range of master node 1230, and are operating in a listening mode, the peripheral nodes 1238, 1240 will extract the address of master node 1230 and potentially other information (e.g., security information) from the advertising packets. If, according to their respective programmatic code, the peripheral nodes 1238, 1240 determine that they are authorized to connect to the master node 1230, the peripheral nodes 1238, 1240 will attempt to pair with the master node 1230. In this process, the peripheral nodes 1238, 1240 and the master node 1230 determine each other's identities, capabilities, and services. For example, after successfully establishing a respective communication path 1258, 1260 with each of the peripheral nodes 1238, 1240 (e.g., a LoRa formatted communication path), the master node 1230 determines certain information about the peripheral nodes 1238, 1240, such as their identity information (e.g., peripheral nodes), their capabilities (e.g., measuring temperature data), and their services include transmitting temperature data to other nodes.

After establishing LoRa formatted communications paths 1258, 1260 with the peripheral nodes 1238, 1240, the master node 1230 transmits requests for the peripheral nodes 1238, 1240 to transmit their measured and/or locally processed temperature data to the master node 1230.

In the illustrated embodiment, the master node 1230 can determine its own location based on geolocation data transmitted by a satellite-based radio navigation system 1266 (e.g., GPS, GLONASS, and NAVSTAR) and received by the GPS receiver 1242 component of the master node 1230. In an alternative embodiment, the location of the master node 1230 can be determined using cellular based navigation techniques that use mobile communication technologies (e.g., GSM, GPRS, CDMA, etc.) to implement one or more cell-based localization techniques. After the master node 1230 has ascertained its location, the distance of each of the logistic items 1234, 1236 from the master node 1230 can be estimated based on the average signal strength of the advertising packets that the master node 1230 receives from the respective peripheral node. The master node 1230 can then transmit its own location and the locations of the package nodes H, J, and I to a server over a cellular interface connection with a cellular network 1272. Other methods of determining the distance of each of the logistic items 1234, 1236 from the master node 1230, such as Received Signal-Strength Index (RSSI) based indoor localization techniques, also may be used.

In some embodiments, after determining its own location and the locations of the peripheral nodes, the master node 1230 reports the location data, the collected and optionally processed (e.g., either by the peripheral nodes peripheral nodes 1238, 1240 or the master node 1230) sensor data to a server over a cellular communication path 1270 on a cellular network 1272.

Aircraft Galley Monitoring System

One aspect of the present embodiments incudes the realization that carts and carriers containing food and service items that are loaded into a galley of an aircraft are difficult to distinguish from one another. That is, these cars and carriers are standardized to fit within spaces of an aircraft galley and therefore look alike. Aircraft operators and flight attendants may find that units loaded onto the aircraft and not where they are expected to be, resulting in a search to find a cart or carrier containing a particular service item. The search may involve multiple gallies where the aircraft is so equipped. The present embodiments solve this problem by autonomously determining the location of each cart and carrier within the aircraft and displaying the location in a graphical user interface (GUI) of an application running on a mobile device (e.g., an app running on a tablet computer or a smartphone, etc.). A manifest defines carts and carriers assigned to each aircraft and may further define a location for each cart and carrier within the aircraft galley. Advantageously, the display may indicate any cart and/or carrier that is loaded incorrectly, and based on a manifest for the aircraft, may indicate missing and/or unexpected items.

Another aspect of the present embodiments includes the realization that line power is not ubiquitously available in an aircraft galley and that devices that connect to aircraft power are required to have certification that is costly to obtain. The present embodiments solve this problem by being battery powered and not requiring connection to aircraft electrical system. Advantageously, the installation is greatly simplified as compared to devices that required aircraft supplied electrical power.

Another aspect of the present embodiments includes the realization that it is undesirable to frequently replace batteries or devices within the aircraft galley or on the carts or carriers. The present embodiments solve this problem by using a detection protocol and a wireless protocol that minimized battery usage. Advantageously, in some of the disclosed embodiments, a battery life in excess of three years for tracking tape nodes and in excess of one year for tracked tape nodes is achieved using the methods and systems discussed herein.

Another aspect of the present embodiments includes the realization that there is not much space in an aircraft galley and therefore any tracking solution needs to be small. Advantageously, the adhesive tape nodes (e.g., segment 113 of FIG. 1, segment 640 of FIG. 6, etc.) described herein have a form factor that is favorable for use in small spaces, since each device is relatively thin and adheres easily to a flat surface.

The following examples illustrate asset tracking within an aircraft galley; however, the asset tracking may be performed in any area/storage location (e.g., a storage space, warehouse, etc.) without departing from the scope hereof. Moreover, the following examples discuss asset storage slots, but the term "slots" need not have any defined structural designation (e.g., a channel, cubby, or other separated position) and instead may be designated or defined\storage position or sub-area within a larger storage area/location.

Figure 13:
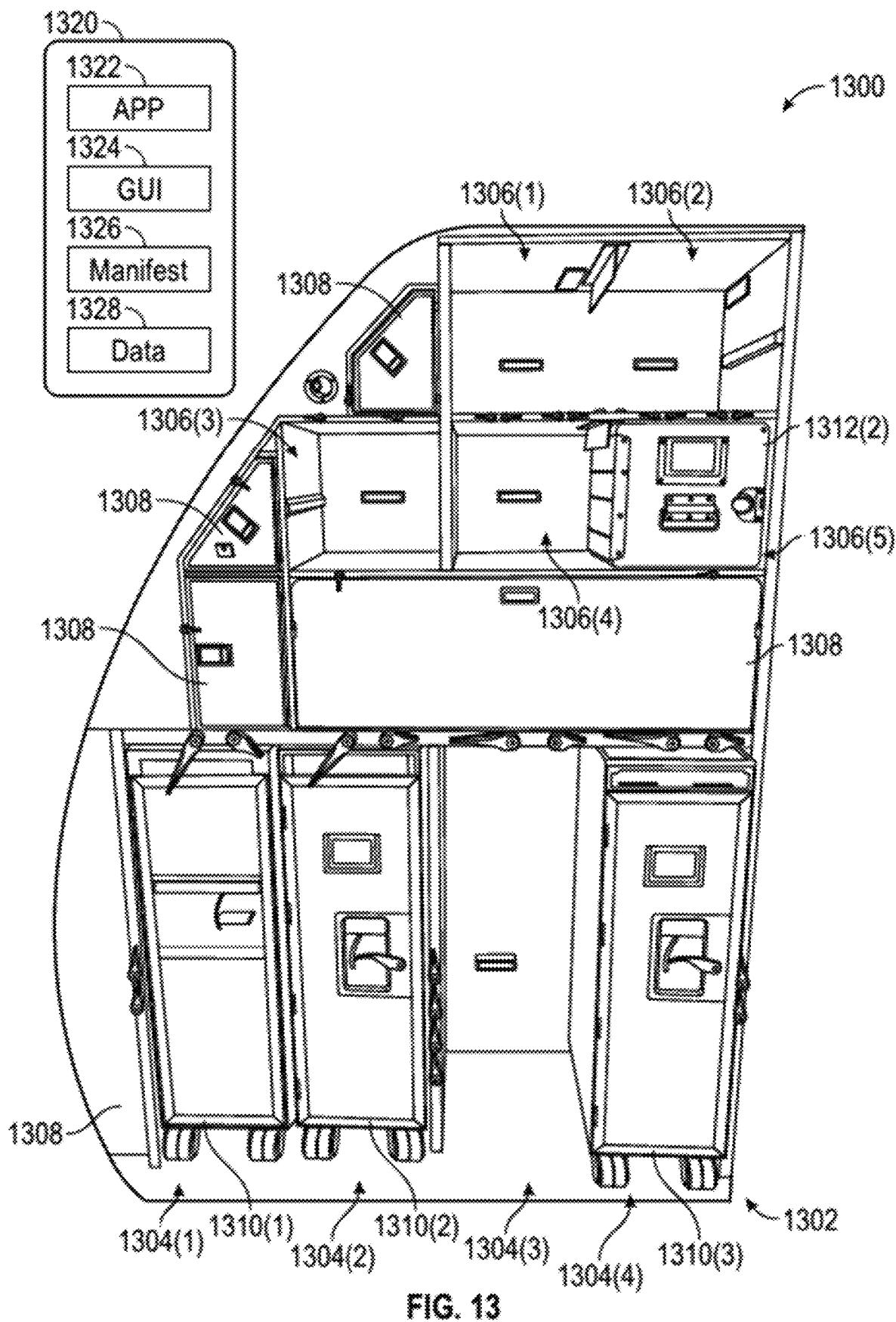
FIG. 13 is a schematic illustrating one example detection system for detecting carts and carriers loaded into an example aircraft galley, in embodiments.

FIG. 13 is a schematic illustrating one example detection system 1300 for detecting carts and carriers loaded into an example aircraft galley 1302, in embodiments. In the example of FIG. 13, galley 1302 includes four cart slots 1304, five carrier slots 1306, and non-cart/carrier storage areas 1308. Cart slots 1304 and carrier slots 1306 may also be referred to herein as asset slots. Galley 1302 may have more or fewer cart slots 1304 and/or more or fewer carrier slots 1306 without departing from the scope hereof. For example, certain aircraft may have asset slots for stowing eighty or more different carts 1310 (e.g., service trollies) and carriers 1312 containing food and service items (e.g., assets). Galley 1302 stores these carts 1310 and carriers 1312 in a compact arrangement, where carriers may be stacked on top of carts and/or other carriers, since galley 1302 does not have much space. Such confined spaces makes tracking of assets difficult. Where carts and/or carriers are stowed incorrectly (e.g., in the wrong cart slot or carrier slot or in the wrong galley), flight attendants may struggle to find certain assets. Further, until the cart or carrier is opened, the flight attendants may be unaware that they have been loaded incorrectly (e.g., loaded on the wrong aircraft, into the wrong galley, etc.). Thus, when carts and carriers are loaded incorrectly, due to misplacement or misloading, flight attendants may not have access to required resources (e.g., food, drinks, etc.).

In the example of FIG. 13, cart 1310(1) is secured in cart slot 1304(1), cart 1310(2) is secured in cart slot 1304(2), cart 1310(3) is partially in cart slot 1304(4), and carrier 1312(2) is in carrier slot 1306(5). Galley 1302 may have other configurations without departing from the scope hereof. For example, galley 1302 galley 1302 may have more or fewer cart slots 1304, more or fewer carrier slots 1306, and more or fewer non-cart/carrier storage areas 1308. Where an aircraft has multiple galleys, each galley may be different, and galleys may vary between aircraft types. Detection system 1300 is adaptable for installation in any galley configuration.

A mobile device 1320 (e.g., a tablet computer, a smart phone, etc.) may run an application 1322 (e.g., a app) that displays a GUI 1324 that indicates detected carts 1310 and carriers 1312 within galley 1302. GUI 1324 may graphically display correct and incorrect location of each cart 1310 and carrier 1312 within galley 1302 based upon comparing a manifest 1326 received for galley 1302 and the actual detected locations of the carts 1310 and carriers 1312 in the galley 1302.

In example of operation, application 1322 receives manifest 1326 from a server (e.g., via server 804 of network communications environment 800, FIG. 8) via a mobile gateway (e.g., mobile gateway 812). The application 1322 may alternatively receive manifest 1326 from a server via an internet connection of the mobile device 1320 (e.g., over cellular communications). In another example of operation, application 1322 receives manifest 1326 from a smart cone or smart pylon (see U.S. patent application Ser. No. 18/143, 452 incorporated herein by reference in its entirety) located at either a loading location of the delivery vehicle and/or at the aircraft. In another example of operation, application 1322 receives manifest 1326 from another device (e.g., a gateway node) located within the aircraft (e.g., within galley 1302), which may receive manifest 1326 from the server and/or a mobile gateway of the delivery vehicle.

In the following example, each cart slot 1304 and carrier slot 1306 has one tape node and each cart 1310 and carrier 1312 has one tape node. However, each cart slot 1304, carrier slot 1306, cart 1310, and carrier 1312, may have multiple tape nodes to improve sensitivity and reliability without departing from the scope hereof.

Figure 14:
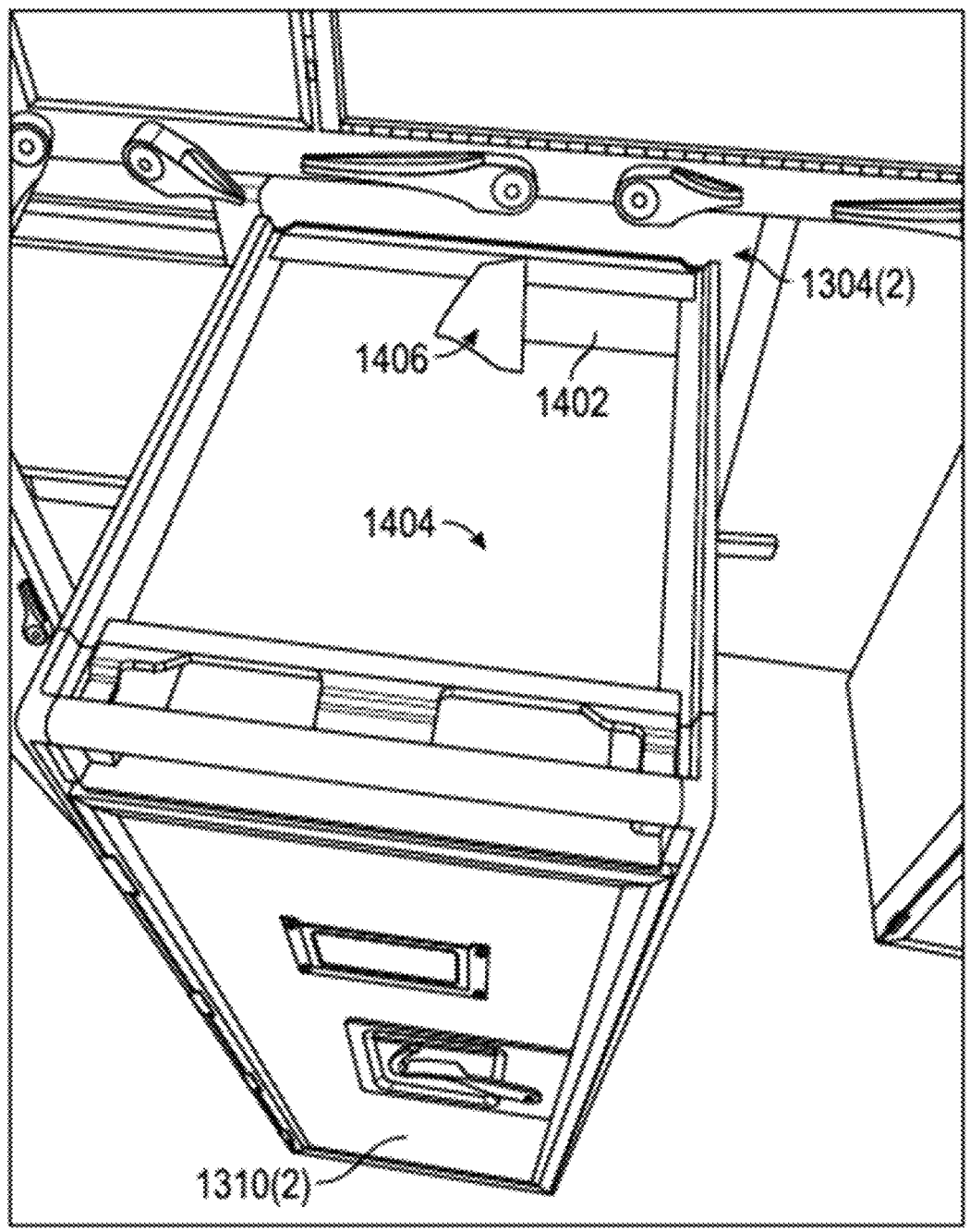
FIG. 14 illustrates one cart pulled out from the cart slot of the galley of FIG. 13, in embodiments.

FIG. 14 illustrates cart 1310(2) pulled out from cart slot 1304(2) of galley 1302 of FIG. 13 to show a tracked tape node 1402 positioned on a top surface 1404 of cart 1310(2) at a cart location 1406, in embodiments. Tracked tape node 1402 may also be referred to as a "sender" or "sending"

wireless node. Although not shown, a tracked tape node 1402 is also positioned on a top surface of carrier 1312 at a back corner location.

Figure 15:
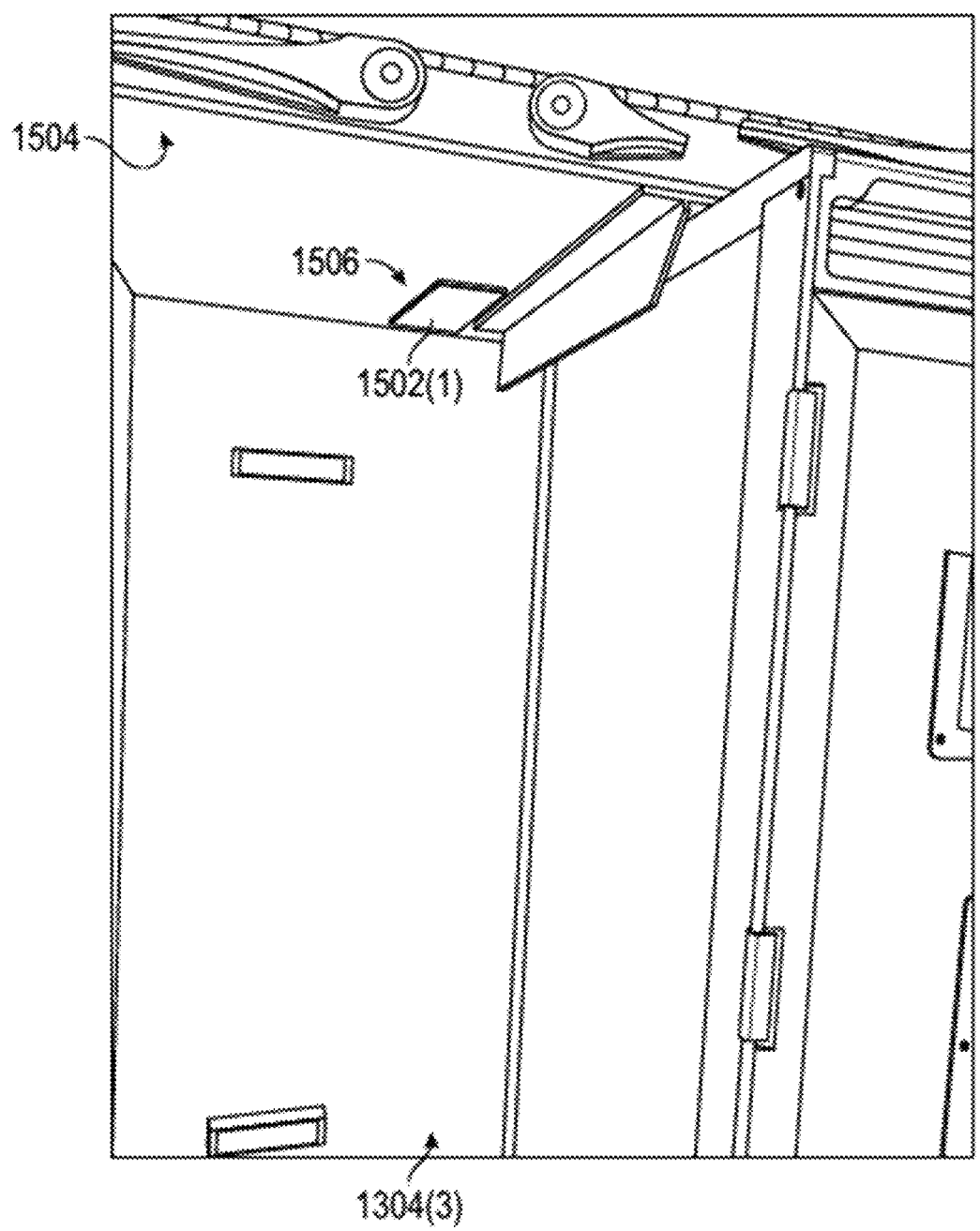
FIG. 15 shows a tracking tape node positioned on a ceiling of a cart slot at a cart-slot location, in embodiments.

FIG. 15 shows a tracking tape node 1502(1) positioned on a ceiling 1504 of cart slot 1304(3) at a cart-slot location 1506, in embodiments. Tracking tape node 1502 may also be referred to as a "reading" wireless node. Each cart slot 1304 has one tracking tape node 1502 positioned at a corresponding cart-slot location 1506 and each cart 1310 has one tracked tape node 1402 positioned at cart location 1406. Cart location 1406 and cart-slot location 1506 are chosen such that tracked tape node 1402 is adjacent (e.g., within a small distance such as two inches) tracking tape node 1502 when cart 1310 is positioned within cart slot 1304, and such that each tracked tape node 1402 and tracking tape node 1502 are easy to position (e.g., relative to a corresponding corner of cart slot 1304 and cart 1310) independently of each other with sufficient accuracy to allow detection system 1300 to operate with high detection reliability.

Figure 16:
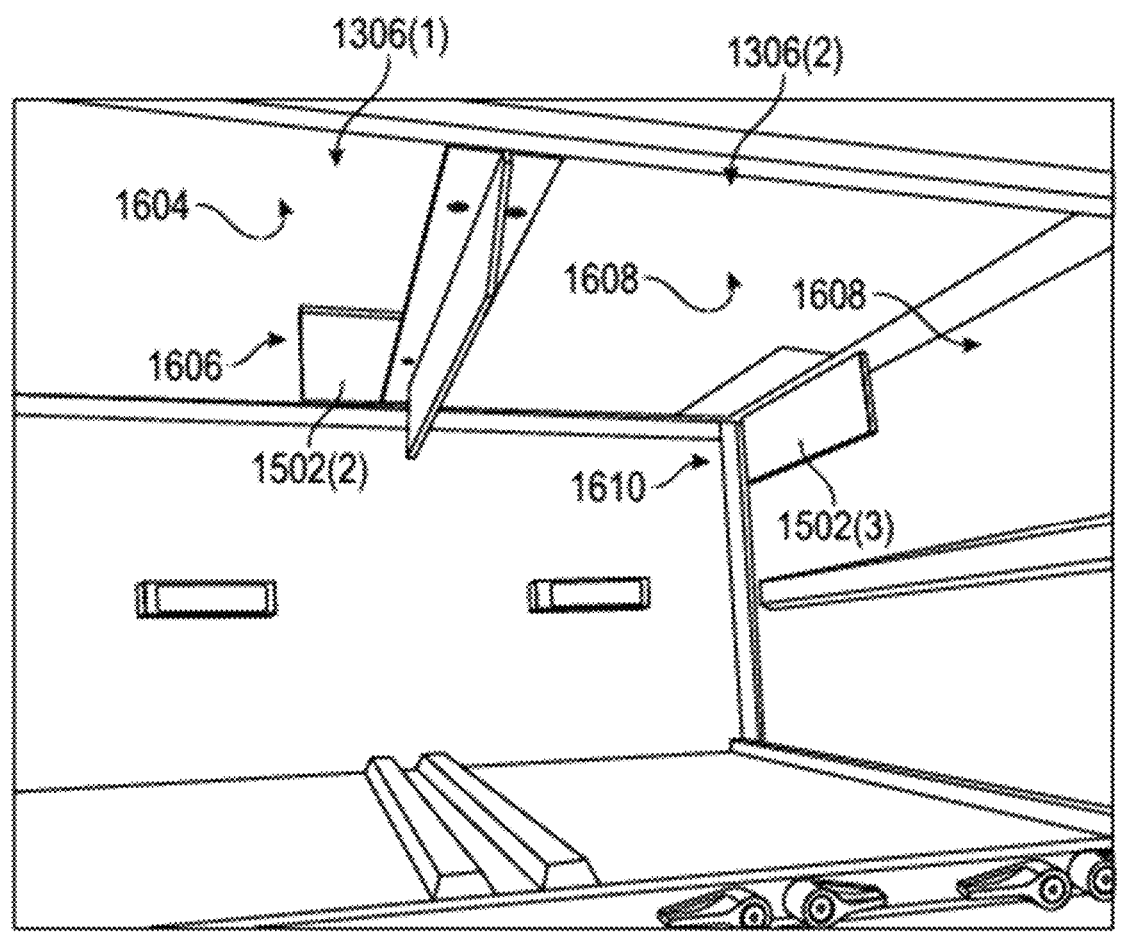
FIG. 16 illustrates the carrier slots of the galley of FIG. 13 in further example detail, in embodiments.

FIG. 16 illustrates carrier slots 1306(1) and 1306(2) of galley 1302 of FIG. 13 in further detail showing tracking tape node 1502(2) positioned on a ceiling 1604 of carrier slot 1306(1) at a carrier-slot location 1606 and tracking tape node 1502(3) positioned on a side-wall surface 1608 of carrier slot 1306(2) at a carrier-slot location 1610, in embodiments. Note that although tracking tape node 1502 (3) is positioned on side-wall surface 1608, carrier-slot location 1610 still detects wireless signals from a tracked tape node 1402 positioned on a top surface of carrier 1312.

It is noted that the ceiling 1504 is a preferred location for tracking tape node 1502 all slots of galley 1302 include a ceiling; however, certain slots may omit a side wall (e.g., no wall between cart slots 1304(1) and 1304(2), no side wall between cart slots 1304(3) and 1304(4), no side wall between carrier slots 1306(1) and 1306(2), and no side wall between carrier slots 1306(4) and 1306(5)).

Continuing with the example of FIG. 13, detection system 1300 is formed of nine tracking tape nodes 1502 positioned within galley 1302.

Battery Saving

As noted above, it is important that detection system 1300 is implemented to use battery power within the aircraft. However, in some embodiments, it is equally important that tracked tape node 1402 has an operational life of at least one year, and that each tracking tape node 1502 has an operational life of at least three years.

Figure 17A:
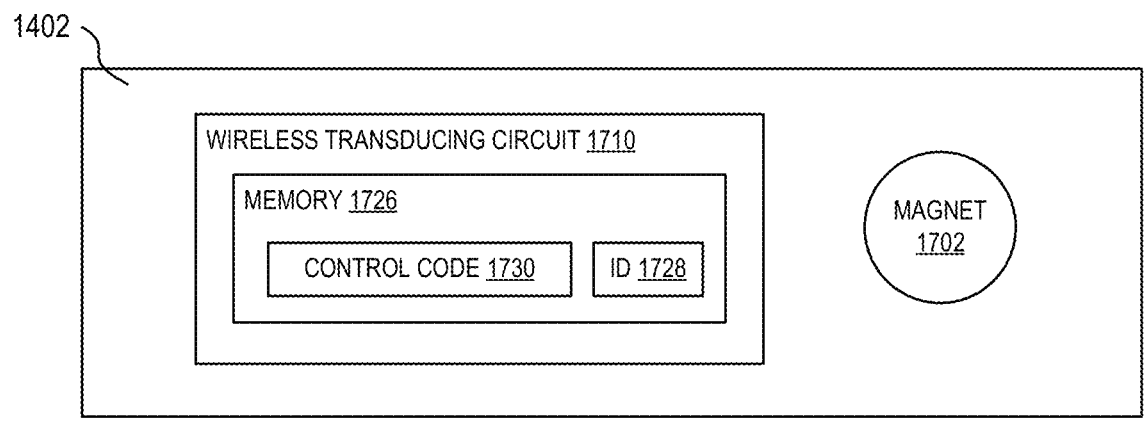
FIG. 17A shows tracked tape node of FIG. 14 in further example detail, in embodiments.
Figure 17B:
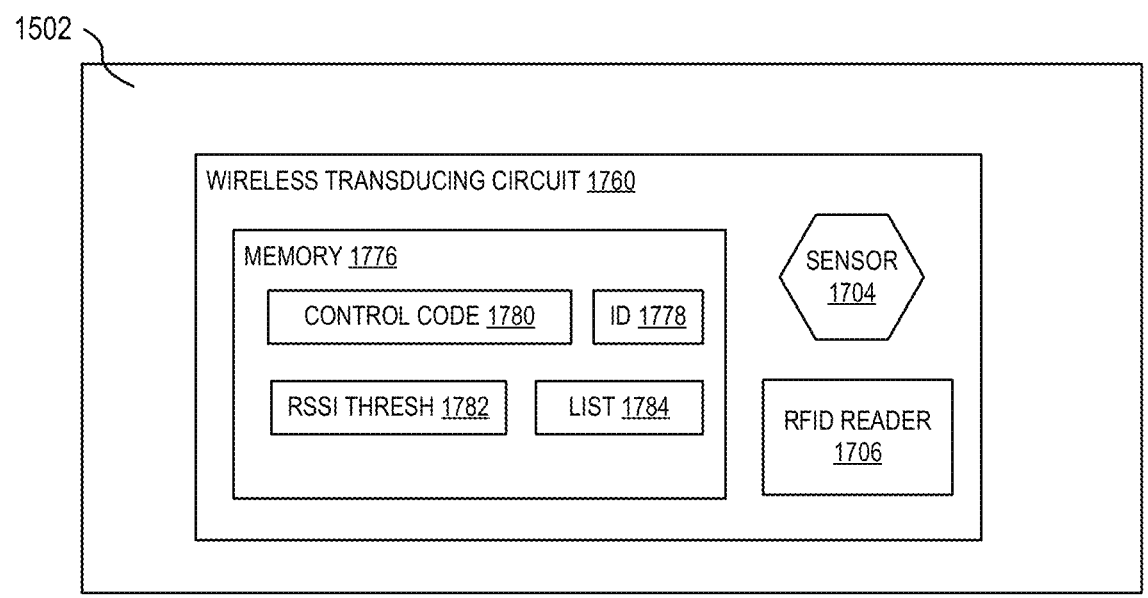
FIG. 17B shows the tracking tape node of FIG. 15 in further example detail, in embodiments.

FIG. 17A shows tracked tape node 1402 of FIG. 14 in further example detail, in embodiments. FIG. 17B shows tracking tape node 1502 of FIG. 15 in further example detail, in embodiments. FIGS. 17A and 17B are best viewed together with the following description.

Tracked tape node 1402 is an adhesive tape node that is similar to segment 113 of FIGS. 1 and 2 and segment 640 of FIG. 6. Tracked tape node 1402 includes a wireless transducing circuit 1710 that is similar to wireless transducing circuit 410 of FIG. 4 with low-power wireless-communication interface 652. Wireless transducing circuit 1710 includes memory 1726 with a unique ID 1728 and control code 1730 (e.g., machine-readable instructions executable by processor 420 of wireless transducing circuit 1710) that is configured to transmit a beacon (e.g., a wireless signal also known as a ping) at a reduced interval (e.g., more frequently) and at a reduced power level. The beacon incudes unique ID 1728 of tracked tape node 1402 and is relatively short to reduce battery power usage within tracked tape node 1402. Tracked tape node 1402 transmits the beacon at a lower power level and more frequently than conventional tape nodes described above. Tracked tape node 1402 further includes a permanent magnet 1702 that is polarized diametrically.

Tracking tape node 1502 is an adhesive tape node that is similar to segments 113 and 640 and includes a wireless transducing circuit 1760 that is similar to wireless transducing circuit 410 with low-power wireless-communication interface 652. In certain embodiments, tracking tape node 1502 may be a gateway node, such as mobile gateways 810 of FIG. 8. Tracking tape node 1502 also includes a magnetic sensor 1704 that is configured to detect the magnetic fields, such as magnetic fields resulting from a proximity to the magnet 1702, according to some embodiments. In further embodiments, magnetic sensor 1704 is a type of hall-effect sensor or hall-effect switch. In certain embodiments, magnetic sensor 1704 is a tri-axis hall-effect sensor within wireless transducing circuit 1760. Wireless transducing circuit 1760 includes memory 1776 with a unique ID 1778 and control code 1780 (e.g., machine-readable instructions executable by processor 420 of wireless transducing circuit 1760) that is configured to detect proximity of permanent magnet 1702 of tracked tape node 1402.

In certain embodiments, tracking tape node 1502 also includes an RFID reader 1706 that may be activated to detected RFID tags within a defined proximity of tracking tape node 1502. See for example patent application Ser. No. 17/873,072 and Ser. No. 7/931,518, each of which is incorporated herein in its entirety. For example, assets (e.g., individual service items, food, drinks, etc.) within cart 1310 and/or carrier 1312 may each include an RFID tag that may be detected by RFID reader 1706 and to provide a high resolution/high detail inventory of galley 1302. For example, the inventory may defines a location of each RFID tagged item within galley 1302.

When implemented as a hall-effect sensor, magnetic sensor 1704 uses very little power in operation and is continuously active to detect presence of permanent magnet 1702. Advantageously, wireless transducing circuit 1760 enters a low-powered state (e.g., a sleep state) to reduce battery usage and transitions to an operational state (e.g., awakened) when the magnetic sensor 1704 detects proximity of permanent magnet 1702. When tracking tape node 1502 is awakened, control code 1780 operates low-power wireless-communication interface 652 in a receive mode to scan for the beacon from tracked tape node 1402. Since the beacon is transmitted more frequently, low-power wireless-communication interface 652 operates to receive for relatively short period (e.g., 2-4 seconds, but configurable) to ensure all tracked tape nodes 1402 within wireless range are detected. This short receive period further reduces battery usage to increase the battery life of tracking tape node 1502.

In certain embodiments, tracking tape node 1502 does not "wake up" when it detects that a magnet is removed from proximity to the tracking tape node 1502, but overrides its reports or stored memory to indicate that no cart is currently loaded into the slot.

In another embodiment, tracking tape node 1502 wakes up for a predefined period when hall sensor detects presence of magnetic field from a permanent magnet, returning to the sleep mode at the end of the period after the last detected change in cart 1310 detected within cart-slot location 1506. When magnetic sensor 1704 detects the magnetic field diminishing or changing due to a magnet moving away from the tracking tape node 1502 (e.g., cart 1310 removed from cart-slot location 1506) tracking tape node 1502 awakens for a short period of time to detect changes. Similarly, tracking tape node 1502 returns to the sleep mode after a threshold period of time of not detecting changes in the state of cart-slot location 1506, in some embodiments. The transition between the sleep mode and the awakened state may be controlled by circuitry detecting changes (rise/fall) in the output of magnetic sensor 1704. Accordingly, tracking tape node 1502 implements battery management while being able to detect all changes within cart-slot location 1506.

In other embodiments, while magnetic sensor 1704 detects presence of magnet 1702, tracking tape node 1502 remains awake. When magnet 1702 moves away (e.g., cart 1310 removed from cart-slot location 1506), tracking tape node 1502 detects changes in status of cart-slot location 1506, optionally activating RFID reader 1706 to detect RFID presence, and then transitions to the sleep mode after a threshold period of time in steady state (e.g., 5 min without detecting changes). In further embodiments, tracking tape node 1502 scans and receives sensor data, tracking data, or other data from tracked tape node 1402 while cart 1310 is in cart-slot location 1506. For example, tracked tape node 1402 may detect and report temperature within carts 1310 (e.g., temperature of food) to tracking tape node 1502) or other sensor data, in embodiments where the tracked tape node 1402 includes a sensor integrated with the tracked tape node or receives sensor data from a sensor external to the tracked tape node 1402. This embodiment may sacrifice battery life to prioritize certain detection event, such as by continuously/periodically receiving data from tracked tape node 1402 and/or to ensure removal or addition of carts 1310 at cart-slot location 1506 is detected with certainty.

In certain embodiments, while magnetic sensor 1704 detects that permanent magnet 1702 is not present, tracking tape node 1502 transitions to or remains in the awakened state scanning for changes within cart-slot location 1506. When magnetic sensor 1704 detects a presence of permanent magnet 1702, tracking tape node 1502 scans for changes in the status of cart-slot location 1506 and may optionally activate RFID reader 1706 to detect presence of RFID tags. Tracking tape node 1502 transitions to the sleep mode when no changes are detected within a predefined period (e.g., 5 min without changes). This embodiment sacrifices battery life to prioritize certain detection event, such continuously/periodically receiving data from tracked tape node 1402 and/or to ensure removal or addition of carts 1310 at cart-slot location 1506 is detected with certainty.

When tracking tape node 1502 is scanning for tracked tape nodes 1402 (e.g., after being triggered by tri-axis hall-effect sensor 1704), control code 1780 adds each received beacon having an RSSI greater than a predefined RSSI threshold 1782 to a list 1784. Predefined RSSI threshold 1782 is determined based on the transmit signal strength of tracked tape node 1402 and a desired receive radius from tracking tape node 1502 for example. Particularly, predefined RSSI threshold 1782 allows control code 1780 to ignore beacons that are not near to tracking tape node 1502. Accordingly, list 1784 contains unique IDs 1728 and corresponding RSSI for each received beacon greater than predefined RSSI threshold 1782. Control code 1780 then sorts list 1784 based on RSSI from highest to lowest. Control code 1780 then controls low-power wireless-communication interface 652 to transmit a reporting beacon at a predefined interval (e.g., 500 ms) and for a predefined period (e.g., 4 seconds), where the reporting beacon includes unique ID 1778 of tracking tape node 1502 and contents of list 1784. In certain embodiments, the reporting beacon is included in a heartbeat signal transmitted at intervals by tracking tape node 1502. The heartbeat signal may be a lower power transmission that includes certain data indicative of an operational status of tracking tape node 1502. The heartbeat signal may also include unique ID 1778 of tracking tape node 1502, a Bluetooth identifier, and/or other unique identifying information.

Application 1322 controls mobile device 1320 to receive reporting beacons from tracking tape nodes 1502 substantially continuously such that application 1322 receives the lists of detected tracked tape nodes 1402 from each tracking tape node 1502 as they occur.

Application 1322 stores information from each received reporting beacon in a data structure 1328 defining tracking tape nodes 1502 and their locations (e.g., cart slots 1304 and carrier slots 1306) within galley 1302. Where a beacon is received by more than one tracking tape node 1502, application 1322 associates the tracked tape node to the tracking tape node with the highest RSSI, such that each tracked tape node 1402 is associated with a single location within galley 1302. Where the beacon from one tracked tape node 1402 is received with the same RSSI by two different tracking tape nodes 1502, application 1322 may highlight the associated cart 1310 or carrier 1312 in yellow within GUI 1324 such that the user of mobile device 1320 is aware of the discrepancy. Such discrepancies may occur when carts 1310 and/or carriers 1312 are not yet stowed within a cart slot or a carrier slot, or are in transit through galley 1302, and this would self-resolve when the carts and/or carriers are correctly stowed.

Application 1322 may process data structure 1328 at each update and/or upon request from the user to resolve discrepancies. Application 1322 generate GUI 1324 to display a graphical representations of galley 1302 indicating each cart slot 1304 and carrier slot 1306 as (a) green when tracked tape node 1402 detected by tracking tape node 1502 corresponding to that location matches received manifest 1326, (b) yellow when tracked tape node 1402 is detected at the same RSSI by two different tracking tape nodes 1502, and (c) red when no tracked tape node 1402 is detected by tracking tape node 1502 corresponding to that location or when the detected tracked tape node 1402 does not match received manifest 1326.

Figure 19:
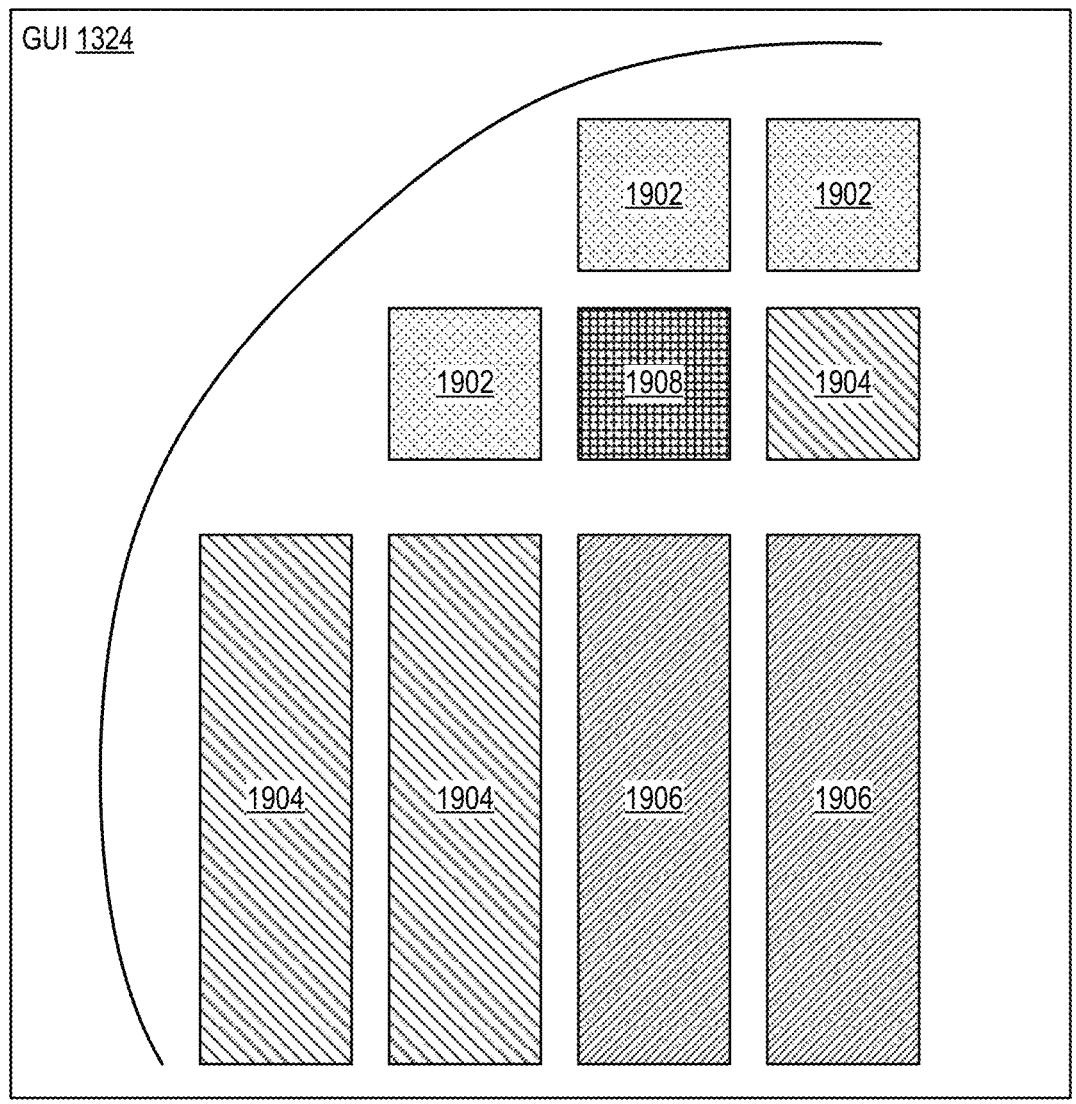
FIG. 19 shows the GUI of FIG. 13 in further example detail, in embodiments.

FIG. 18A shows manifest 1326 of FIG. 13 in further example detail, in embodiments. FIG. 18B shows data structure 1328 of FIG. 13 in further example detail, in embodiments. FIG. 19 shows GUI 1324 of FIG. 13 in further example detail, in embodiments. FIGS. 18A, 18B, and 19 are best viewed together with the following description. See FIG. 29 for an example screenshot of GUI 1324.

Manifest 1326 shows galley 1302 has five expected assets: three carts 1310(1)-1310(3) for cart slots 1304(1), 1304(2), and 1304(3) and two carriers 1312(1), 1312(2) for carrier slots 1306(4) and 1306(5), respectively. In this example, manifest 1326 defines an asset ID that corresponds to a unique ID of the tracked tape node 1402 attached to the asset and a location ID that corresponds to a unique ID of the tracking tape node 1502 positioned at that location within galley 1302. However, the relationship between the expected asset and the unique ID of the corresponding tracked tape node 1402 and/or the relationship between the galley location and the location ID of the tracking tape node 1502 positioned at that galley location may be define in one or more separate tables without departing from the scope hereof. For example, a separate table defining the relationship between tracked tape node 1402 and carts 1310 may be generated when each tracked tape node 1402 is attached to its assigned cart 1310. A separate table defining the relationship between tracking tape nodes 1502 and cart slots 1304 and carrier slots 1306 may be generates when tracking tape nodes 1502 are installed in galley 1302. Further, manifest 1326 may define locations IDs for all monitored locations within galley 1302 without departing from the scope hereof. For example, manifest 1326 may define the location ID of slots expected to be empty within galley 1302.

GUI 1324 is a graphical representation of galley 1302 that is easy for the user of mobile device 1320 to follow without requiring knowledge of identifies of tracked tape node 1402, identifiers for assets, or location identifier of tracking tape node 1502. GUI 1324 is easily assimilated to learn of asset discrepancies within galley 1302.

Continuing with this example, manifest 1326 indicates that cart slot 1304(4) and carrier slots 1306(1), 1306(2) and 1306(3) are expected to be empty. Data structure 1328 indicates that carrier slots 1306(1), 1306(2) and 1306(3) are empty and therefore application 1322 generates GUI 1324 to display the representative locations of carrier slots 1306(1), 1306(2) and 1306(3) in a neutral color 1902 indicative of empty. Although colors are used in the example of GUI 1324, symbols and/or other indications may be used without departing from the scope hereof. Manifest 1326 indicates that carts 1310(1) and 1310(2) are expected to be in cart slots 1304(1) and 1304(2) respectively, and that carrier 1312(2) is expected to be in carrier slot 1306(5). Data structure 1328 indicates that location IDs 000001, 000002, and 000009 includes asset IDs 001001, 001002, and 001005, respectively, which matches manifest 1326 and therefore application 1322 generates GUI 1324 to display corresponding galley locations in green 1904.

Data structure 1328 indicates that location ID 000004 contains asset ID 001003. However, manifest 1326 indicates that asset 001003 should be positioned at location ID 000003. Since asset ID 001003 is expected in galley 1002, but is located incorrectly, application 1322 generates GUI 1324 to indicate corresponding galley locations (e.g., cart slots 1304(3) and 1304(4) in yellow 1906.

Manifest 1326 indicates that asset 001004 should be stored at location ID 000008; however, data structure 1328 indicates that location ID 000008 is empty and that asset ID 001004 has not been positioned elsewhere within galley 1302. Accordingly, application 1322 generates GUI 1324 to shows location ID 000008 (e.g., carrier slot 1306(4)) in red 1908. Advantageously, the user of mobile device 1320 easily sees where carts and carriers are missing and where a cart or carrier is incorrectly located within galley 1302. Further, application 1322 may sent send an alert to a cloud service of detection system 1300 when assets are missing.

The example of FIGS. 13-18 shows galley 1302 as being formed at a portion of one bulkhead. However, galley 1302 may be of different shapes and sizes for different aircraft types and different types of galley. For example, galley 1302 may have cart slots 1304 and carrier slots 1306 formed in facing bulkheads, where each slot includes at least one tracking tape node 1502. Accordingly, GUI 1324 and data structure 1328 may represent cart slots 1304, carrier slots 1306, carts 1310, and carriers 1312 within a three dimensional representation of galley 1302. Similarly, an aircraft may have multiple gallies, whereby a mobile device 1320 and tracking tape nodes 1502 within each galley track tracked tape nodes 1402 independently.

Alternative Simplified Embodiments

In the above embodiments, slot level accuracy is achieved by fitting at least one tracking tape node 1502 in each cart slot 1304 and each carrier slot 1306 of galley 1302. However, where slot precision tracking is not required (e.g., where detecting carts 1310 and carriers 1312 as being either in, or not in, galley 1302, is sufficient), detection system 1300 may be implemented as described below.

Reduced Location Precision

Figure 20:
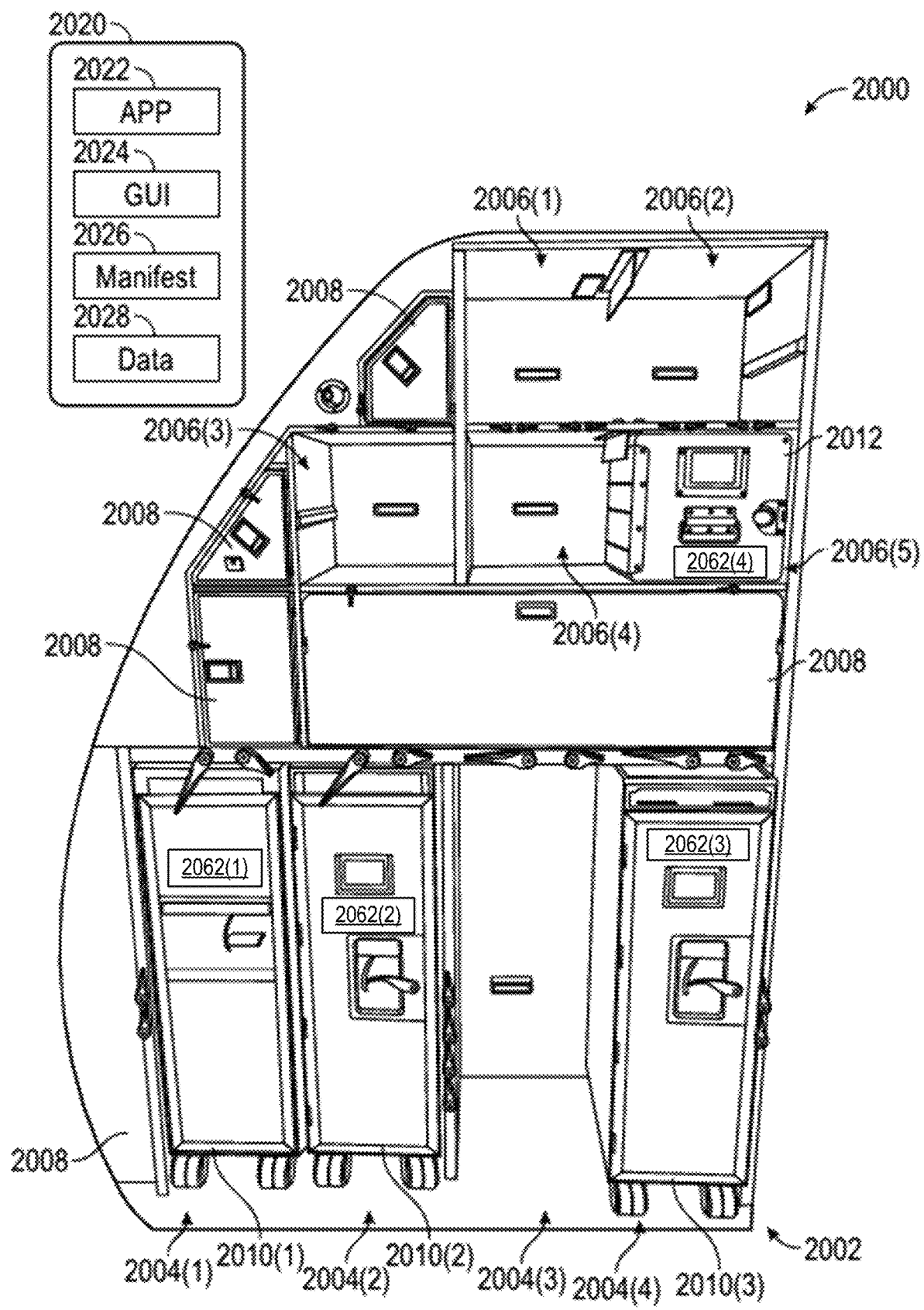
FIG. 20 is a schematic illustrating one example detection system for detecting carts and carriers loaded into an example aircraft galley, in embodiments.

FIG. 20 is a schematic illustrating one example detection system 2000 for detecting carts and carriers loaded into an example aircraft galley 2002, in embodiments. Detection system 2000 and aircraft galley 2002 are similar to detection system 1300 and galley 1302 of FIG. 13, and galley 2002 includes four cart slots 2004(1)-(4), five carrier slots 2006(1)-(5), and non-cart/carrier storage areas 2008. Galley 2002 is shown storing three carts 2010(1)-(3) that are similar to carts 1310 and one carrier 2012 that is similar to carrier 1312. Each cart 2010(1)-2010(3) includes at least one tracked tape node 2062(1)-2062(3), respectively, and carrier 2012 includes tracked tape node 2062(4). Tracked tape nodes 2062 are similar to tracked tape nodes 1402 but do not include magnet 1702. Further, control code of tracked tape nodes 2062 may be modified to transmit beacons at a higher power level than the power level of tracked tape node 1402 but at a greater interval (reduced frequency) as compared to tracked tape node 1402, in some embodiments. Installation of tracked tape nodes 2062 on carts 2010 and carriers 2012 is easier than with detection system 1300 because positioning of tracked tape nodes 2062 is less critical. For example, tracked tape nodes 2062 may be positioned on a front surface of carts 2010 and carriers 2012 as shown in FIG. 20.

Detection system 2000 also include a mobile device 2020 running an application 2022 that displays a GUI 2024. Application 2022 controls mobile device 2020 to receive beacons transmitted by tracked tape nodes 2062 and tracking tape nodes 1502 are omitted from detection system 2000. Mobile device 2020 is similar to mobile device 1320 and may be one of a tablet computer and a smart phone. Since it is likely that mobile device 2020 is charged frequently (e.g., at least daily) and operable for several hours at least on each charge, battery life of mobile device 2020 is of no concern. Application 2022 operates mobile device 2020 to substantially continuously receive beacons from tracked tape nodes 1402 within range and generates a data structure 2028 defining IDs and signal strengths of detected tracked tape nodes 2062. Accordingly, when located within galley 2002, mobile device 2020 detects beacons transmitted by tracked tape nodes 2062 located within galley 2002. In certain embodiments, a fixed gateway node (e.g., similar to master tape node 2252 of FIG. 22) is positioned within galley 2002 to receive data from nearby tracked tape nodes 1402 within galley 2002 and provides an aggregated report of detected tracked tape nodes 2062 within galley 2002 to mobile device 2020.

Application 2022 receives a manifest 2026 of carts 2010 and carriers 2012 (e.g., defining IDs of associated tracked tape nodes 2062) assigned to galley 2002, and application 2022 identifies discrepancies between detected tracked tape nodes 2062 and manifest 2026 that indicate missing or miss-placed (e.g., loaded into the wrong galley or aircraft) carts 2010 and/or carriers 2012 and unexpected carts 2010 and/or carriers 2012.

In one example of operation, mobile device 2020 travels to galley 2002 with carts 2010 and carriers 2012 on a transportation vehicle for example. However, mobile device 2020 may travel to galley 2002 independently of carts 2010 and/or carriers 2012. Application 2022 may determines its location based on detected tape nodes, and thereby determine when it is transferred from a transportation vehicle into galley 2002. For example, application 2022 may determine it is within the vehicle when able to detect a mobile gateway (e.g., mobile gateway 812 of FIG. 8) with a strong signal strength, and then detect a transfer to galley 2002 from the vehicle when the signal strength of the mobile gateway decreases. In certain embodiments, galley 2002 is fitted with a tape node (e.g., a tracked tape node 2062 adhered to a ceiling of galley 2002 and emitting a beacon) that when detected above a threshold signal strength by mobile device 2020 indicates that mobile device 2020 is within galley 2002. For example, each galley within an aircraft may include a permanently adhered tracked tape node 2062 such that mobile device 2020 may detect when it is in each galley.

Application 2022 controls mobile device 2020 to continuously receive (e.g., listen for) beacons from tracked tape nodes 2062. For each received beacon, application 2022 stores its unique ID, RSSI, and a receive time within data structure 2028. Over a short period (e.g., less than one minute) of being located within galley 2002, data structure 2028 is populated with data from tracked tape nodes 2062 that are also located within galley 2002. Where mobile device 2020 moves between multiple galleys on an aircraft, application 2022 may also store the galley location (e.g., front, middle, rear) of mobile device 2020 with the information detected from the received beacon. In certain embodiments, application 2022 determines its location based on a majority of tracked tape nodes 2062 most recently received and their indicates galley.

A user may interact with application 2022 to display a GUI 2024 indicative of carts 2010 and carriers 2012 detected within galley 2002, where GUI 2024 highlights discrepancies between manifest 2026 and data structure 2028. Application 2022 processes data structure 2028 based on one or both of (a) time and/or (b) RSSI to determine which carts 2010 and carriers 2012 are located within galley 2002. GUI 2024 may be similar to GUI 1324 based on defined positions of carts 2010 and carriers 2012 within manifest 2026; however, application 2022 does not indicate whether or not a detected cart 2010 and/or carrier 2012 is in the correct slot within galley 2002, but does indicate when a cart or carrier is missing from galley 2002 and when an unexpected carrier or cart is detected within galley 2002. For example, application 2022 indicates missing or miss-placed (e.g., loaded into the wrong galley or aircraft) carts 2010 and/or carriers 2012 and unexpected carts 2010 and/or carriers 2012 that are detected within galley 2002.

Synchronized Communication

Figure 21:
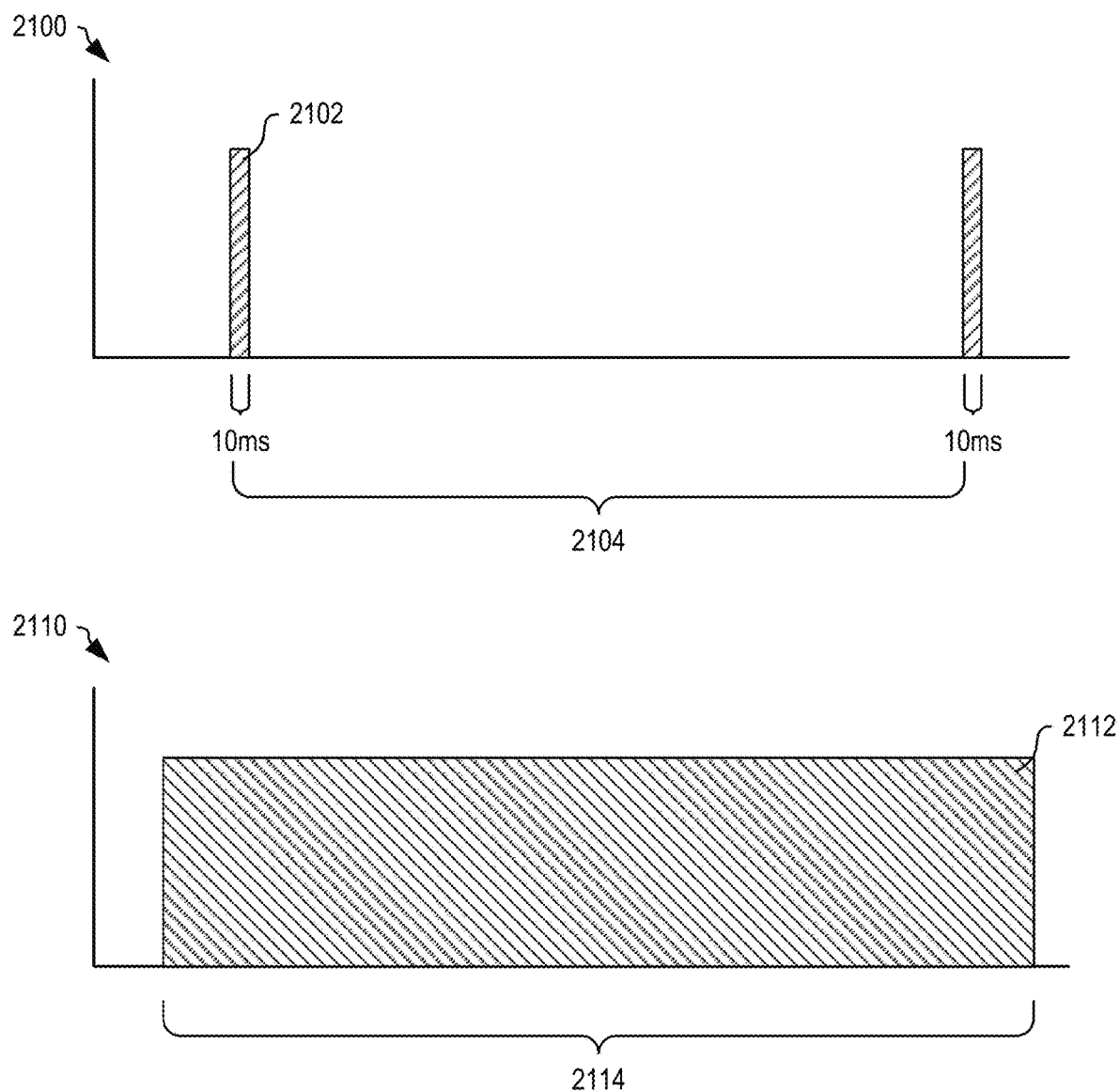
FIG. 21 shows two graphs illustrating exemplary timing of unsynchronized communication between the tracked tape nodes and the tracking tape nodes of the detection system of FIG. 20, in embodiments.

In the embodiment of FIGS. 13-19, communication between tracked tape nodes 1402 and tracking tape nodes 1502 is synchronized by magnetic sensor 1704 detecting permanent magnet 1702 and causing tracking tape node 1502 to implement a receive period, greater than a transmit interval of tracked tape node 1402, to receive the beacon from the tracked tape node. FIG. 21 shows two graphs illustrating exemplary timing of unsynchronized communication between tracked tape nodes 1402 and tracking tape nodes 1502 of detection system 1300 of FIGS. 13-19, in embodiments. A first graph 2100 shows beacons 2102 transmitted from tracked tape node 1402 at an interval 2104 and a second graph 2110 shows receiver activation 2112 of tracking tape node 1502 for a period 2114 as needed to ensure capture of at least one beacon 2102. To ensure that beacon 2102 is not missed by tracking tape node 1502, period 2114 is greater than interval 2104.

In certain embodiments, tracked tape node 1402 does not activate its receiver after receiving an initial configuration to maximize battery life. However, in certain embodiments, tracked tape node 1402 is configured with a receive interval (e.g., 5 minutes) and a receive period (e.g., one second), where the receive periods occur one every receive interval. During the receive period, tracked tape node 1402 activates its receiver to receive a command or setting configuration from a controlling device (e.g., tracking tape node 1502 and/or mobile device 1320/2020). For example, tracking tape node 1502 and/or mobile device 1320/2020 may transit a command for a period longer than the receive interval and receive period to ensure the command is received by tracked tape node 1402, whereby the command may adjust the interval between beacons of tracked tape node 1402 and/or a transmission power of tracked tape node 1402. Such beacon interval changes may be used to adjust operation of tracked tape node 1402 to a current environment and/or to reduce battery consumption of tracked tape node 1402 when changes are expected to be less frequent, thereby optimizing lifetime of tracked tape node 1402.

For a goal of detecting and validating carts 1310 and carriers 1312 within galley 1302 within fifteen seconds, for example, of the flight attendant interacting with application 1322, each tracking tape node 1502 is required to have its receiver (e.g., low-power wireless-communication interface 652, FIG. 6A) operable to receive for a significant amount of time to ensure beacons of tracked tape nodes 1402 are detected. To overcome this problem, and increase battery life of tracking tape nodes 1502, communication between tracked tape nodes 1402 and tracking tape nodes 1502 is synchronized as described below.

Figure 22:
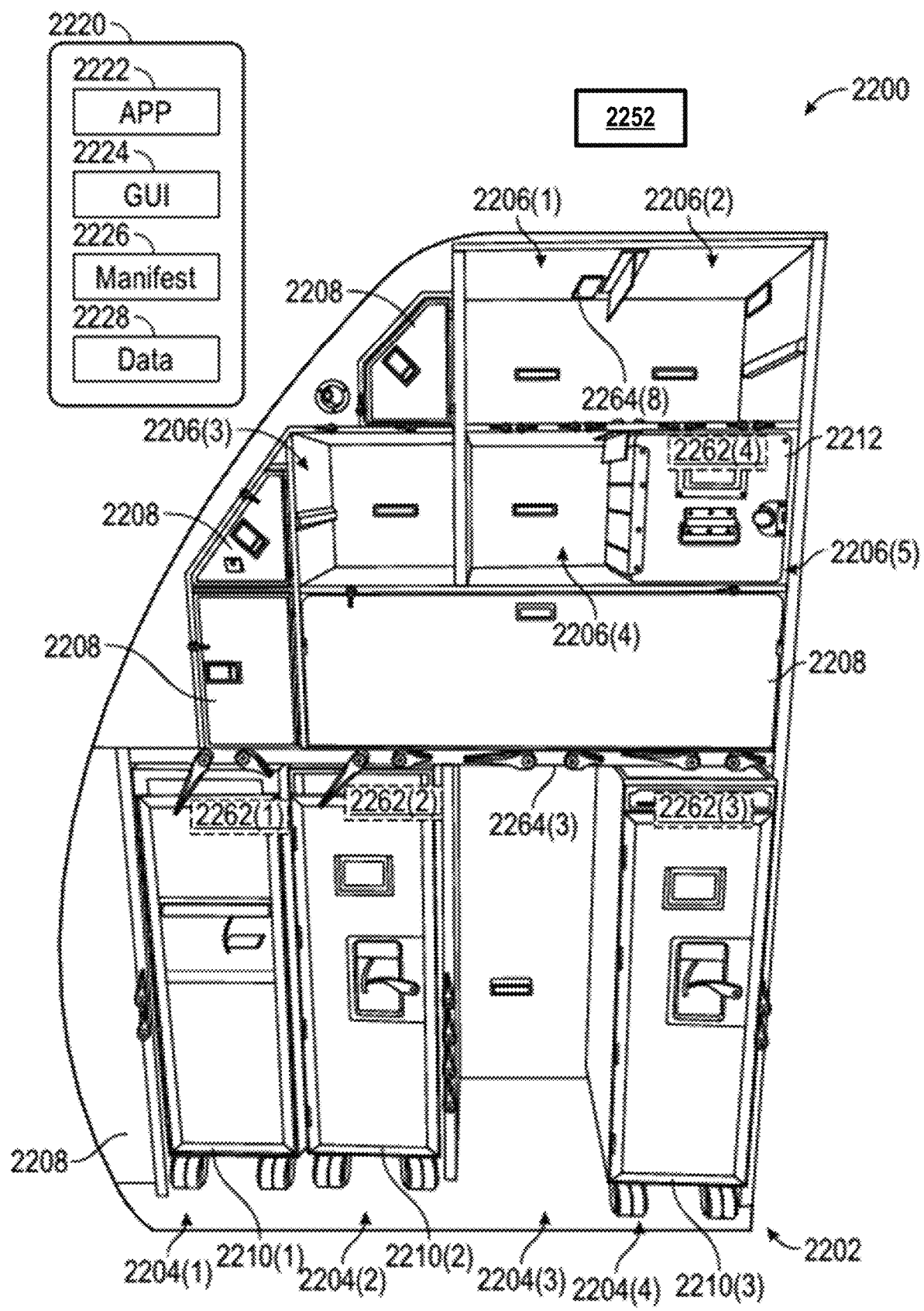
FIG. 22 is a schematic illustrating one example detection system with a master tape node that synchronizes communication between the tracked tape nodes and the tracking tape nodes, in embodiments.

FIG. 22 is a schematic illustrating one example detection system 2200, similar to detection system 1300 of FIG. 13, with a master tape node 2252 (e.g., also referred to as a "requesting wireless node" that may be similar to master tape node 1230 of FIG. 12, or an alternative form factor gateway node similar to gateway nodes 812/814 of FIG. 8) that synchronizes communication between tracked tape nodes 2262 and tracking tape nodes 2264, in embodiments. Master tape node 2252 is positioned somewhere in galley 2202, nearby galley 2202, or even positioned on a subset of the carts. Detection system 2200 and aircraft galley 2202 are similar to detection system 1300 and galley 1302 of FIG. 13, and implement similar protocols with the following modifications. Detection system 2200 provides precision location of assets within galley 2202 similarly to the location provided by detection system 1300.

Galley 2202 includes four cart slots 2204(1)-(4), five carrier slots 2206(1)-(5), and non-cart/carrier storage areas 2208. Galley 2202 is shown storing three carts 2210 and one carrier 2212 that are similar to carts 1310 and carrier 1312, where each cart 2210(1)-2210(3) includes at least one tracked tape node 2262(1)-2262(3), respectively, and carrier 2212 includes tracked tape node 2262(4). Tracked tape nodes 2262 are similar to tracked tape nodes 1402, FIG. 14 but do not include magnet 1702. Tracking tape nodes 2264 are similar to tracking tape node 1502 but do not include tri-axis hall-effect sensor 1704. Since accurate magnetic alignment between tracked tape nodes 2262 and tracking tape nodes 2264 is not required (e.g., magnets are not used to trigger tracking tape nodes 2264), precision placement of tracked tape nodes 2262 on carts and carriers and tracked tape nodes 2262 within cart slots and carrier slots is not required. Not all tracking tape nodes 2264 are shown in FIG. 22 for clarity of illustration.

Detection system 2200 also includes a mobile device 2220 running an application 2222 that displays a GUI 2224. Mobile device 2220 is similar to mobile device 1320 and may be one of a tablet computer and a smart phone. Application 2222 operates similarly to application 1322 to generate GUI 2224 to display accord and/or disaccord of detected carts 2210 and carriers 2212 with a received manifest 2226 and generates data structure 2228 indicative of detected carts 2210 and carriers 2212 within galley 2202. Master tape node 2252 synchronizes communication between tracked tape nodes 2262 and tracking tape nodes 2260 to improve battery life.

In certain embodiments, master tape node 2252 receives, from tracking tape nodes 2264, data of detected tracked tape nodes 2262, generates an inventory of detected carts 2210 within galley 2202, and sends the inventory to mobile device 2220.

In certain embodiments, mobile device 2220 acts as master tape node 2252 and master tape node 2252 is omitted. For example, synchronization between tracked tape nodes 2262 and tracking tape nodes 2264 is triggered by either (a) presence of mobile device 2220 within galley 2202 where application 2222 sends and receives synchronization signals, or (b) by manual operation of application 2222 on mobile device 2220 to validate inventory of detected carts 2210 and carriers 2212 within galley 2202. Where presence of mobile device 2220 within galley 2202 and operation of application 2222 is automated, latency in validation of inventory of galley 2202 may be reduced since the data may be collected prior to the validation being manually requested.

Figure 23:
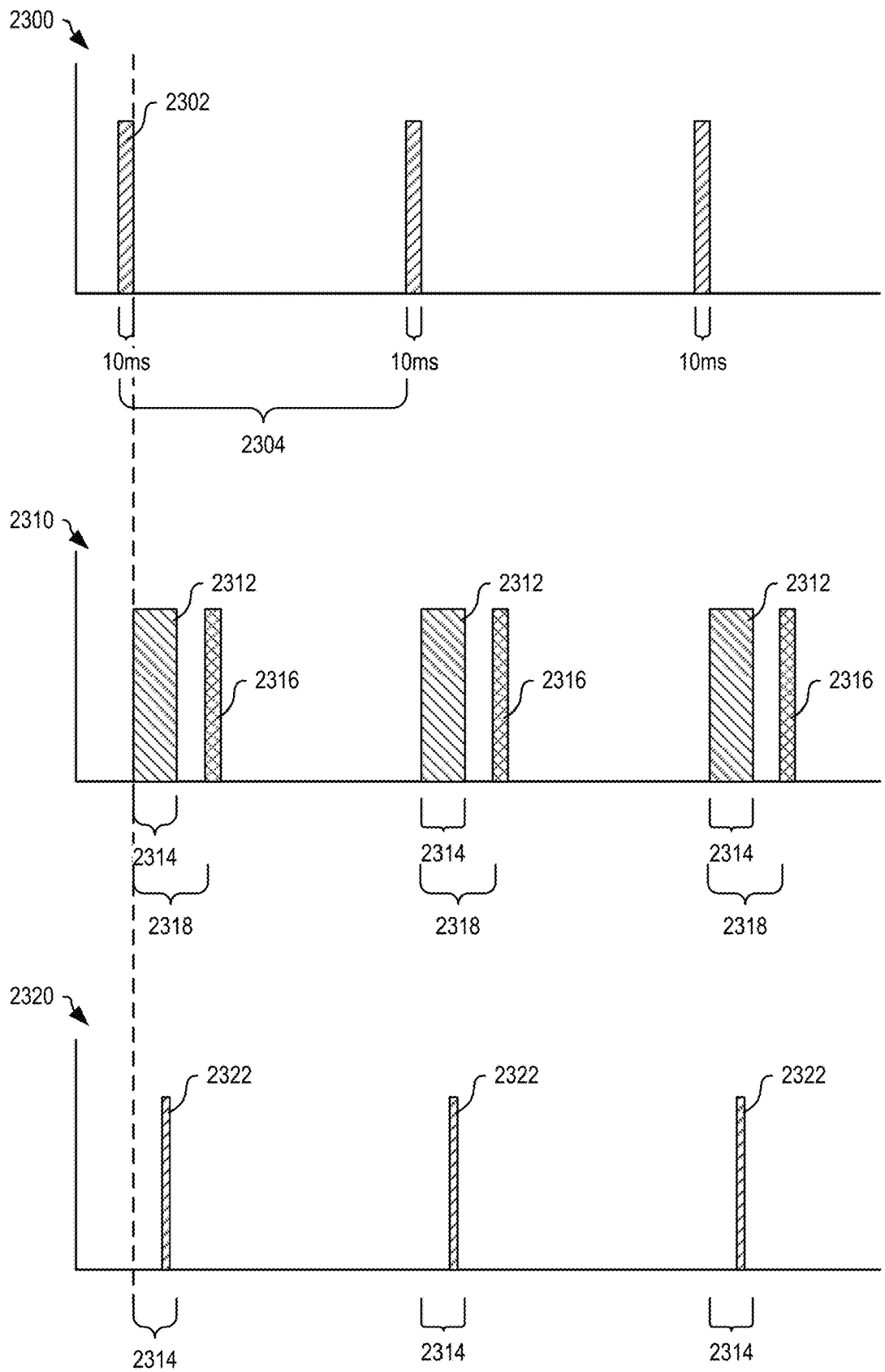
FIG. 23 shows three graphs illustrating exemplary timing of synchronized communication between the tracked tape nodes and the tracking tape nodes of the detection system of FIG. 22 as facilitated by the master tape node, in embodiments.

FIG. 23 shows three graphs illustrating exemplary timing of synchronized communication between tracked tape nodes 2262 and tracking tape nodes 2264 of detection system 2200 of FIG. 22 as facilitated by master tape node 2252, in embodiments. FIGS. 22 and 23 are best viewed together with the following description.

Graph 2300 shows a synchronization beacon 2302 transmitted by master tape node 2252 at a selected interval 2304. Interval 2304 may be adjusted by master tape node 2252 to conserve power within tracked tape nodes 2262 and tracking tape nodes 2264 based on user interaction with application 2222. Synchronization beacon 2302 may include information defining a next interval 2304.

Graph 2310 shows operation 2312 of a receiver of each tracking tape node 2264 for a period 2314 (e.g., 30 ms) immediately following the end of synchronization beacon 2302. For example, each tracking tape nodes 2264 is configured to activate its receiver to receive synchronization beacon 2302 and information on interval 2304. Tracking tape nodes 2264 may deactivate their receiver after period 2314 until immediately prior to a subsequent synchronization beacon 2302, thereby reducing power usage. Period 2314 is significantly shorter than period 2114 of FIG. 21 and thus power consumption of tracking tape node 2264 is reduced as compared to power consumption of tracking tape node 1502.

Graph 2320 shows a beacon 2322 transmitted from tracked tape node 2262 that is positioned by tracked tape nodes 2262 to occurs within period 2314. Each tracked tape node 2262 is configured to receive synchronization beacon 2302 from master tape node 2252 and to transmit its own beacon 2322 within subsequent period 2314 (e.g., during operation 2312 of the receivers of tracking tape nodes 2264). After first detecting synchronization beacon 2302 and receiving information of a subsequent interval 2304 for example, tracked tape node 2262 deactivates its receiver (e.g., enters a lower power mode) until immediately prior to the expected next synchronization beacon 2302.

Each tracking tape node 2264 may transmit its tracking beacon 2316 after a period 2318 such that it may be received by mobile device 2220 and processed as described above.

Once an initial synchronization beacon 2302 is received, each tracked tape node 2262 and tracking tape node 2264 uses an internal clock to determine when to awaken and receive a subsequent synchronization beacon 2302, where synchronization beacon 2302 includes information of a subsequent interval 2304. Master tape node 2252 may communicate with application 2222 running on mobile device 2220 to receive instructions on changing interval 2304 based on activity of the user and/or a status of detection system 2200. For example, application 2222 may instruct master tape node 2252 to reduce interval 2304 when application 2222 detects that galley 2202 is being loaded with assets and may instruct master tape node 2252 to increase interval 2304 after the user has validated the loaded assets. However, other criteria may also be used to change interval 2304 without departing from the scope hereof.

Master tape node 2252 is more power hungry than tracked tape node 2262 and tracking tape node 2264, but since there is only one per galley, it is easier and more cost effective to service than tracking tape nodes 2264. Master tape node 2252 may be line powered from the aircraft, however this is both difficult and unnecessary.

Alternative Communication Protocol with Two Tape Nodes

One aspect of the present embodiments includes the realization that the communication protocol of FIGS. 22 and 23 causes the tracking tape nodes 2264 to search for tracked tape nodes 2262 irrespective of whether the information is needed. Thus, battery power of tracking tape nodes 2264 is being expected unnecessarily. The present embodiments solve this problem by activating tracking tape nodes 2264 only when asset tracking is likely needed. For example, after assets have been loaded into the galley, it is likely that a flight attendant will want to validate the inventory against the manifest for the aircraft. There is no reason to track and evaluate assets within galley when not needed.

Alternative Communication Sequence

In an embodiment that is similar to detection system 2200 of FIG. 22, but 2264 is modified to include a low power state that reduces power used by tracking tape nodes 2264. In this embodiment, tracked tape nodes 2262 are not modified and continue to transmit beacon 2102 (FIG. 21) as previously described.

Figure 24:
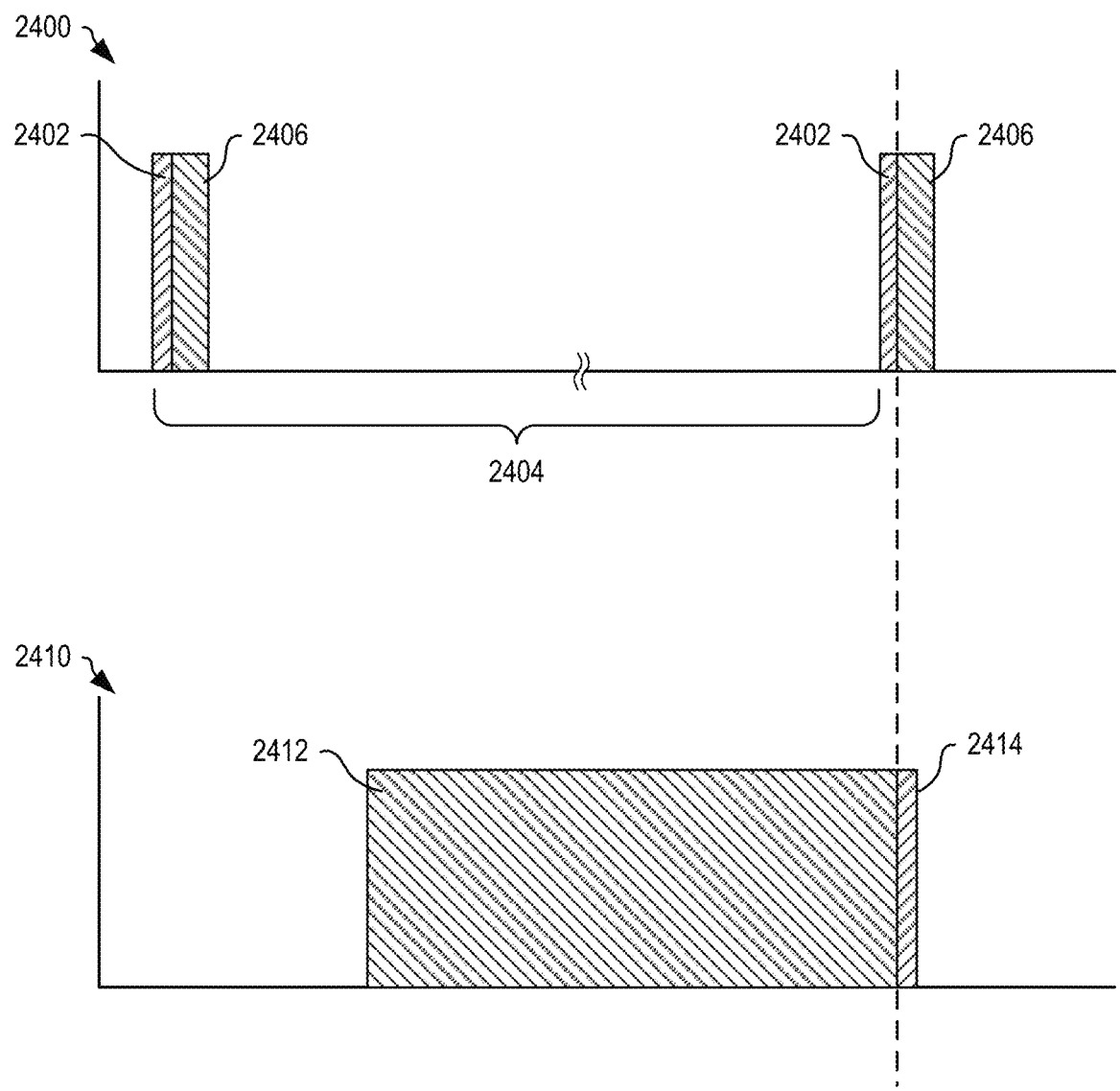
FIG. 24 shows a first graph illustrating transmission of a beacon at an interval by the tracking tape node of FIG. 22 when in a low power state, in embodiments.

FIG. 24 shows a first graph 2400 illustrating transmission of a beacon 2402 at an interval 2404 by tracking tape node 2264 in this low power state, in embodiments. In one example of operation, beacon 2402 transmits 10 ms beacon 2402 and interval 2404 is one minute. Interval 2404 may be longer or shorter without departing from the scope hereof, but interval 2404 is longer than interval 2304 of FIG. 23. Immediately after transmission of beacon 2402, tracking tape nodes 2264 cause a receiver activation 2406 for a relatively short period (e.g., Tracking tape node 2264 ignores beacons from tracked tape nodes 2262 in this low power state. Since interval 2404 is relatively long and durations of beacon 2402 and receiver activation 2406 are relatively short, power used by tracking tape nodes 2264 is relatively low, thereby extending the battery life of tracking tape nodes 2264.

Graph 2410 shows master tape node 2252 (or mobile device 2220) transitioning tracking tape nodes 2264 to an active state where beacons from tracked tape nodes 2262 are detected. Graph 2410 shows a receiver activation 2412 by master tape node 2252 until beacon 2402 from tracking tape nodes 2264 is received. Mobile device 2220 may activate is receiver for a period longer than interval 2404 to ensure detection of 2406. When beacon 2402 is received, master tape node 2252 immediately transmits a directive 2414 instructing tracking tape node 2264 to transition to an active state. Master tape node 2252 receives directive 2414 during receiver activation 2406 and changes from low-power state to an active state. Master tape node 2252 may transition all tracking tape nodes 2264 to an active state using this method, repeating its receiver activation 2412 as needed.

In the active state, tracking tape node 2264 operates as described above, activating its receiver for at least period 2114 such that beacons 2102 of any tracked tape nodes 2262 within range are received and creates a list of information from received beacons 2102. Tracking tape nodes 2264 transmits a beacon (e.g., beacon 2316, FIG. 23), containing its ID and the list, which may be received by mobile device 2220. After a predefined period (e.g., 10 minutes, 30 minutes, 1 hour, etc.) tracking tape nodes 2264 may transition back to the low-power state. In certain embodiments, mobile device 2220 may send a directive instructing tracking tape nodes 2264 to transition to the low-power state when data structure 2228 is complete.

Application 2222 may communicate with master tape node 2252 to instruct master tape node 2252 to coordinate an inventory of assets (e.g., carts 2210 and carriers 2212) within galley 2202 as needed.

Advantageously, tracking tape nodes 2264 only capture beacons from tracked tape nodes 2262 when needed (e.g., not on a schedule or interval basis), thereby saving battery power when inventory within galley 2202 is not needed. Another way of understanding this embodiment, is that master tape node 2252 reprograms each tracking node 2264 when inventory within galley 2202 is required. In this embodiment, the interval between beacons from tracked tape nodes 2262 may be increased, and the duration of receiver activation (e.g., period 2114) of each tracking tape nodes 2264 increased to ensure that the beacons from tracked tape nodes 2262 are received, since the receive state is not being performed continually. This coordination of master tape node 2252 with tracking tape nodes 2264 and tracked tape nodes 2262 may be referred to as "local orchestration of wireless nodes."

In certain embodiments, master tape node 2252 may be omitted and this described functionality performed by application 2222 running on mobile device 2220. In another embodiment, master tape node 2252 may be omitted and this described functionality performed by application 2222 running on a smart phone of a flight attendant. In certain embodiments, master tape node 2252 may have a similar or reduced battery life as compared to tracked tape nodes 2262 and tracking tape nodes 2264. Master tape node 2252 may have a larger battery than tracked tape nodes 2262 and tracking tape nodes 2264 and thereby a longer battery life. In certain embodiments, master tape node 2252 may be line powered.

In certain embodiments, the inventory request of master tape node 2252 may be triggered by an external source, such as one or more of user input to a button of master tape node 2252, NFC interaction with master tape node 2252, sensed ambient characteristics (e.g., one or more of temperature, movement, sounds, vibrations, etc.), and energy harvesting.

Energy Harvesting as a Trigger

In certain embodiments, one or both of tracked tape nodes 2262 and tracking tape nodes 2264 do not include a single use battery, but instead each includes a rechargeable power storage (e.g., one or more of a rechargeable battery, a capacitor, a super capacitor, etc.) that is charged by energy harvesting (e.g., solar, harvesting electromagnetic waves, such as Wi-Fi). Advantageously, since there is no single use battery that to be exhausted, tracked tape nodes 2262 and tracking tape nodes 2264 may operate using harvested energy without requiring replacement due to exhausted batteries.

Figure 25:
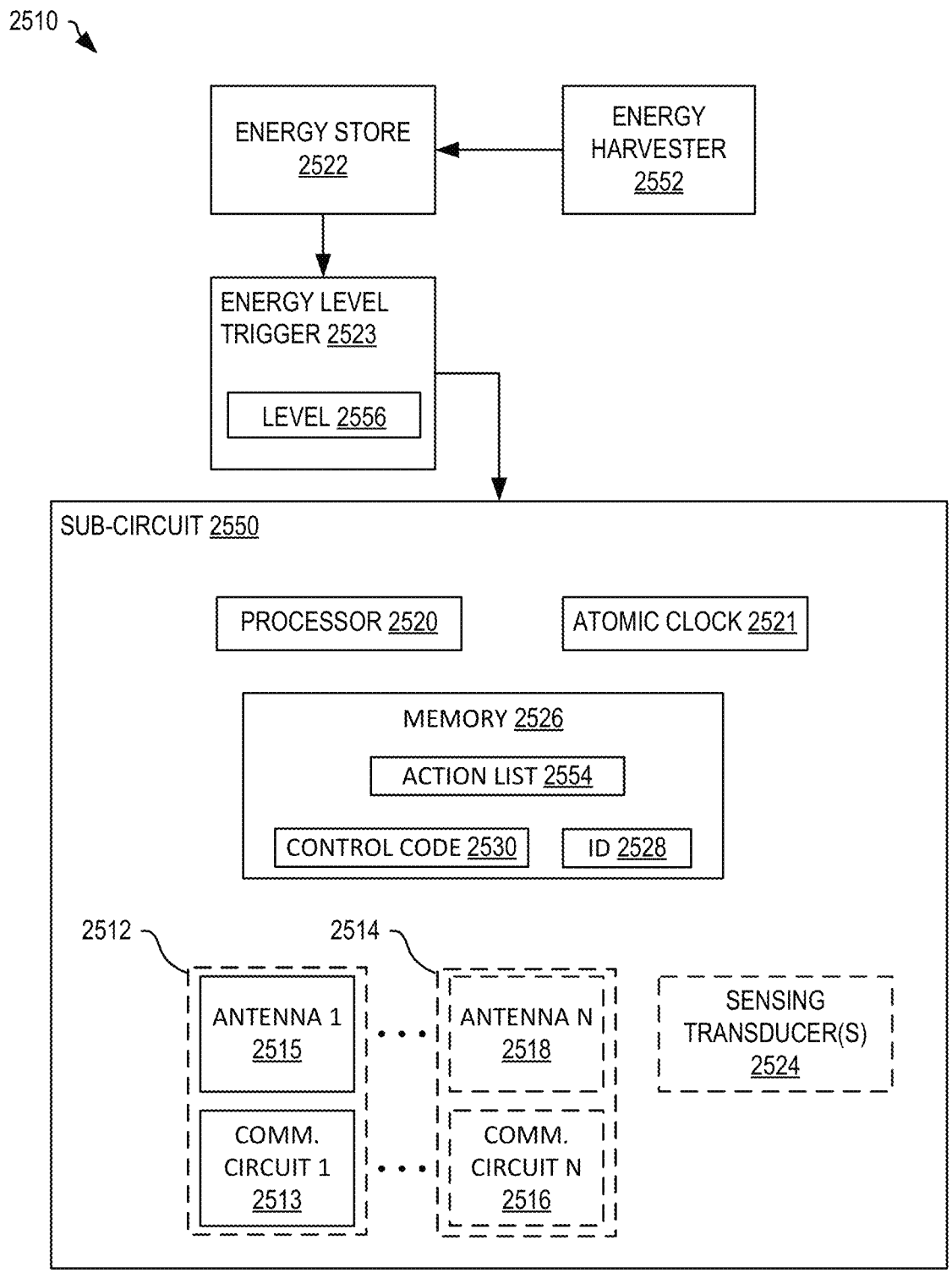
FIG. 25 is a block diagram illustrating components of an example wireless transducing circuit implementing energy harvesting, in embodiments.

FIG. 25 is a block diagram illustrating components of an example wireless transducing circuit 2510 implementing energy harvesting, in embodiments. Wireless transducing circuit 2510 may represent circuitry of one or more of tracked tape node 1402 of FIG. 14 and tracking tape node 1502 of FIG. 15) when configured for energy harvesting.

Wireless transducing circuit 2510 is similar to wireless transducing circuit 410 of FIG. 4 and includes one or more wireless communication modules 2512, 2514, each having a wireless communication circuit 2513, 2516, and an antenna 2515, 2518, respectively. Each wireless communication circuit 2513, 2516 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 2510 also includes a processor 2520 (e.g., a microcontroller or microprocessor), a solid-state atomic clock 2521, at least one energy store 2522 (e.g., a rechargeable printed flexible battery, and/or a super capacitor or charge pump), and one or more sensing transducers 2524 that are similar to sensing transducers 424.

Wireless transducing circuit 2510 includes a memory 2526 for storing data, such as profile data, state data, event data, sensor data, localization data, security data, and/or at least one unique identifier (ID) 2528 associated with the wireless transducing circuit 2510, such as one or more of a product ID, a type ID, and a media access control (MAC) ID. Memory 2526 may also store control code 2530 that includes machine-readable instructions that, when executed by the processor 2520, cause processor 2520 to perform one or more autonomous agent tasks as described herein. In certain embodiments, the memory 2526 is incorporated into one or more of the processor 2520 or sensing transducers 2524. In other embodiments, memory 2526 is integrated in the wireless transducing circuit 2510 as shown in FIG. 25. Memory 2526 is non-volatile, at least in part. The control code 2530 may implement programmatic functions or program modules that control operation of the wireless transducing circuit 2510, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 2510. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Wireless transducing circuit 2510 further includes at least one energy harvester 2552 that harvests energy to charge energy store 2522. Components 2512, 2514, 2520, 2521, 2526, and 2524 form a sub-circuit 2550 that is unpowered unless triggered by an energy level trigger 2523 based on an energy level within energy store 2522. Control code 2530 charges energy store 2522 continuously, but may only accumulate energy within energy store 2522 when sub-circuit 2550 is inactive (e.g., powered off). Energy level trigger 2523 tracks the amount of energy within energy store 2522 and triggers sub-circuit 2550 when the energy level reaches or exceeds a defined trigger level 2556, which may be configurable by processor 2520. That is, sub-circuit 2550 remain inactive until sufficient energy is received via control code 2530 and accumulated within energy store 2522.

Sub-circuit 2550 may perform a single action when triggered, since energy within energy store 2522 may be limited. For example, sub-circuit 2550 may be capable of a single transmit action, or a single read action before energy store 2522 is depleted. Memory 2526 stores an action list 2554, controlled by control code 2530, that defines a next action, or actions, to be implemented by sub-circuit 2550 when triggered. In one example, a current receive action may receive an action request from an external device (e.g., a master node) whereby control code 2530 adds the action to action list 2554 such that it is implemented when sub-circuit 2550 is triggered.

When implementing a tracked tape node (e.g., tracked tape node 1402), action list 2554 may include a default action of transmitting a beacon containing ID 2528. Accordingly, each time energy store 2522 is sufficiently charged, energy level trigger 2523 triggers sub-circuit 2550 to cause the tracked tape node to transmit its beacon.

When implementing a tracking tape node (e.g., tracking tape node 2264, FIG. 22), action list 2554 may include a beacon transmit followed by an immediate receive action. Accordingly, when triggered, sub-circuit 2550 first transmits its beacon and then activates its receiver to receive a commend (e.g., from a master node). In this embodiment, since charging speed of energy store 2522 is controlled by at least one energy harvester 2552 and the available energy for harvesting, other nodes (e.g., master tape node 2252 and/or mobile device 2220) are configured to receive for a sufficient period to ensure that the transmitted beacon is captured.

When a data packet is received, control code 2530 may interpret the data packet and add a corresponding action to action list 2554 such that it will be performed when sub-circuit 2550 is next triggered. In certain embodiments, control code 2530 sets trigger level 2556 base on a next action of action list 2554. For example, where the next action required a certain amount of energy, defined trigger level 2556 is set such that energy level trigger 2523 triggers sub-circuit 2550 only when energy store 2522 has sufficient energy to allow sub-circuit 2550 to perform that action.

FIG. 26 is a block diagram showing end-to-end food service visibility 2600 for a food service in an aircraft, in embodiments. End-to-end food service visibility 2600 shows four example stages: food preparation operations 2610, kitchen operations 2620, food cart delivery management 2630, and plane management 2640. Although this application primarily focusses on plane management 2640, tracked tape nodes (e.g., tracked tape node 1402, 2062, 2262) facilitate tracking of assets at other stages of the food item lifecycle. Detection systems 1300, 2000, and 2200, may form part of a larger tracking system that tracks progress and handling of the food and carts/carriers and other stages of their life cycle prior to being stored in the craft galley.

Food is cooked in a kitchen and loaded into carts 1310 and/or carriers 1312 which proceed through a TSA checkpoint and are staged for loading onto a delivery vehicle. Carts 1310 and carriers 1312 destined for the same aircraft may be positioned together and wrapped such that they stay together. For example, a group of wrapped carts and carriers may be destined for London, and a second group of wrapped carts and carriers may be destined for San Francisco. A tracking system (e.g., network communications environment 800, FIG. 8) may detect tracked tape nodes 1402 attached to carts 1310 and carriers 1312 as the carts and carriers are loaded and as the carts and carriers are moved. For example, a stationary gateway (e.g., stationary gateway 814) positioned at a staging area may detect carts 1310 and carriers 1312 waiting to be transferred to the aircraft. Accordingly, the tracking system may capture swell times and environmental characteristics of the carts and carriers and provide information to allow analysis of operational efficiency.

The gateway node located at the staging area may detect when the carts and/or carriers are incorrectly grouped and/or being loaded onto the wrong transport vehicle. Similarly, a smart construction cone located near the aircraft, or a mobile gateway node of the transporting vehicle, may detect when the carts and/or carriers are being loaded onto the wrong aircraft. In certain embodiments, where the smart construction cone is preconfigured with manifest 1326 corresponding to the aircraft gate location, the smart construction cone may generate an alert (e.g., on its user interface or by sending a notification to a nearby employee) indicating the loading error as it occurs. This alert may be generated locally by the smart construction cone without needing to connect with a server of the tracking system.

The mobile gateway node on the transport vehicle is configured with a manifest of carts and carriers it is transporting. The smart construction cone communicates with the gateway node and compared the aircraft manifest with the vehicle manifest. Where there is a discrepancy in the manifests (e.g., where the vehicle is not carrying the carts and carriers destined for the aircraft, or where the grouped carriers on the vehicle do not match the aircraft manifest, etc.), the smart construction cone generates a local alert to nearby nodes (e.g., mobile devices carried by employees, the gateway node of the vehicle, etc.) and/or sends a notification to the cloud.

The mobile gateway node on the vehicle may be line powered or may have a larger battery than the smart construction cone and includes a GNSS receiver (e.g., GPS receiver) that determines a location of the vehicle. Using the vehicle location, the gateway node may detect when the carts and carriers are unloaded at the correct location (e.g., airline gate) and detect when one or more carts and carriers are unloaded at a wrong location.

Detailed Item Tracking

The above embodiments track movement and positioning of carts and carriers. However, these carts and carriers are loaded with individual food and drink items (e.g., food trays, snacks, drink cans, bottles, etc.). Each of these food and drink items may have a clear tape (e.g., an RFID tape as taught by patent application Ser. No. 17/873,072, filed on Jul. 25, 2022 and Ser. No. 17/931,518, filed on Sep. 12, 2022, both of which are incorporated herein by reference in their entirety). A tape node with combined RFID reader and white tape node capability scans the tracked tape node 1402 attached to the cart or carrier and scans the RFID tags of items loaded into the cart or carrier. In certain embodiments, each drawer in each cart may have one tape node with the combined capability. The scanned RFID tag identifiers are associated with the ID read from the tracked tape node and stored in a database, either locally or in the cloud, as a manifest of contents of the cart or carrier. In certain embodiments, the manifest may indicate the contents of each drawer in the cart or carrier.

Application 1322 may have a user interface that allows a flight attendant to search for a food or drink item, whereby the user interface indicates which cart or carrier contains that item. For example, the user interface may list a drawer number and a cart number, or may provide a graphical representation of the galley to indicate the location of the cart or carrier containing the item. Where the cart is not detected in galley 1302, application 1322 may display a notification such as "the cart with the item is not in the galley right now."

For a typical flight, only 50% of the food loaded onto the aircraft is consumed. That is, the aircraft is typically loaded with additional food and drink items because the airline does not know what food and drink items each customer will request. By tracking the food and drink items removed (e.g., used) from the carts and carriers, detection system 1300 provides the airline with better tracking of inventory usage. In certain embodiments, detection system 1300 may include RFID reader tape nodes at each row or seats within the aircraft that detect which food or drink item is delivered to each seat. The airline may associate the seat with a particular passenger and thereby track the preferences of each passenger. Particularly, detection system 1300 provides the airline with a live update of the aircraft inventory by tracking which food and drink items are used. The preferences of the passenger may also be used to statistically determine inventory for a subsequent flights.

Figure 27:
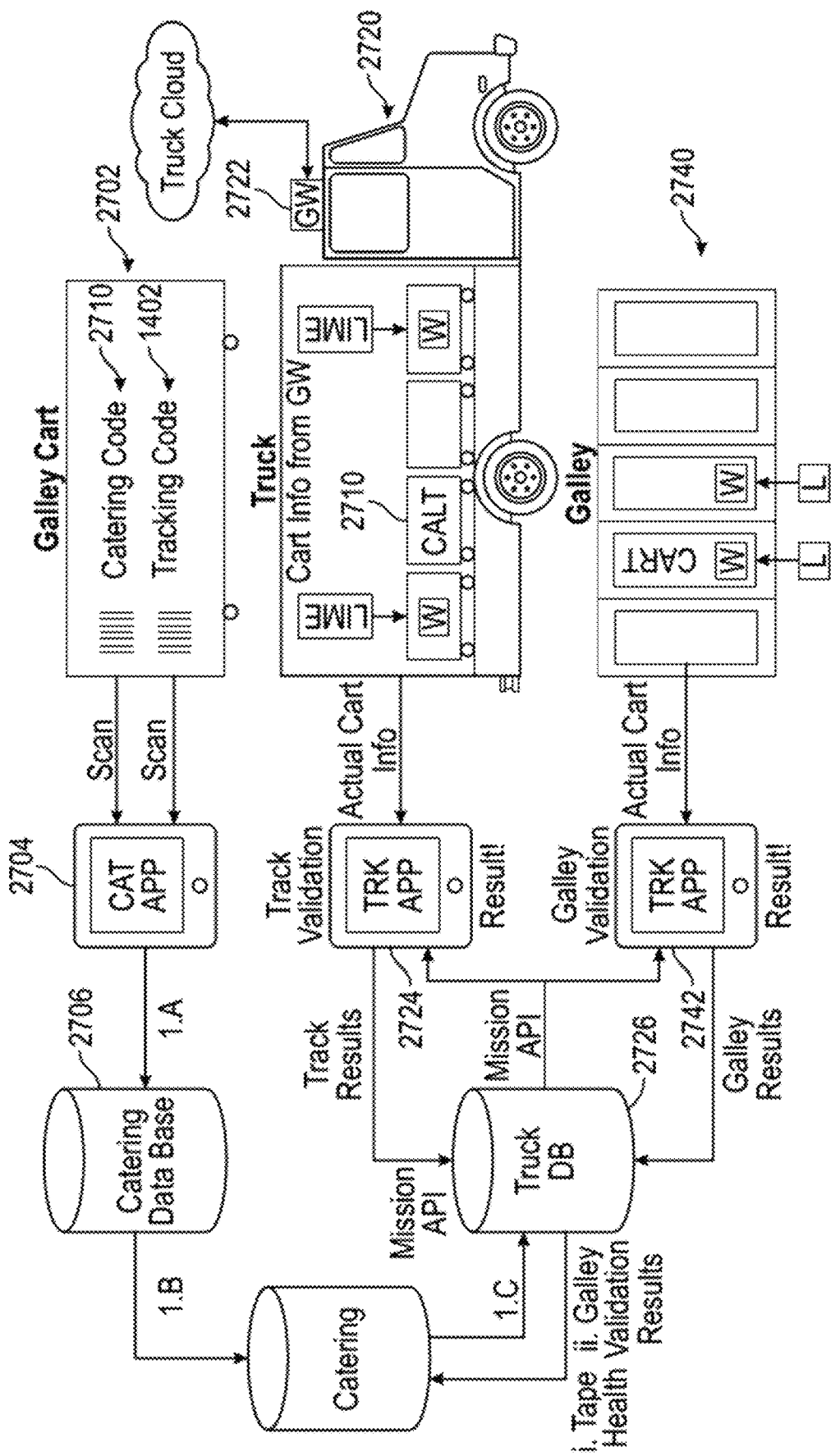
FIG. 27 is a schematic diagram illustrating example tracking and validation of service items for an aircraft galley, in embodiments.

FIG. 27 is a schematic diagram illustrating example tracking and validation of service items (e.g., carts 1310 and carriers 1312 of FIG. 13) being transported to, and stowed in, an aircraft galley (e.g., galley 1302), in embodiments. For clarity of illustration only carts are shown and described, however carriers may also be tracked as described above. In this example, a cart 2710 is loaded by at a catering location 2702 by a caterer. The caterer may use a catering app 2704 running on a mobile device for example to define items loaded into each cart 2710, which is identified by a catering code of the cart. The items may be stored in a catering database 2706 in association with the catering code. Each cart 2710 also has at least one tracked tape node 1402 of FIG. 14. In certain embodiments, the catering code is the same as tracked tape node 1402. Filled carts may be staged at catering location 2702 in preparation for transport to the aircraft. See for example, patent application Ser. No. 17/069, 651 incorporated by reference herein in its entirety.

Carts 2710 are loaded onto a vehicle 2720 for transport to the aircraft. Vehicle 2720 includes a gateway node 2722 that stores detected IDs of tracked tape nodes 1402 on carts 2710 loaded onto vehicle 2720 and. A tracking app 2724, running on a mobile device for example, may request the inventory from gateway node 2722 and compare it to an expected inventory of vehicle 2720 defined within a tracking database 2726. That is, tracking database 2726 includes an expected manifest for vehicle 2720. Tracking app 2724 may immediately identify discrepancies between the inventory detected on vehicle 2720 and the expected manifest of tracking database 2726 and generate an alert (or notification). That is, tracking app 2724 may alert personnel loading vehicle 2720 when any unexpected catering assets are detected on vehicle 2720 and indicated to personnel so they can be removed. Similarly, any catering assets that are expected but not found on vehicle 2720 are shown to personnel so that they may be added. Tracking app 2724 may also provide a confirmation that all expected catering assets are loaded on vehicle 2720 prior to the vehicle departing from the dock (e.g., catering location 2702).

When carts 2710 are unloaded from vehicle 2720 and stowed in a galley 2740 of an aircraft, a tracking app 2742 (e.g., app 1322) running on a mobile device receives an inventory of galley 2740 as carts 2710 are stowed. As described in the above embodiments, tracking app 2742 may validate the detected inventory of galley 2740 to a manifest of expected carts 2710 defined by tracking database 2726 and immediately identify any discrepancies. For example, tracking app 2724 may generate an alert (or notification) when any unexpected catering assets found in the galley they are shown to the user so that they may be removed. Tracking app 2724 may also generate an alert (or notification) when any catering assets are not found in the galley they are displayed to the user so that they may be added. In certain embodiments, as described above, tracking app 2724 may show any catering asset that is placed in an incorrect galley position to the user so that they may be moved to the correct galley position. Tracking app 2724 may also indicate when all expected catering assets are loaded to the correct galley positions.

Figure 28:
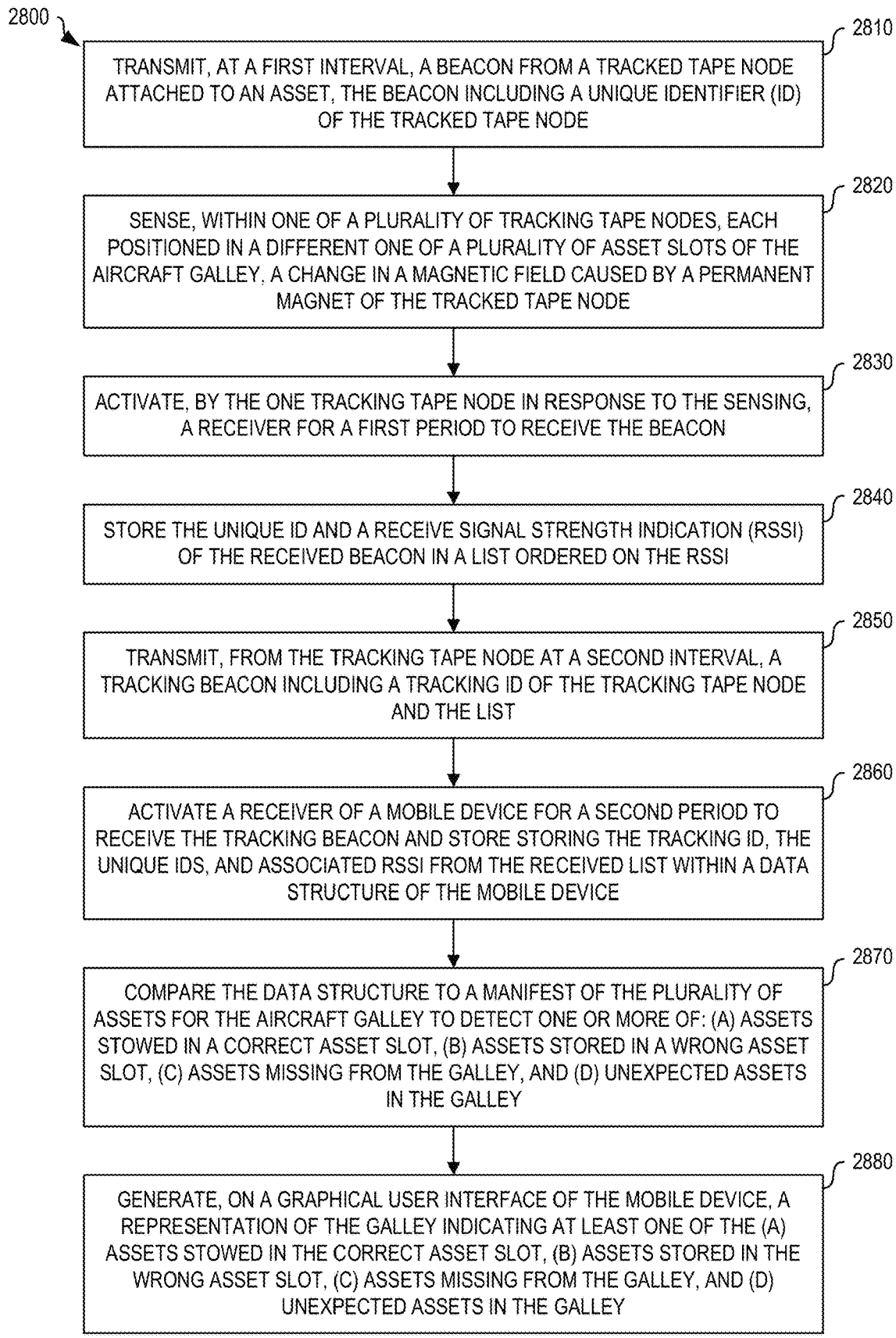
FIG. 28 is a flowchart illustrating one example method for detecting assets within an aircraft galley, in embodiments.

FIG. 28 is a flowchart illustrating one example method 2800 for detecting assets within an aircraft galley, in embodiments. Method 2800 is implemented by tracked tape node 1402 of FIG. 14, tracking tape node 1502 of FIG. 15 and application 1322 running on mobile device 1320 of FIG. 13, for example.

In block 2810, method 2800 transmits, at a first interval, a beacon from a tracked tape node attached to an asset, the beacon including a unique identifier (ID) of the tracked tape node. In one example of block 2810, tracked tape node 1402 transmits beacon 2102 at an interval 2104.

In block 2820, method 2800 senses, within one of a plurality of tracking tape nodes, each positioned in a different one of a plurality of asset slots of the aircraft galley, a change in a magnetic field caused by a permanent magnet of the tracked tape node. In one example of block 2820, tri-axis hall-effect sensor 1704 of tracking tape node 1502 senses a magnetic field change caused by proximity of permanent magnet 1702 of tracked tape node 1402.

In block 2830, method 2800 activates, by the one tracking tape node in response to the sensing, a receiver for a first period to receive the beacon. In one example of block 2830, tracking tape node 1502 activates its receiver for period 2114 to receive beacon 2102.

In block 2840, method 2800 stores the unique ID and a receive signal strength indication (RSSI) of the received beacon in a list ordered on the RSSI. In one example of block 2840, tracking tape node 1502 creates list 1784 to include unique ID 1728 of tracked tape node 1402 and a corresponding RSSI of beacon 2102.

In block 2850, method 2800 transmits, from the tracking tape node at a second interval, a tracking beacon including a tracking ID of the tracking tape node and the list. In one example of block 2850, tracking tape node 1502 transmits its tracking beacon 2316 including unique ID 1778 and list 1784.

In block 2860, method 2800 activates a receiver of a mobile device for a second period to receive the tracking beacon and stores the tracking ID, the unique IDs, and associated RSSI from the received list within a data structure stored within the mobile device. In one example of block 2850, application 1322 activates a receiver of mobile device 1320 to receive tracking beacon 2316 and stores unique ID 1778, unique ID 1728 and associated RSSI of beacon 2102 of list 1784 in data structure 1328 of mobile device 1320.

In block 2870, method 2800 compares the data structure to a manifest of the plurality of assets for the aircraft galley to detect one or more of: (a) assets stowed in a correct asset slot, (b) assets stored in a wrong asset slot, (c) assets missing from the galley, and (d) unexpected assets in the galley. In one example of block 2870, application 1322 compares data structure 1328 to manifest 1326 and determines carts 1310 (3) is not is cart slot 1304(3) and that carrier 1312(1) is missing.

In block 2880, method 2800 generates, on a graphical user interface of the mobile device, a representation of the galley indicating at least one of the (a) assets stowed in the correct asset slot, (b) assets stored in the wrong asset slot, (c) assets missing from the galley, and (d) unexpected assets in the galley. In one example of block 2880, application 1322 generates GUI 1324 as shown in FIG. 19 on a display of mobile device 1320.

Figure 29:
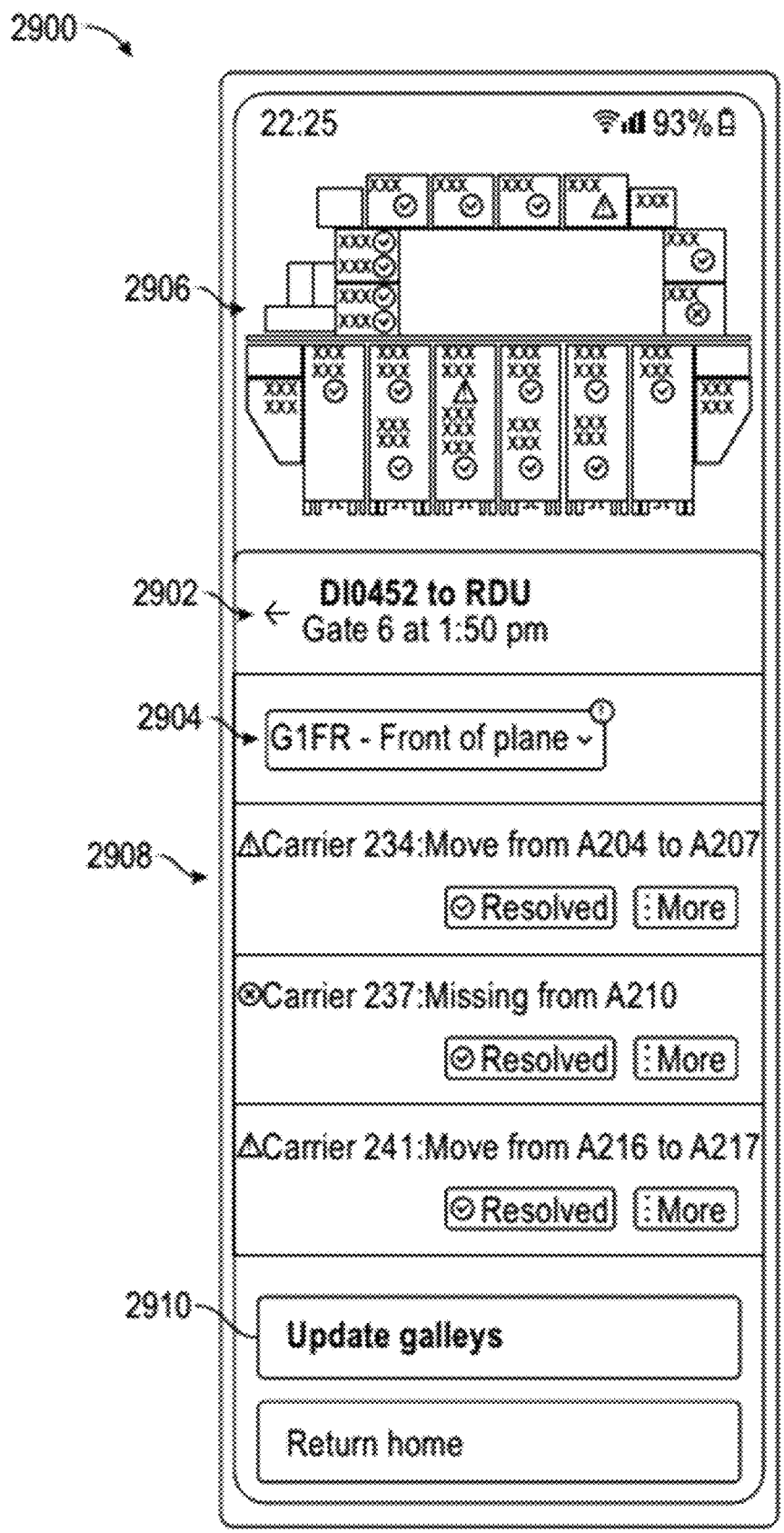
FIG. 29 is an example screenshot of the tracking app of FIG. 27 displaying discrepancies between detected items in a galley and an expected manifest, in embodiments.

FIG. 29 is an example screenshot 2900 of tracking app 2742 of FIG. 27 displaying discrepancies between detected items in a galley and an expected manifest, in embodiments. A user has selected a flight 2902 and a galley 2904 of an aircraft being catered. Screenshot 2900 may also be generated by GUI 1324 of FIG. 13. Screenshot 2900 includes a galley graphic 2906 corresponding to selected galley 2904 that graphically indicates discrepancies between detected carts and the expected manifest. A discrepancy list 2908 describes the discrepancy in detail and includes functionality to allow the user to resolve the discrepancy. In one example of operation, the user selects the flight and the galley being loaded and uses an update galley control 2910 of tracking app 2724 to retrieve or detect inventory of the galley as described above. Tracking app 2724 compares the detected inventory to the expected manifest for the selected galley of the selected flight and generates screenshot 2900 to display any discrepancies. Advantageously, the user is visually guided to identified discrepancies such that the error may be corrected prior to the departure of the aircraft.

Figure 30:
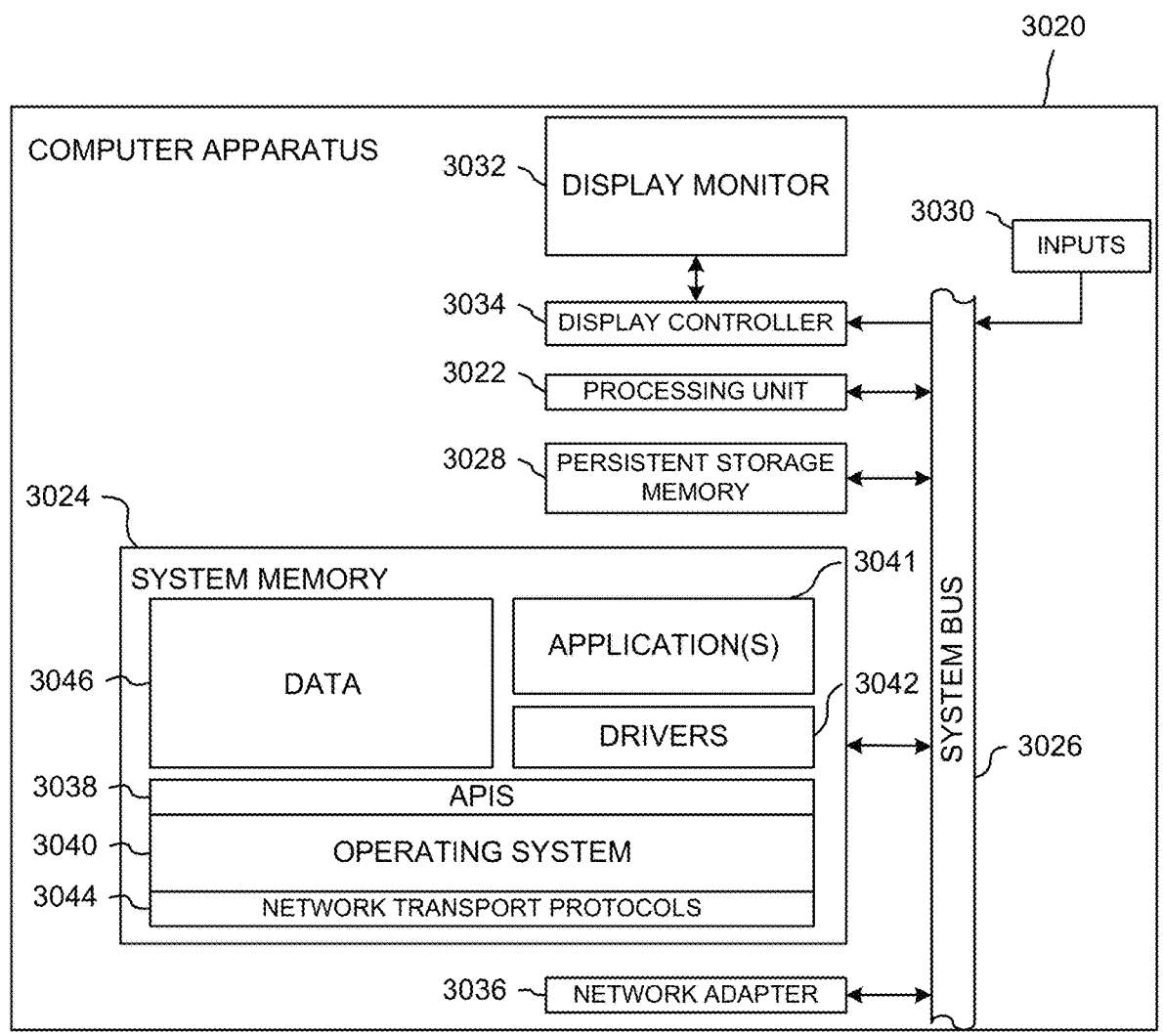
FIG. 30 shows one example computer apparatus that, either alone or in combination with one or more other computing apparatus, is operable to implement one or more of the computer systems described in this specification, in embodiments.

FIG. 30 shows an example embodiment of computer apparatus 3020 that, either alone or in combination with one or more other computing apparatus, is operable to implement one or more of the computer systems described in this specification. For example, computer apparatus 3020 may represent any of the computer implemented devices disclosed herein. The computer apparatus 3020 includes a processing unit 3022, a system memory 3024, and a system bus 3026 that couples the processing unit 3022 to the various components of the computer apparatus 3020. The processing unit 3022 may include one or more data processors, each of which may be in the form of any one of various commercially available computer processors. The system memory 3024 includes one or more computer-readable media that typically are associated with a software application addressing space that defines the addresses that are available to software applications. The system memory 3024 may include a read only memory (ROM) that stores a basic input/output system (BIOS) that contains start-up routines for the computer apparatus 3020, and a random-access memory (RAM). The system bus 3026 may be a memory bus, a peripheral bus, or a local bus, and may be compatible with any of a variety of bus protocols, including PCI, VESA, Microchannel, ISA, and EISA. The computer apparatus 3020 also includes a persistent storage memory 3028 (e.g., a hard drive, a floppy drive, a CD ROM drive, magnetic tape drives, flash memory devices, and digital video disks) that is connected to the system bus 3026 and contains one or more computer-readable media disks that provide non-volatile or persistent storage for data, data structures and computer-executable instructions.

A user may interact (e.g., input commands or data) with the computer apparatus 3020 using one or more input devices 3030 (e.g. one or more keyboards, computer mice, microphones, cameras, joysticks, physical motion sensors, and touch pads). Information may be presented through a graphical user interface (GUI) that is presented to the user on a display monitor 3032, which is controlled by a display controller 3034. The computer apparatus 3020 also may include other input/output hardware (e.g., peripheral output devices, such as speakers and a printer). The computer apparatus 3020 connects to other network nodes through a network adapter 3036 (also referred to as a "network interface card" or NIC).

A number of program modules may be stored in the system memory 3024, including application programming interfaces 3038 (APIs), an operating system (OS) 3040 (e.g., the Windows® operating system available from Microsoft Corporation of Redmond, Washington U.S.A.), software applications 3041 including one or more software applications programming the computer apparatus 3020 to perform one or more of the steps, tasks, operations, or processes of the positioning and/or tracking systems described herein, drivers 3042 (e.g., a GUI driver), network transport protocols 3044, and data 3046 (e.g., input data, output data, program data, a registry, and configuration settings).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

The following description provide examples of how various features of the disclosure may be combined together without departing from the scope hereof. These examples are not intended to be the only examples of potential combination of features. As such, additional features discussed above may be included, or not included, with the examples below even if not expressly stated.

(A1) in an embodiment of a first aspect, a method for detecting a plurality of assets in an aircraft galley, comprises: transmitting, at a first interval, a beacon from a tracked tape node attached to an asset, the beacon including a unique identifier (ID) of the tracked tape node; sensing, within one of a plurality of tracking tape nodes, each positioned in a different one of a plurality of asset slots of the aircraft galley, a change in a magnetic field caused by a permanent magnet of the tracked tape node; activating, by the one tracking tape node in response to the sensing, a receiver for a first period to receive the beacon; and receiving, by the one tracking tape node, the beacon from the tracked tape node.

(A2) In the embodiment (A1) of the first aspect, the first interval and a duration of a transmission of the beacon may be selected to give the tracked tape node a battery life of at least one year operating continuously.

(A3) In either embodiment (A1) or (A2) of the first aspect, the first period being longer than the first interval.

(A4) In any embodiment (A1) through (A3) of the first aspect, the tracking tape node being in a low power state until activated in response to the sensing and returning to the low power state after transmitting the tracking beacon at least once.

(A5) In any embodiment (A1) through (A4) of the first aspect, the method further comprising: storing, in a list ordered by RSSI, the unique ID and a receive signal strength indication (RSSI) of the received beacon; and transmitting, from the tracking tape node at a second interval, a tracking beacon including a tracking ID of the tracking tape node and the list.

(A6) In any embodiment (A1) through (A6) of the first aspect, the method further comprising: activating a receiver of a mobile device for a second period to receive the tracking beacon; storing the tracking ID, the unique IDs, and associated RSSI from the received list within a data structure stored within the mobile device; comparing the data structure to a manifest of the plurality of assets for the aircraft galley to detect one or more of: (a) assets stowed in a correct asset slot, (b) assets stored in a wrong asset slot, (c) assets missing from the galley, and (d) unexpected assets in the galley; and generating, on a graphical user interface of the mobile device, a representation of the galley indicating at least one of the (a) assets stowed in the correct asset slot, (b) assets stored in the wrong asset slot, (c) assets missing from the galley, and (d) unexpected assets in the galley.

(A7) In any embodiment (A1) through (A6) of the first aspect, the storing comprising not storing the unique ID and the RSSI when the RSSI is below a predefined threshold.

(A8) In any embodiment (A1) through (A7) of the first aspect, the second period encompassing the plurality of assets being stowed in the galley.

(A9) In any embodiment (A1) through (A8) of the first aspect, the tracking ID being unique to the tracking tape node and being associated with the asset slot in which the tracking tape node is installed.

(A10) In any embodiment (A1) through (A9) of the first aspect, the unique ID being associated with a cart or carrier containing the asset and on which the tracked tape node is installed.

(A11) In any embodiment (A1) through (A10) of the first aspect, the manifest listing, for each of the plurality of assets, the unique ID of the respective tracked tape node attached to the asset and the tracking ID of the tracking tape node installed in the asset slot assigned to the asset.

(B1) in an embodiment of a second aspect, A method for detecting a plurality of assets in an aircraft galley, comprising: transmitting, at a first interval, a synchronization beacon from a master tape node positioned within the galley; receiving, by at least one of a plurality of tracking tape nodes, each positioned in a different one of a plurality of asset slots of the aircraft galley, the synchronization beacon and activating a receiver of the one tracking tape node for a first period immediately after the synchronization beacon; receiving, by a tracked tape node attached to one of the plurality of assets, the synchronization beacon and transmitting, during the first period, a beacon including a unique identifier (ID) of the tracked tape node; receiving, by the one tracking tape node, the beacon and storing the unique ID and a receive signal strength indication (RSSI) of the received beacon in a list ordered on the RSSI; and transmitting, from the tracking tape node at a second interval and for a second period, a tracking beacon including a tracking ID of the tracking tape node and the list.

(B2) In the embodiment (B1) of the second aspect, further comprising: receiving, by a mobile device, the tracking beacon; storing the tracking ID, the unique IDs, and associated RSSI from the list received in the tracking beacon, in a data structure stored within the mobile device; comparing, within the mobile device, the data structure to a manifest of the plurality of assets for the aircraft galley to detect one or more of: (a) assets stowed in a correct asset slot, (b) assets stored in a wrong asset slot, (c) assets missing from the galley, and (d) unexpected assets in the galley; and generating, on a graphical user interface of the mobile device, a representation of the galley indicating at least one of the (a) assets stowed in the correct asset slot, (b) assets stored in the wrong asset slot, (c) assets missing from the galley, and (d) unexpected assets in the galley.

(B3) In either embodiment (B1) or (B2) of the second aspect, the tracking ID being unique to the tracking tape node and being associated with the asset slot in which the tracking tape node is installed.

(B4) In any embodiment (B1) through (B3) of the second aspect, the unique ID being associated with a cart or carrier containing the asset and on which the tracked tape node is installed.

(B5) In any embodiment (B1) through (B4) of the second aspect, the manifest defining, for each of the plurality of assets, the unique ID of the respective tracked tape node attached to the asset and the tracking ID of the tracking tape node installed in the asset slot assigned to the asset.

(C1) in an embodiment of a third aspect, a method for detecting a plurality of assets in an aircraft galley, comprising: from each of a plurality of tracked tape nodes attached to a different one of the plurality of assets, transmitting, at a first interval, a beacon including a unique identifier (ID) of the tracked tape node; activating a receiver of a mobile device located within the galley to receive the beacons; storing the unique ID and a receive signal strength indication (RSSI) of the received beacon in a data structure ordered on the RSSI; comparing, within the mobile device, the data structure to a manifest of the plurality of assets for the aircraft galley to detect one or more of: (a) assets stowed in a correct asset slot, (b) assets stored in a wrong asset slot, (c) assets missing from the galley, and (d) unexpected assets in the galley; and generating, on a graphical user interface of the mobile device, a representation of the galley indicating at least one of the (a) assets stowed in the correct asset slot, (b) assets stored in the wrong asset slot, (c) assets missing from the galley, and (d) unexpected assets in the galley.

(C2) In the embodiment (C1) of the third aspect, further comprising ignoring beacons having an RSSI less than an RSSI threshold, wherein the RSSI threshold corresponds to range of the beacons within the aircraft.

(C3) In either embodiment (C1) or (C2) of the third aspect, the unique ID being associated with a cart or carrier containing the asset and on which the tracked tape node is installed.

(C4) In any embodiment (C1) through (C3) of the third aspect, the manifest defining, for each of the plurality of assets, the unique ID of the respective tracked tape node attached to the asset.

(D1) in an embodiment of a fourth aspect, a detection system for validating a plurality of assets loaded into an aircraft galley, comprises: a plurality of tracked tape nodes each attached to a different one of the plurality assets and including a wireless transmitter that transmits, at intervals, a tracked beacon including a unique identifier; a plurality of tracking tape nodes each positioned at a different asset slot of the aircraft galley, each tracking tape node including: a receiver for receiving the beacon; and a transmitter for transmitting, at intervals, a tracking beacon including a tracking node identifier and the unique identifier; and a mobile device having a transceiver, a display, a processor, and memory storing an application with machine readable instructions that when executed by the processor cause the processor to: receive the tracking beacon via the transceiver;

store the unique identifier and the tracking node identifier in a data structure of the memory; generate a comparison of the tracking node identifier and the unique identifier to a manifest of expected assets for the aircraft galley; and display the comparison in a graphical user interface on the display.

(D2) In the embodiment (D1) of the fourth aspect, each asset being one of a galley cart and a galley carrier.

(D3) In either embodiment (D1) or (D2) of the fourth aspect, the manifest associating the unique identifier with one of the expected assets.

(D4) In any embodiment (D1) through (D3) of the fourth aspect, the manifest associating the tracking node identifier with one asset slot in the aircraft galley.

(D5) In any embodiment (D1) through (D4) of the fourth aspect, further comprising: a plurality of permanent magnets each configured with one of the plurality of tracked tape nodes; and a plurality of hall-effect sensors each configured with one of the plurality of tracking tape nodes.

(D6) In any embodiment (D1) through (D5) of the fourth aspect, wherein the hall-effect sensor detects proximity of the permanent magnet when the asset is positioned within the asset slot and causes the tracking tape node to activate the receiver for a first period to receive the beacon and activates the transmitter to transmit the tracking beacon.

(E1) in an embodiment of a fifth aspect, a tape node with energy harvesting, comprising: an energy harvester for harvesting energy from an environment of the tape node; an energy store electrically coupled to receive electrical energy from the energy harvester; a sub-circuit having: a processor; and memory storing control code, a unique ID of the tape node, and an action list; and an energy level trigger electrically couples to the energy store and the sub-circuit, the energy level trigger activating the sub-circuit when an energy level within the energy store reaches or exceed a trigger level; wherein the sub-circuit executes the control code to perform an action of the action list when activated.

(E2) In the embodiment (E1) of the fifth aspect, wherein the sub-circuit deactivated when the energy of the energy store is depleted.

(E3) In either embodiment (E1) or (E2) of the fifth aspect, the action including adding a next action to the action list that is performed in a subsequent activation of the sub-circuit.

(E4) In any embodiment (E1) through (E3) of the fifth aspect, the trigger level being set based on an estimated power requirement of the next action.

(G1) in an embodiment of a sixth aspect, a detection system for validating a plurality of assets loaded into an area, comprising: a plurality of tracked tape nodes each attached to a different one of the plurality assets and including a wireless transmitter that transmits, at intervals, a tracked beacon including a unique identifier; a plurality of tracking tape nodes each positioned at a different asset slot of the area, each tracking tape node including: a receiver for receiving the beacon; and a transmitter for transmitting, at intervals, a tracking beacon including a tracking node identifier and the unique identifier; and a mobile device having a transceiver, a display, a processor, and memory storing an application with machine readable instructions that when executed by the processor cause the processor to: receive the tracking beacon via the transceiver; store the unique identifier and the tracking node identifier in a data structure of the memory; generate a comparison of the tracking node identifier and the unique identifier to a manifest of expected assets for the space; and display the comparison in a graphical user interface on the display.

(H1) in an embodiment of a seventh aspect, a detection system for validating a plurality of assets loaded into an aircraft galley, comprising: a plurality of tracked tape nodes each attached to a different one of the plurality assets and including a wireless transmitter that transmits, at intervals, a tracked beacon including a unique identifier; a plurality of tracking tape nodes each positioned at a different asset slot of the aircraft galley, each tracking tape node including: a receiver for receiving the beacon; and a transmitter for transmitting, at intervals, a tracking beacon including a tracking node identifier and the unique identifier; a master node having a transceiver, a processor, and memory storing machine readable instructions that when executed by the processor cause the processor to: receive the tracking beacon via the transceiver; and store the unique identifier and the tracking node identifier in a data structure of the memory; and a mobile device having a transceiver, a display, a processor, and memory storing an application with machine readable instructions that when executed by the processor cause the processor to: retrieve the contents of the data structure from the master node; generate a comparison of the tracking node identifier and the unique identifier to a manifest of expected assets for the aircraft galley; and display the comparison in a graphical user interface on the display.

(H2) In the embodiment (H1) of the seventh aspect, detection system of clause 32, the master node being a gateway node.

(H3) In either embodiment (H1) or (H2) of the seventh aspect, detection system of clause 32, the master node further comprising machine readable instructions stored in the memory that when executed by the processor cause the processor to synchronize communication between the plurality of tracked tape nodes the plurality of tracking tape nodes.

It should be appreciated that any embodiment of any aspect may be combined with any other embodiment of any other aspect described above. Additionally, it should be appreciated that any of the embodiments of any aspect above may be combined with any feature described in the specification above.

Further yet, it should be appreciated that the above discussion is not limited to airplane galley systems. For example, the above description supports a method for detecting a plurality of assets in a storage location, comprising: transmitting, at a first interval, a beacon from a tracked tape node attached to an asset, the beacon including a unique identifier (ID) of the tracked tape node; sensing, within one of a plurality of tracking tape nodes, each positioned in a different one of a plurality of asset slots of the storage location, a change in a magnetic field caused by a permanent magnet of the tracked tape node; activating, by the one tracking tape node in response to the sensing, a receiver for a first period to receive the beacon; and receiving, by the one tracking tape node, the beacon from the tracked tape node. Similarly, the above description supports and enables a method for detecting a plurality of assets in a storage location, comprising: transmitting, at a first interval, a synchronization beacon from a master tape node positioned within the storage location; receiving, by at least one of a plurality of tracking tape nodes, each positioned in a different one of a plurality of asset storage positions of the storage location, the synchronization beacon and activating a receiver of the one tracking tape node for a first period immediately after the synchronization beacon; receiving, by a tracked tape node attached to one of the plurality of assets, the synchronization beacon and transmitting, during the first period, a beacon including a unique identifier (ID) of the tracked tape node; receiving, by the one tracking tape node, the beacon and storing the unique ID and a receive signal strength indication (RSSI) of the received beacon in a list ordered on the RSSI; and transmitting, from the tracking tape node at a second interval and for a second period, a tracking beacon including a tracking ID of the tracking tape node and the list. As yet another example, a method for detecting a plurality of assets in a storage location, comprises: from each of a plurality of tracked tape nodes attached to a different one of the plurality of assets, transmitting, at a first interval, a beacon including a unique identifier (ID) of the tracked tape node; activating a receiver of a mobile device located within or proximate the storage location to receive the beacons; storing the unique ID and a receive signal strength indication (RSSI) of the received beacon in a data structure ordered on the RSSI; comparing, within the mobile device, the data structure to a manifest of the plurality of assets for the storage location to detect one or more of: (a) assets stowed in a correct asset storage position, (b) assets stored in a wrong asset storage position, (c) assets missing from the storage location, and (d) unexpected assets in the storage location; and generating, on a graphical user interface of the mobile device, a representation of the storage location indicating at least one of the (a) assets stowed in the correct asset storage position, (b) assets stored in the wrong asset storage position, (c) assets missing from the storage location, and (d) unexpected assets in the storage location.

What is claimed is:

1. A method for detecting a plurality of assets in an aircraft galley, comprising:
   sensing, within one of a plurality of tracking tape nodes, each positioned in a different one of a plurality of asset slots of the aircraft galley, a change in a magnetic field caused by a permanent magnet of a tracked tape node attached to an asset;
   activating, by the one tracking tape node in response to the sensing, a receiver for a first period to receive a beacon from the tracked tape node; and
   receiving, by the one tracking tape node, the beacon from the tracked tape node,
      the beacon being transmitted from the tracked tape node according to a first interval and including a unique identifier (ID) of the tracked tape node.

2. The method of claim 1, the first interval and a duration of a transmission of the beacon being configured to give the tracked tape node a battery life of at least one year operating continuously.

3. The method of claim 1, the first period being longer than the first interval.

4. The method of claim 1, the tracking tape node being in a low power state until activated in response to the sensing and returning to the low power state after transmitting the tracking beacon at least once.

5. The method of claim 1, further comprising:
   storing, in a list ordered by RSSI, the unique ID and a receive signal strength indication (RSSI) of the received beacon; and
   transmitting, from the tracking tape node at a second interval, a tracking beacon including a tracking ID of the tracking tape node and the list.

6. The method of claim 5, further comprising:
   activating a receiver of a mobile device for a second period to receive the tracking beacon;
   storing the tracking ID, the unique ID, and associated RSSI from the received list within a data structure stored within the mobile device;
   comparing the data structure to a manifest of the plurality of assets for the aircraft galley to detect one or more of: (a) assets stowed in a correct asset slot, (b) assets stored in a wrong asset slot, (c) assets missing from the galley, and (d) unexpected assets in the galley; and
   generating, on a graphical user interface of the mobile device, a representation of the galley indicating at least one of the (a) assets stowed in the correct asset slot, (b) assets stored in the wrong asset slot, (c) assets missing from the galley, and (d) unexpected assets in the galley.

7. The method of claim 6, the storing comprising not storing the unique ID and the RSSI when the RSSI is below a predefined threshold.

8. The method of claim 6, the second period encompassing the plurality of assets being stowed in the galley.

9. The method of claim 6, the tracking ID being unique to the tracking tape node and being associated with the asset slot in which the tracking tape node is installed.

10. The method of claim 9, the unique ID being associated with a cart or carrier containing the asset and on which the tracked tape node is installed.

11. The method of claim 10, the manifest listing, for each of the plurality of assets, the unique ID of the respective tracked tape node attached to the asset and the tracking ID of the tracking tape node installed in the asset slot assigned to the asset.

12. A system comprising:
   a plurality of tracked tape nodes each attached to a different one of a plurality assets, each tracked tape node comprising:
      a wireless transmitter that transmits, at intervals, a beacon including a unique identifier (ID), and
      a permanent magnet;
   a plurality of tracking tape nodes each positioned at a different asset slot of an aircraft galley, each tracking tape node including:
      a magnetic sensor for sensing a change in a magnetic field caused by the permanent magnet of a respective one of the plurality of tracked tape nodes, when a corresponding asset of the plurality of assets is positioned in a respective slot of the aircraft galley,
      a receiver for receiving the beacon, wherein the receiver is activated for a first period in response to sensing the change in the magnetic field and is configured to receive the beacon from the respective one of the plurality of tracked tape nodes; and
      a transmitter for transmitting, at intervals, a tracking beacon including a tracking node identifier and the unique identifier.

13. The system of claim 12, further comprising a mobile device having a transceiver, a display, a processor, and memory storing an application with machine readable instructions that when executed by the processor cause the processor to:
   receive the tracking beacon via the transceiver;
   store the unique identifier and the tracking node identifier in the memory;
   generate a comparison of the tracking node identifier and the unique identifier to a manifest of expected assets for the aircraft galley; and
   display the comparison in a graphical user interface on the display.

14. The system of claim 13, the manifest associating the unique identifier with one of the expected assets.

15. The system of claim 13, the manifest associating the tracking node identifier with one asset slot in the aircraft galley.

16. The system of claim 12, each asset being one of a galley cart and a galley carrier.

17. The system of claim 12, wherein the magnetic sensor comprises one or more hall-effect sensors.

18. A non-transitory computer readable storage medium storing instructions that, when executed, cause a processor to:
- sense, within one of a plurality of tracking tape nodes, each positioned in a different one of a plurality of asset slots of a aircraft galley, a change in a magnetic field caused by a permanent magnet of a tracked tape node attached to an asset;
- activate, by the one tracking tape node in response to the sensing, a receiver for a first period to receive a beacon from the tracked tape node; and
- receiving, by the one tracking tape node, the beacon from the tracked tape node, the beacon being transmitted from the tracked tape node according to a first interval and including a unique identifier (ID) of the tracked tape node.

19. The non-transitory computer readable storage medium of claim 18, storing further instructions that when executed, further cause the processor of a system to:
- store, in a list ordered by RSSI, the unique ID and a receive signal strength indication (RSSI) of the received beacon; and
- transmit, from the tracking tape node at a second interval, a tracking beacon including a tracking ID of the tracking tape node and the list.

20. The non-transitory computer readable storage medium of claim 19, storing further instructions that when executed, further cause the system to:
- activate a receiver of a mobile device for a second period to receive the tracking beacon;
- store the tracking ID, the unique ID, and associated RSSI from the received list within a data structure stored within the mobile device;
- compare the data structure to a manifest of the plurality of assets for the aircraft galley to detect one or more of: (a) assets stowed in a correct asset slot, (b) assets stored in a wrong asset slot, (c) assets missing from the galley, and (d) unexpected assets in the galley; and
- generate, on a graphical user interface of the mobile device, a representation of the galley indicating at least one of the (a) assets stowed in the correct asset slot, (b) assets stored in the wrong asset slot, (c) assets missing from the galley, and (d) unexpected assets in the galley.

* * * * *